(12) United States Patent
Yu et al.

(10) Patent No.: US 12,550,129 B2
(45) Date of Patent: Feb. 10, 2026

(54) TRIGGER BASED NULL DATA PACKET TRANSMISSION METHOD AND RELATED APPARATUS

(71) Applicant: HUAWEI TECHNOLOGIES CO., LTD., Shenzhen (CN)

(72) Inventors: Jian Yu, Shenzhen (CN); Yunbo Li, Shenzhen (CN); Chenchen Liu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/464,072

(22) Filed: Sep. 8, 2023

(65) Prior Publication Data

US 2023/0422230 A1 Dec. 28, 2023

Related U.S. Application Data

(63) Continuation of application No. PCT/CN2022/078170, filed on Feb. 28, 2022.

(30) Foreign Application Priority Data

Mar. 12, 2021 (CN) .......................... 202110272453.X

(51) Int. Cl.
*H04W 72/0453* (2023.01)
*H04W 24/10* (2009.01)
(Continued)

(52) U.S. Cl.
CPC ....... *H04W 72/0453* (2013.01); *H04W 24/10* (2013.01); *H04W 28/0827* (2020.05); *H04W 84/12* (2013.01)

(58) Field of Classification Search
CPC ............. H04W 72/0453; H04W 24/10; H04W 28/0827; H04W 72/23; H04W 48/16;
(Continued)

(56) References Cited

U.S. PATENT DOCUMENTS 12,388,695 B2 * 8/2025 Park .......................... H04L 1/00
2020/0029376 A1 * 1/2020 Asterjadhi ............ H04W 28/04
(Continued)

OTHER PUBLICATIONS

Shellhammer et al., "Proposed Draft Specification for Trigger Frame for EHT," Qualcomm, IEEE 802.11-21/0259r3, total 43 pages, Institute of Electrical and Electronics Engineers, New York, New York (Mar. 2, 2021).

(Continued)

*Primary Examiner* — Brian T O Connor
(74) *Attorney, Agent, or Firm* — Leydig, Voit & Mayer, Ltd.

(57) ABSTRACT

A trigger based null data packet transmission method and a related apparatus are provided, which relate to wireless communication, and are applied to a wireless local area network supporting an 802.11be standard. The method includes: receiving, by an EHT station, an NFRP trigger frame; determining whether a resource for scheduling the EHT station is in an EHT modulation bandwidth or an HE modulation bandwidth based on information in the NFRP trigger frame; and sending an EHT TB NDP if the resource is in the EHT modulation bandwidth; or sending an HE TB NDP if the resource is in the HE modulation bandwidth, where the NFRP trigger frame includes a first user information field, and is used to schedule the EHT station to send the HE TB NDP in the HE modulation bandwidth and send the EHT TB NDP in the EHT modulation bandwidth.

20 Claims, 18 Drawing Sheets

(51) Int. Cl.
*H04W 28/08* (2023.01)
*H04W 84/12* (2009.01)

(58) Field of Classification Search
CPC . H04W 76/15; H04W 74/0816; H04W 84/12; H04W 72/0446; H04W 74/002; H04W 74/04; H04L 5/0048; H04B 7/04; Y02D 30/70
See application file for complete search history.

(56) References Cited

U.S. PATENT DOCUMENTS

| | | | | |
|---|---|---|---|---|
| 2021/0227529 | A1* | 7/2021 | Chu | H04W 72/23 |
| 2023/0319629 | A1* | 10/2023 | Ko | H04L 1/0007 370/230 |
| 2023/0379109 | A1* | 11/2023 | Chun | H04L 27/2602 |
| 2024/0089068 | A1* | 3/2024 | Chun | H04L 5/0094 |
| 2024/0089158 | A1* | 3/2024 | Park | H04L 27/0008 |
| 2024/0137168 | A1* | 4/2024 | Park | H04L 67/51 |
| 2025/0008574 | A1* | 1/2025 | Huang | H04W 72/0453 |
| 2025/0159550 | A1* | 5/2025 | Lim | H04L 27/20 |

OTHER PUBLICATIONS

Au, "Specification Framework for TGbe," Huawei, 19/1262r23, total 118 pages, Institute of Electrical and Electronics Engineers, New York, New York (Jan. 17, 2021).

Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-Speed Physical Layer in the 5 GHZ Band, Sponsor LAN/MAN Standards Committee of the IEEE Computer Society, IEEE Std 802.11a-1999, total 90 pages, Institute of Electrical and Electronics Engineers, New York, New York (Sep. 1999).

"Supplement to IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications: Higher-Speed Physical Layer Extension in the 2.4 GHz Band," Sponsor LAN/MAN Standards Committee of the IEEE Computer Society, IEEE Std 802.11b-1999, total 97 pages, Institute of Electrical and Electronics Engineers, New York, New York (Sep. 1999).

IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 4: Further Higher Data Rate Extension in the 2.4 GHz Band, IEEE Computer Society, Sponsored by the LAN/MAN Standards Committee, IEEE Std 802.11g™-2003, total 78 pages, Institute of Electrical and Electronics Engineers, New York, New York (Jun. 2003).

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 5: Enhancements for Higher Throughput," IEEE Computer Society Sponsored by the LAN/MAN Standards Committee, IEEE Std 802.11n™-2009, total 536 pages, Institute of Electrical and Electronics Engineers, New York, New York (Sep. 2009).

Zeshan et al., "VLC with 802.11ac Frame Structure," doc.:11-20-0196-00-bb, total 9 pages (Jan. 15, 2020).

Magd et al., "P802.11ax Report to EC on Conditional Approval to Forward Draft to RevCom," doc.: IEEE 802.11-20/1771r7, total 10 pages (Nov. 3, 2020).

Redlich et al., "CR on D0.3 EHT-SIG 36.3.11.8.5," IEEE P802.11 Wireless LANs, doc.: IEEE 802.11-21/0298r1, total 8 pages (Feb. 16, 2021).

"IEEE Standard for Information Technology—Telecommunications and Information Exchange Between Systems Local and Metropolitan Area Networks—Specific requirements, Part 11: Wireless LAN Medium Access Control (MAC) and Physical Layer (PHY) Specifications," IEEE Computer Society, Sponsored by the LAN/MAN Standards Committee, IEEE Std 802.11™-2016 (Revision of IEEE Std 802.11-2012), total 3534 pages, Institute of Electrical and Electronics Engineers, New York, New York (Dec. 2016).

* cited by examiner

| 12 | 3 | 2 | 4 | 4 | 12 | 3 | Variable |
|---|---|---|---|---|---|---|---|
| AID12 Association identifier (AID reserved or AID not allocated) | PHY Version ID Physical layer version identifier | UL BW Extension Uplink bandwidth extension | UL EHT Spatial Reuse 1 Uplink EHT spatial reuse 1 | UL EHT Spatial Reuse 2 Uplink EHT spatial reuse 2 | UL U-SIG Reserved Uplink universal signal field reserved indication | Reserved | Station information based on a trigger frame type Trigger Dependent User Info |

CONT. FROM FIG. 6A

| 12 | 8 | 1 | 4 | 1 | 4 | 2 | 7 | 1 | Variable |
|---|---|---|---|---|---|---|---|---|---|
| AID12 Association identifier | RU Allocation Resource unit allocation | UL FEC Coding Type Uplink forward error correction coding type | UL EHT-MCS Modulation and coding scheme | Reserved | Spatial stream starting value | Spacial stream quantity | UL Target RSSI Uplink target received signal strength indication | PS160 Primary and secondary 160 MHz indication | Station information based on a trigger frame type Trigger Dependent User Info |

EHT variant user information field

FIG. 6B

TRIGGER BASED NULL DATA PACKET TRANSMISSION METHOD AND RELATED APPARATUS

CROSS-REFERENCE TO RELATED APPLICATIONS

This application is a continuation of International Application No. PCT/CN2022/078170, filed on Feb. 28, 2022, which claims priority to Chinese Patent Application No. 202110272453.X, filed on Mar. 12, 2021. The disclosures of the aforementioned applications are hereby incorporated by reference in their entireties.

TECHNICAL FIELD

Embodiments of this application relate to the field of wireless communication technologies, and in particular, to a trigger based null data packet (TB NDP) transmission method and a related apparatus.

BACKGROUND

Wireless local area networks (WLANs) have developed through a plurality of generations, including 802.11a/b/g, 802.11n, 802.11ac, 802.11ax, and 802.11be that is currently under discussion. The 802.11ax standard is referred to as a high efficiency (HE) standard, and the 802.11be standard is referred to as an extremely high throughput (EHT) standard. In this specification, a station that supports the 802.11ax standard but does not support the 802.11be standard is referred to as an HE station for short, and a station that supports the 802.11be standard is referred to as an EHT station for short.

A null data packet (NDP) feedback report (NDP feedback report) procedure is designed in the 802.11ax standard, so that an access point (AP) collects, from a plurality of stations (STAs), feedback information such as a resource request. Specifically, the AP sends a null data packet feedback report poll (NDP feedback report poll, NFRP) trigger frame to collect, from the STA station, the feedback information such as the resource request. After receiving the trigger frame, the STA sends an NDP feedback report when determining that the STA can send the feedback. The NDP feedback report is carried in a high efficiency trigger based null data packet (HE TB NDP). The HE TB NDP is a special variant of a high efficiency trigger based physical layer protocol data unit (HE TB PPDU, one of the four HE PPDUs), which does not include a data field.

Because a maximum bandwidth supported by the 802.11ax standard is 160 MHz, and a maximum bandwidth supported by the 802.11be standard under discussion is 320 MHz, how to schedule an EHT station to send an EHT TB NDP to feed back a report becomes an urgent problem to be resolved.

SUMMARY

Embodiments of this application provide a trigger based null data packet transmission method and a related apparatus, to schedule an EHT station to send an EHT TB NDP to feed back a report, and support an NDP feedback report procedure in an 802.11be standard.

The following describes this application from different aspects. It should be understood that for implementations and beneficial effects of the following different aspects, mutual reference can be made.

According to a first aspect, this application provides a trigger based null data packet transmission method, and the method includes: sending, by an AP, an NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, and the first user information field is used to schedule the first-type station to send an HE TB NDP in the HE modulation bandwidth, and send an EHT TB NDP in the EHT modulation bandwidth; and receiving, by the AP in the EHT modulation bandwidth, the EHT TB NDP from a first station in the first-type station; or receiving the HE TB NDP from the first station in the HE modulation bandwidth. The first-type station is an EHT station, and the first station in the first-type station can be any station that supports an 802.11be standard. The first user information field is the $1^{st}$ user information field following a common information field of the NFRP trigger frame, in other words, the first user information field is the $1^{st}$ user information field in a user information list.

Optionally, the NFRP trigger frame further includes a second user information field, and the second user information field includes an uplink bandwidth extension field and an association identifier (AID) 12 field. The uplink bandwidth extension field and an uplink bandwidth field of the NFRP trigger frame jointly indicate the EHT modulation bandwidth. In other words, the EHT modulation bandwidth indication information can be carried in the uplink bandwidth extension field in the second user information field and the uplink bandwidth field in the NFRP trigger frame. A value of the AID12 field of the second user information field is 2007.

With reference to the first aspect, in a possible implementation, the receiving, by the AP in the EHT modulation bandwidth, an EHT TB NDP from a first station in the first-type station, includes: receiving, by the access point, the EHT TB NDP from the first station on a subcarrier corresponding to a resource unit subcarrier set index of the first station. The subcarrier corresponding to the resource unit subcarrier set index of the first station is in the EHT modulation bandwidth. The resource unit subcarrier set index of the first station is determined based on an association identifier (AID) of the first station, a value of a starting AID in the first user information field, the EHT modulation bandwidth, and a quantity of stations scheduled by the NFRP trigger frame to feed back the HE TB NDP.

According to a second aspect, this application provides a trigger based null data packet transmission method, applied to a first-type station, and the method includes: receiving, by a first station in the first-type station, an NFRP trigger frame; and determining whether a resource for scheduling the first station is in an EHT modulation bandwidth or an HE modulation bandwidth based on information in the NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, and the first user information field is used to schedule the first-type station to send an HE TB NDP in the HE modulation bandwidth, and send an EHT TB NDP in the EHT modulation bandwidth; and sending, by a first station, the EHT TB NDP if a resource for scheduling the first station by the NFRP trigger frame is in the EHT modulation bandwidth; or sending, by the first station, the HE TB NDP if a resource for scheduling the first station by the NFRP trigger frame is in the HE modulation bandwidth. The first-type station is an EHT station, and the second-type station is an HE station; and the first station in the first-type station can be any station that supports an 802.11be standard. The first user information field is the $1^{st}$ user information field following a common information field of the NFRP trigger frame, in other words, the first user information field is the $1^{st}$ user information field in a user information list.

Optionally, the NFRP trigger frame further includes a second user information field, and the second user information field includes an uplink bandwidth extension field and an association identifier (AID) 12 field. The uplink bandwidth extension field and an uplink bandwidth field of the NFRP trigger frame jointly indicate the EHT modulation bandwidth. In other words, the EHT modulation bandwidth indication information can be carried in the uplink bandwidth extension field in the second user information field and the uplink bandwidth field in the NFRP trigger frame. A value of the AID12 field of the second user information field is 2007.

It can be learned that in this solution, a frame format of the $1^{st}$ user information field in a user information list field of the original NFRP trigger frame is reused to schedule the EHT station (the first-type station) to send the HE TB NDP in the HE modulation bandwidth and send the EHT TB NDP in the EHT modulation bandwidth to respond to the NFRP trigger frame. The EHT station determines whether a resource for scheduling the EHT station is in the HE modulation bandwidth or the EHT modulation bandwidth, to determine whether to send the HE TB NDP or the EHT TB NDP, so that, the EHT station may be scheduled to send the EHT TB NDP to feed back a report, and an NDP feedback report procedure in the 802.11be standard is supported.

With reference to the second aspect, in a possible implementation, the sending, by a first station, the EHT TB NDP includes: sending, by the first station, the EHT TB NDP on a subcarrier corresponding to a resource unit subcarrier set index of the first station. The resource unit subcarrier set index of the first station is determined based on an AID of the first station, a value of a starting AID in the first user information field, the EHT modulation bandwidth, and a quantity of stations scheduled by the NFRP trigger frame to feed back the HE TB NDP.

It can be learned that this solution provides a manner of determining a resource unit subcarrier set index of the EHT station, to support using the EHT TB NDP to feed back the report in the 802.11be standard.

According to a third aspect, this application provides a communication apparatus. The communication apparatus may be an AP or a chip in the AP, for example, a Wi-Fi chip. The communication apparatus includes: a transceiver unit, configured to send an NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, and the first user information field is used to schedule the first-type station to send an HE TB NDP in the HE modulation bandwidth, and send an EHT TB NDP in the EHT modulation bandwidth; and the transceiver unit is further configured to: receive, in the EHT modulation bandwidth, the EHT TB NDP from a first station in the first-type station; or receive, the HE TB NDP from the first station in the HE modulation bandwidth. The first-type station is an EHT station, and the second-type station is an HE station; and the first station in the first-type station can be any station that supports an 802.11be standard. The first user information field is the $1^{st}$ user information field following a common information field of the NFRP trigger frame, in other words, the first user information field is the $1^{st}$ user information field in a user information list.

Optionally, the communication apparatus further includes a processing unit, configured to generate the NFRP trigger frame.

Optionally, the NFRP trigger frame further includes a second user information field, and the second user information field includes an uplink bandwidth extension field and an association identifier (AID) 12 field. The uplink bandwidth extension field and an uplink bandwidth field of the NFRP trigger frame jointly indicate the EHT modulation bandwidth. In other words, the EHT modulation bandwidth indication information can be carried in the uplink bandwidth extension field in the second user information field and the uplink bandwidth field in the NFRP trigger frame. A value of the AID12 field of the second user information field is 2007.

With reference to the third aspect, in a possible implementation, the transceiver unit is specifically configured to receive the EHT TB NDP from the first station on a subcarrier corresponding to a resource unit subcarrier set index of the first station in the first-type station, where the resource unit subcarrier set index of the first station is in the EHT modulation bandwidth. The subcarrier corresponding to the resource unit subcarrier set index of the first station is determined based on an AID of the first station, a value of a starting AID in the first user information field, the EHT modulation bandwidth, and a quantity of stations scheduled by the NFRP trigger frame to feed back the HE TB NDP.

According to a fourth aspect, this application provides a communication apparatus. The communication apparatus may be a first station or a chip in the first station, for example, a Wi-Fi chip. The communication apparatus includes: a transceiver unit, configured to receive an NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, and the first user information field is used to schedule the first-type station to send an HE TB NDP in the HE modulation bandwidth, and send an EHT TB NDP in the EHT modulation bandwidth; the transceiver unit is further configured to send the EHT TB NDP if a resource for scheduling the communication apparatus by the NFRP trigger frame is in the EHT modulation bandwidth; and the transceiver unit is further configured to send the HE TB NDP if the resource for scheduling the communication apparatus by the NFRP trigger frame is in the HE modulation bandwidth. The first-type station is an EHT station, and the second-type station is an HE station; and the first station in the first-type station can be any station that supports an 802.11be standard. The first user information field is the $1^{st}$ user information field following a common information field of the NFRP trigger frame, in other words, the first user information field is the $1^{st}$ user information field in a user information list.

Optionally, the communication apparatus further includes a processing unit, configured to determine whether the resource for scheduling the communication apparatus by the NFRP trigger frame is in the EHT modulation bandwidth or in the HE modulation bandwidth.

Optionally, the NFRP trigger frame further includes a second user information field, and the second user information field includes an uplink bandwidth extension field and an association identifier (AID) 12 field. The uplink bandwidth extension field and an uplink bandwidth field of the NFRP trigger frame jointly indicate the EHT modulation bandwidth. In other words, the EHT modulation bandwidth indication information can be carried in the uplink bandwidth extension field in the second user information field and the uplink bandwidth field in the NFRP trigger frame. A value of the AID12 field of the second user information field is 2007.

With reference to the fourth aspect, in a possible implementation, the transceiver unit is specifically configured to send the EHT TB NDP on a subcarrier corresponding to a resource unit subcarrier set index of the communication apparatus. The resource unit subcarrier set index of the first station is determined based on an AID of the first station, a value of a starting AID in the first user information field, the EHT modulation bandwidth, and a quantity of stations scheduled by the NFRP trigger frame to feed back the HE TB NDP.

In a possible implementation of any one of the foregoing aspects, the first user information field is further used to, when scheduling the first-type station, schedule the second-type station to send the HE TB NDP in the HE modulation bandwidth. The second-type station is the HE station.

Optionally, an AID range of the station scheduled by the first user information field falls in a first range. The starting value of the first range is a first value, and the first value is the value of the starting AID field in the first user information field. An end value of the first range is a second value, and the second value is a sum of the value of the starting AID field, a quantity of stations scheduled by the NFRP trigger frame to feed back the HE TB NDP, and a quantity of first-type stations scheduled by the NFRP trigger frame to feed back the EHT TB NDP. The station scheduled by the NFRP trigger frame to feed back the HE TB NDP may be the HE STA, or may be the EHT STA. Therefore, the quantity of stations scheduled by the NFRP trigger frame to feed back the HE TB NDP includes a sum of a quantity of first-type stations scheduled by the NFRP trigger frame to feed back the HE TB NDP and a quantity of second-type stations scheduled by the NFRP trigger frame to feed back the HE TB NDP.

It can be learned that, in this solution, the first user information field is placed at the $1^{st}$ position in the user information list, to implement simultaneous scheduling of two types of stations (namely, the first-type station and the second-type station) to feed back the report.

In a possible implementation of any one of the foregoing aspects, the quantity of stations scheduled by the NFRP trigger frame to feed back the HE TB NDP is determined based on the HE modulation bandwidth and a value indicated by a spatially multiplexed user quantity field in the first user information field. The quantity of first-type stations scheduled by the NFRP trigger frame to feed back the EHT TB NDP is determined based on the EHT modulation bandwidth and the value indicated by the spatially multiplexed user quantity field in the first user information field.

Optionally, the quantity of stations scheduled by the NFRP trigger frame to feed back the HE TB NDP is an $N_{STA,HE-TB}$.

$$N_{STA,HE-TB} = 18 \times 2^{BW-HE_{index}} \times (\text{MultiplexingFlag}+1),$$

where

BW-HE represents the HE modulation bandwidth indicated by the uplink bandwidth field, and $BW\text{-}HE_{index}$ represents an index of the uplink bandwidth field. MultiplexingFlag indicates a value indicated by the spatially multiplexed user quantity field in the first user information field.

Optionally, the quantity of first-type stations scheduled by the NFRP trigger frame to feed back the EHT TB NDP is $N_{STA,EHT-TB}$.

$$N_{STA,EHT-TB} = 18 \times 2^{BW-EHT_{index}} \times (\text{MultiplexingFlag}+1),$$

where

MultiplexingFlag indicates the value indicated by the spatially multiplexed user quantity field in the first user information field.

$$BW-EHT_{index} = \log_2^{\left(\frac{BW-EHT}{20}\right)},$$

where

BW-EHT represents the EHT modulation bandwidth, and $BW\text{-}EHT_{index}$ represents an index of the EHT modulation bandwidth.

It can be learned that this solution provides a manner of calculating the quantity of first-type stations scheduled by the NFRP trigger frame to feed back the EHT TB NDP. This lays a foundation for a station to subsequently determine whether the station is scheduled by the NFRP trigger frame and determine a modulation bandwidth that a resource for scheduling the station is in.

In a possible implementation of any one of the foregoing aspects, the resource for scheduling the first station by the NFRP trigger frame is determined based on the AID of the first station and an indication of the first user information field.

Optionally, if the AID of the first station is greater than or equal to the value of the starting AID field in the first user information field, and is less than a sum of the value of the starting AID field and the quantity of stations ($N_{STA,HE-TB}$) scheduled by the NFRP trigger frame to feed back the HE TB NDP, the resource for scheduling the first station by the NFRP trigger frame is in the HE modulation bandwidth. If the AID of the first station is greater than or equal to the sum of the value of the starting AID field and the quantity of stations ($N_{STA,HE-TB}$) scheduled by the NFRP trigger frame to feed back the HE TB NDP, and is less than the sum of the value of the starting AID field, the quantity of stations ($N_{STA,HE-TB}$) scheduled by the NFRP trigger frame to feed back the HE TB NDP, and the quantity of first-type stations ($N_{STA,EHT-TB}$) scheduled by the NFRP trigger frame to feed back the EHT TB NDP, the resource for scheduling the first station by the NFRP trigger frame is in the EHT modulation bandwidth.

It can be learned that in this solution, the AID of the first station is compared with the starting AID, to determine a location of the resource for scheduling the first station, so as to send a corresponding TB NDP, and further restrict behavior of the EHT station or restrict feedback of the EHT station.

In a possible implementation of any one of the foregoing aspects, the resource unit subcarrier set index of the first station is $RU\_TONE\_SET\_INDEX_{EHT}$.

$RU\_TONE\_SET\_INDEX_{EHT}=1+N_{STA,HE\text{-}TB}+$
$((AID_{STA}-\text{Starting AID}-N_{STA,HE\text{-}TB})\bmod$
$(18\times 2^{BW\text{-}EHTindex}))$, where $N_{STA,HE\text{-}TB}$ represents the quantity of stations scheduled by the NFRP trigger frame to feed back the HE TB NDP. $AID_{STA}$ represents the association identifier of the first station. Starting AID represents the value of the starting AID field in the first user information field.

$$BW-EHT_{index} = \log_2\left(\frac{BW-EHT}{20}\right),$$

where

BW-EHT represents the EHT modulation bandwidth, and $BW\text{-}EHT_{index}$ represents an index of the EHT modulation bandwidth.

Optionally, in an 802.11ax standard, resource unit subcarrier set indexes are all numbered in ascending order of frequencies, in other words, a smaller resource unit subcarrier set index in the HE modulation bandwidth indicates a lower corresponding frequency. A larger resource unit subcarrier set index indicates a higher frequency. Therefore, the resource unit subcarrier set index in the EHT modulation bandwidth is also numbered in ascending order of frequencies, and the resource unit subcarrier set index in the EHT modulation bandwidth is greater than the resource unit subcarrier set index in the HE modulation bandwidth.

Optionally, a mapping relationship between the resource unit subcarrier set index of the first station and a resource unit subcarrier set index in an 80 MHz bandwidth with a lowest frequency in the HE modulation bandwidth in the 802.11ax protocol is as follows:

$RU\_TONE\_SET\_INDEX_{HE,80}=RU\_TONE\_$
$SET\_INDEX_{EHT}-(BW\text{-}HE/80+M)\times 72$, where $RU\_TONE\_SET\_INDEX_{HE,80}$ represents the resource unit subcarrier set index in the 80 MHz bandwidth with the lowest frequency in the HE modulation bandwidth in the 802.11ax protocol. $RU\_TONE\_SET\_INDEX_{EHT}$ represents the resource unit subcarrier set index of the first station. BW-HE represents the HE modulation bandwidth. The M indicates an 80 MHz index of $RU\_TONE\_SET\_INDEX_{EHT}$. M is one value in 0, 1, 2, and 3. When M is set to 0, 1, 2, or 3, M represents respectively four 80 MHz bandwidths in ascending order of frequencies in the EHT modulation bandwidth.

It can be learned that this solution provides a manner of calculating a resource unit subcarrier set index in the EHT modulation bandwidth, a numbering manner of the resource unit subcarrier set index in the EHT modulation bandwidth, and a mapping relationship between the resource unit subcarrier set index in the EHT modulation bandwidth and the resource unit subcarrier set index in the 80 MHz bandwidth with the lowest frequency in the HE modulation bandwidth in the 802.11ax protocol, and can support the EHT station to feed back the EHT TB NDP on the corresponding subcarrier.

In a possible implementation of any one of the foregoing aspects, the NFRP trigger frame may further include preamble puncturing indication information, and the preamble puncturing indication information indicates a punctured channel. The preamble puncturing indication information may be located in a reserved bit of the first user information field. Because the HE station does not support the HE TB NDP transmission with preamble puncturing, the HE modulation bandwidth in this application is an HE PPDU bandwidth. However, the EHT modulation bandwidth in this application is not necessarily an EHT PPDU bandwidth. In a case of the preamble puncturing, the EHT modulation bandwidth refers to an actual transmission bandwidth, to be specific, the EHT modulation bandwidth is a bandwidth obtained by removing the punctured channel indicated by the preamble puncturing indication information from the EHT PPDU bandwidth.

In a possible implementation of any one of the foregoing aspects, the NFRP trigger frame may further include the preamble puncturing indication information, and the preamble puncturing indication information indicates the punctured channel. The preamble puncturing indication information may be located in the reserved bit of the first user information field. When the EHT modulation bandwidth is understood as the EHT PPDU bandwidth, the first station can send the EHT TB NDP only if the resource for scheduling the first station by the NFRP trigger frame is in the EHT modulation bandwidth and is not on the punctured channel indicated by the preamble puncturing indication information. On the contrary, if the resource for scheduling the first station by the NFRP trigger frame is in the EHT modulation bandwidth and is on the punctured channel indicated by the preamble puncturing indication information, the first station neither sends the EHT TB NDP nor sends the HE TB NDP. In other words, the first station does not need to give feedback.

It can be learned that this solution provides a manner of feeding back a report by the EHT station in a case of the preamble puncturing, to support a preamble puncturing feature.

According to a fifth aspect, this application provides a trigger based null data packet transmission method, and the method includes: sending, by an AP, an NFRP trigger frame, where the NFRP trigger frame includes a second user information field and one or more third user information fields; and a third user information field is used to schedule a first-type station in a preset AID range starting from a starting AID of the third user information field to feed back an EHT TB NDP; and receiving, by the AP, the EHT TB NDP from a first station in the first-type station. A value of an AID12 field in the second user information field is 2007. The one or more third user information fields are located after the second user information field. The AID of the first station falls in a preset AID range starting from a starting AID of a $j^{th}$ third user information field. The EHT TB NDP is determined based on the second user information field and the $j^{th}$ third user information field. j is greater than or equal to 1, and is less than or equal to a quantity of third user information fields included in the NFRP trigger frame. The first-type station is an EHT station, and the first station in the first-type station can be any station that supports an 802.11be standard.

It can be learned that, in this solution, a user information field is separately designed for the first-type station (the EHT station), to schedule the first-type station to send the EHT TB NDP in an EHT modulation bandwidth. This can not only schedule the EHT station to send the EHT TB NDP to feed back a report, and support the NDP feedback report procedure in the 802.11be standard, but also ensure a clear meaning thereof.

Optionally, the NFRP trigger frame further includes a fourth user information field, and the fourth user information field is located before the second user information field. The fourth user information field is the $1^{st}$ user information field following a common information field of the NFRP trigger frame, in other words, the fourth user information field is the $1^{st}$ user information field in a user information list. The fourth user information field is used to schedule a second-type station in a preset AID range starting from the starting AID of the fourth user information field to feed back an HE TB NDP. The second-type station is an HE station.

It can be learned that, in this solution, the user information field (in other words, the fourth user information field) scheduling the HE station is placed before a special user information field (in other words, the second user information field). The user information field (in other words, the third user information field) separately designed for the first-type station is located after the special user information field (in other words, the second user information field). A same NFRP trigger frame can be used not only to simultaneously schedule two types of stations (in other words, the first-type station and the second-type station) to feed back the report, but also to avoid impact on the feedback of the HE station when the EHT station is scheduled by the NFRP trigger frame.

With reference to the fifth aspect, in a possible implementation, the receiving, by the access point, the EHT TB NDP from a first station in the first-type station includes: receiving, by the access point, the EHT TB NDP on a subcarrier corresponding to a resource unit subcarrier set index of the first station in the first-type station, where the subcarrier corresponding to the resource unit subcarrier set index of the first station is in the EHT modulation bandwidth corresponding to the $j^{th}$ third user information field; and determining the resource unit subcarrier set index of the first station based on the AID of the first station, a value of the starting AID in the $j^{th}$ third user information field, and the EHT modulation bandwidth.

According to a sixth aspect, this application provides a trigger based null data packet transmission method, applied to a first-type station, and the method includes: receiving, by a first station in a first-type station, an NFRP trigger frame, and determining whether an AID of the first station falls in a preset AID range starting from the starting AID of a third user information field included in the NFRP trigger frame, where the NFRP trigger frame includes a second user information field and one or more third user information fields, and a third user information field is used to schedule a first-type station in the preset AID range starting from the starting AID of the third user information field to feed back an EHT TB NDP; and sending, by the first station, the EHT TB NDP based on the second user information field and a $j^{th}$ third user information field if an AID of the first station falls in a preset AID range starting from a starting AID of the $j^{th}$ third user information field. A value of an AID12 field in the second user information field is 2007. The one or more third user information fields are located after the second user information field. j is greater than or equal to 1, and is less than or equal to a quantity of third user information fields included in the NFRP trigger frame. The first-type station is an EHT station, and the first station in the first-type station can be any station that supports an 802.11be standard.

It can be learned that, in this solution, a user information field is separately designed for the first-type station (the EHT station), to schedule the first-type station to send the EHT TB NDP in an EHT modulation bandwidth. This can not only schedule the EHT station to send the EHT TB NDP to feed back a report, and support the NDP feedback report procedure in the 802.11be standard, but also ensure a clear meaning thereof.

Optionally, the NFRP trigger frame further includes a fourth user information field, and the fourth user information field is located before the second user information field. The fourth user information field is the $1^{st}$ user information field following a common information field of the NFRP trigger frame, in other words, the fourth user information field is the $1^{st}$ user information field in a user information list. The fourth user information field is used to schedule a second-type station in a preset AID range starting from the starting AID of the fourth user information field to feed back an HE TB NDP. The second-type station is an HE station.

With reference to the sixth aspect, in a possible implementation, the sending, by the first station, the EHT TB NDP based on the second user information field and the $j^{th}$ third user information field includes: sending, by the first station, the EHT TB NDP on a subcarrier corresponding to a resource unit subcarrier set index of the first station based on the second user information field and the $j^{th}$ third user information field. The resource unit subcarrier set index of the first station is determined based on the AID of the first station, a value of the starting AID of the $j^{th}$ third user information field, and the EHT modulation bandwidth.

It can be learned that, for a case in which a user information field is separately designed for the first-type station (the EHT station), this solution provides a manner of determining a resource unit subcarrier set index of the EHT station, to support using the EHT TB NDP to feed back the report in the 802.11be standard.

According to a seventh aspect, this application provides a communication apparatus. The communication apparatus may be an AP or a chip in the AP, for example, a Wi-Fi chip. The communication apparatus includes: a transceiver unit, configured to send an NFRP trigger frame, where the NFRP trigger frame includes a second user information field and one or more third user information fields, and a third user information field is used to schedule a first-type station in a preset AID range starting from a starting AID of the third user information field to feed back an EHT TB NDP; and the transceiver unit is further configured to receive the EHT TB NDP from a first station in the first-type station. A value of an AID12 field in the second user information field is 2007. The one or more third user information fields are located after the second user information field. The AID of the first station falls in a preset AID range starting from a starting AID of a $j^{th}$ third user information field. The EHT TB NDP is determined based on the second user information field and the $j^{th}$ third user information field. j is greater than or equal to 1, and is less than or equal to a quantity of third user information fields included in the NFRP trigger frame. The first-type station is an EHT station, and the first station in the first-type station can be any station that supports an 802.11be standard.

Optionally, the communication apparatus further includes a processing unit, configured to generate the NFRP trigger frame.

Optionally, the NFRP trigger frame further includes a fourth user information field, and the fourth user information field is located before the second user information field. The fourth user information field is the $1^{st}$ user information field following a common information field of the NFRP trigger frame, in other words, the fourth user information field is the $1^{st}$ user information field in a user information list. The fourth user information field is used to schedule a second-type station in a preset AID range starting from the starting AID of the fourth user information field to feed back an HE TB NDP. The second-type station is an HE station.

With reference to the seventh aspect, in a possible implementation, the transceiver unit is further configured to receive the EHT TB NDP from the first station on a subcarrier corresponding to a resource unit subcarrier set index of the first station in the first-type station. The subcarrier corresponding to the resource unit subcarrier set index of the first station is in the EHT modulation bandwidth corresponding to the $j^{th}$ third user information field. The resource unit subcarrier set index of the first station is determined based on the AID of the first station, a value of the starting AID in the $j^{th}$ third user information field, and the EHT modulation bandwidth.

According to an eighth aspect, this application provides a communication apparatus. The communication apparatus may be a first station or a chip in the first station, for example, a Wi-Fi chip. The communication apparatus includes: a transceiver unit, configured to receive an NFRP trigger frame, where the NFRP trigger frame includes a second user information field and one or more third user information fields, and a third user information field is used to schedule a first-type station in a preset AID range starting from a starting AID of the third user information field to feed back an EHT TB NDP; and the transceiver unit is further configured to send the EHT TB NDP based on the second user information field and a $j^{th}$ third user information field if an AID of the communication apparatus falls in a preset AID range starting from a starting AID of the $j^{th}$ third user information field. A value of an AID12 field in the second user information field is 2007. The one or more third user information fields are located after the second user information field. j is greater than or equal to 1, and is less than or equal to a quantity of third user information fields included in the NFRP trigger frame. The first-type station is an EHT station, and the first station in the first-type station can be any station that supports an 802.11be standard.

Optionally, the communication apparatus further includes a processing unit, configured to determine whether the AID of the communication apparatus falls in the preset AID range starting from the starting AID of the $j^{th}$ third user information field.

Optionally, the NFRP trigger frame further includes a fourth user information field, and the fourth user information field is located before the second user information field. The fourth user information field is the $1^{st}$ user information field following a common information field of the NFRP trigger frame, in other words, the fourth user information field is the $1^{st}$ user information field in a user information list. The fourth user information field is used to schedule a second-type station in a preset AID range starting from the starting AID of the fourth user information field to feed back an HE TB NDP. The second-type station is an HE station.

With reference to the eighth aspect, in a possible implementation, the transceiver unit is specifically configured to send, based on the second user information field and the $j^{th}$ third user information field, the EHT TB NDP on the subcarrier corresponding to the resource unit subcarrier set index of the first station. The resource unit subcarrier set index of the first station is determined based on the AID of the first station, a value of the starting AID of the $j^{th}$ third user information field, and the EHT modulation bandwidth.

In a possible implementation of any one of the foregoing aspects, an AID range of the first-type station scheduled by the third user information field starts from a value of the starting AID field in the third user information field and ends with a sum of the value of the starting AID field and a quantity of first-type stations scheduled by the third user information field. In other words, the AID range (in other words, the preset AID range) of the first-type station scheduled by the third user information field is greater than or equal to the value of the starting AID field, and is less than the quantity of first-type stations scheduled by the third user information field. To sum up, the AID range is an interval [starting AID, starting AID+quantity of first-type stations scheduled by the third user information field).

It can be learned that, for a case in which a user information field is separately designed for the first-type station (the EHT station), this solution provides a manner of determining a scheduling range, to lay a foundation for the EHT station to subsequently determine whether the EHT station is scheduled, In a possible implementation of any one of the foregoing aspects, the third user information field includes the starting AID field, one or more reserved fields, a feedback type field, an uplink target received signal strength indication field, and a spatially multiplexed user quantity field. The starting AID field indicates the $1^{st}$ AID in the scheduled preset AID range.

It can be learned that, in this solution, the user information field (the third user information field) separately designed for the first-type station (the EHT station) is the same as the user information field scheduling the HE station in terms of a frame format. Meanings of subfields included in the user information field in the original NFRP trigger frame can be reused, without being redefined.

Optionally, the second user information field further includes an uplink bandwidth extension field, and the uplink bandwidth extension field and an uplink bandwidth field of the NFRP trigger frame jointly indicate the EHT modulation bandwidth.

Optionally, the quantity of first-type stations scheduled by the third user information field is determined based on the EHT modulation bandwidth jointly indicated by the uplink bandwidth extension field and the uplink bandwidth field, and a value indicated by the spatially multiplexed user quantity field in the third user information field.

It can be learned that for a case in which a frame format of a user information field (a third user information field) separately designed for the first-type station (the EHT station) is the same as the user information field scheduling the HE station, this solution provides a manner of calculating the quantity of first-type stations scheduled by the NFRP trigger frame to feed back the EHT TB NDP. This lays a foundation for a station to subsequently determine whether the station is scheduled by the NFRP trigger frame.

In a possible implementation of any one of the foregoing aspects, the third user information field includes the starting AID field, the EHT modulation bandwidth indication field, the one or more reserved fields, the feedback type field, the uplink target received signal strength indication field, and the spatially multiplexed user quantity field. The starting AID field indicates the $1^{st}$ AID in the scheduled preset AID range. The EHT modulation bandwidth indication field indicates the EHT modulation bandwidth of the first-type station scheduled by the third user information field.

Optionally, the EHT modulation bandwidth indication field includes at least two of the following: a starting 20 MHz sub-channel, a quantity of 20 MHz sub-channels, and an end 20 MHz sub-channel. The starting 20 MHz sub-channel indicates a starting frequency of the EHT modulation bandwidth, the quantity of 20 MHz sub-channels indicates a size of the EHT modulation bandwidth, and the end 20 MHz sub-channel indicates an end frequency of the EHT modulation bandwidth.

It can be learned that, in this solution, the user information field (the third user information field) separately designed for the first-type station (the EHT station) in this solution is different from the user information field scheduling the HE station in terms of the frame format. In addition, each third user information field includes an EHT modulation bandwidth allocated to a group of EHT stations scheduled by the third user information field, and a same NFRP trigger frame can be used to schedule a plurality of groups of EHT stations to give feedback at the same time.

Optionally, the quantity of first-type stations scheduled by the third user information field is determined based on the EHT modulation bandwidth indicated by the EHT modulation bandwidth indication field in the third user information field, and the value indicated by the spatially multiplexed user quantity field in the third user information field.

It can be learned that for a case in which a frame format of a user information field (a third user information field) separately designed for the first-type station (the EHT station) is different from the user information field scheduling the HE station, this solution provides a manner of calculating the quantity of first-type stations scheduled by the NFRP trigger frame to feed back the EHT TB NDP. This lays a foundation for a station to subsequently determine whether the station is scheduled by the NFRP trigger frame.

In a possible implementation of any one of the foregoing aspects, a quantity of first-type stations scheduled by the $j^{th}$ third user information field is $N_{STA,EHT-TB,G}$.

$$N_{STA,EHT-TB,G} = 18 \times 2^{BW-EHT_{index,G}} \times (\text{MultiplexingFlag}+1), \text{ where}$$

MultiplexingFlag represents a value indicated by a spatially multiplexed user quantity field in the $j^{th}$ third user information field;

$$BW - EHT_{index,Gj} = \log_2\left(\frac{BW - EHT_{Gj}}{20}\right) = \log_2 N_{20MHz,Gj},$$

where

BW-EHT$_{Gj}$ represents the foregoing EHT modulation bandwidth indicated by the EHT modulation bandwidth indication field in the $j^{th}$ third user information field, or the EHT modulation bandwidth jointly indicated by the uplink bandwidth extension field and the uplink bandwidth field. BW-EHT$_{index,Gj}$ represents an index of the EHT modulation bandwidth corresponding to the $j^{th}$ third user information field. Gj represents a group of EHT stations scheduled by the $j^{th}$ third user information field. BW-EHT$_{Gj}$ can further represent the EHT modulation bandwidth allocated by the AP to the group of EHT stations scheduled by the $j^{th}$ third user information field. The group of EHT stations herein includes a case in which there is only one EHT station.

In a possible implementation of any one of the foregoing aspects, the resource unit subcarrier set index of the first station is RU_TONE_SET_INDEX$_{Gj}$.

RU_TONE_SET_INDEX$_{Gj}$=1+((AID$_{STA}$−Starting AID$_{Gj}$)mod(18×2$^{BW-EHT_{index,Gj}}$)), where AID$_{STA}$ represents the association identifier of the first station. Starting AID$_{Gj}$ represents the value of the starting AID field in the $j^{th}$ third user information field.

$$BW - EHT_{index,Gj} = \log_2\left(\frac{BW - EHT_{Gj}}{20}\right) = \log_2 N_{20MHz,Gj},$$

BW-EHT$_{Gj}$ represents the foregoing EHT modulation bandwidth indicated by the EHT modulation bandwidth indication field in the $j^{th}$ third user information field, or the EHT modulation bandwidth jointly indicated by the uplink bandwidth extension field and the uplink bandwidth field. BW-EHT$_{index,Gj}$ represents the index of the EHT modulation bandwidth corresponding to the $j^{th}$ third user information field. Gj represents the group of EHT stations scheduled by the $j^{th}$ third user information field. BW-EHT$_{Gj}$ can further represent the EHT modulation bandwidth allocated by the AP to the group of EHT stations scheduled by the $j^{th}$ third user information field. The group of EHT stations herein includes a case in which there is only one EHT station.

In a possible implementation of any one of the foregoing aspects, a mapping relationship between the resource unit subcarrier set index of the foregoing first station and the resource unit subcarrier set index in an 80 MHz bandwidth with a lowest frequency in the HE modulation bandwidth in the 802.11ax protocol is as follows:

RU_TONE_SET_INDEX$_{HE,80}$=RU_TONE_SET_INDEX$_{Gj}$−N$_{STA,HE-TB}$−(18×(Multiplexing+1))×N$_{S20,Gj-S20,EHT}$), where RU_TONE_SET_INDEX$_{HE,80}$ represents the resource unit subcarrier set index in the 80 MHz bandwidth with the lowest frequency in the HE modulation bandwidth in the 802.11ax protocol. RU_TONE_SET_INDEX$_{EHT}$ represents the resource unit subcarrier set index of the first station. N$_{STA,HE-TB}$ represents the quantity of second-type stations scheduled by the NFRP trigger frame to feed back the HE TB NDP. MultiplexingFlag represents a value indicated by a spatially multiplexed user quantity field in the $j^{th}$ third user information field. N$_{S20,Gj-S20,EHT}$ indicates the quantity of 20 MHz channels between a starting 20 MHz sub-channel in the EHT modulation bandwidth corresponding to the $j^{th}$ third user information field and a 20 MHz sub-channel with a lowest frequency in the entire EHT modulation bandwidth of all first-type stations scheduled by the NFRP trigger frame. j is greater than or equal to 1, and is less than or equal to the quantity of third user information fields included in the NFRP trigger frame.

According to a ninth aspect, this application provides a communication apparatus, specifically the AP according to the first aspect or the fifth aspect, including a processor and a transceiver.

In a design, the transceiver is configured to send an NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, the first user information field is the $1^{st}$ user information field following a common information field of the NFRP trigger frame, and the first user information field is used to schedule a first-type station to send an HE TB NDP in the HE modulation bandwidth, and send an EHT TB NDP in the EHT modulation bandwidth; the transceiver is further configured to receive, in the EHT modulation bandwidth, the EHT TB NDP from a first station in the first-type station, or receive, in the HE modulation bandwidth, an HE TB NDP from the first station.

Optionally, the processor is configured to generate the NFRP trigger frame.

In another design, the transceiver is configured to send the NFRP trigger frame, where the NFRP trigger frame includes a second user information field and one or more third user information fields, a value of an AID12 field in the second user information field is 2007, the one or more third user information fields are located after the second user information field, and a third user information field is used to schedule the first-type station in a preset AID range starting from a starting AID of the third user information field to feed back the EHT TB NDP; and the transceiver is further configured to receive the EHT TB NDP from the first station in the first-type station, where an AID of the first station falls in a preset AID range starting from a starting AID of a $j^{th}$ third user information field, the EHT TB NDP is determined based on the second user information field and the $j^{th}$ third user information field, and j is greater than or equal to 1, and is less than or equal to a quantity of third user information fields included in the NFRP trigger frame.

Optionally, the processor is configured to generate the NFRP trigger frame.

According to a tenth aspect, this application provides a communication apparatus, specifically the first station according to the second aspect or the sixth aspect, including a processor and a transceiver.

In a design, a transceiver is configured to receive an NFRP trigger frame, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, the first user information field is the $1^{st}$ user information field following a common information field of the NFRP trigger frame, and the first user information field is used to schedule a first-type station to send an HE TB NDP in the HE modulation bandwidth, and send an EHT TB NDP in the EHT modulation bandwidth; and the transceiver is further configured to send the EHT TB NDP if a resource for scheduling the communication apparatus by the NFRP trigger frame is in the EHT modulation bandwidth; or the transceiver is further configured to send the HE TB NDP if the resource for scheduling the communication apparatus by the NFRP trigger frame is in the HE modulation bandwidth.

Optionally, the processor is configured to determine whether the resource for scheduling the communication apparatus by the NFRP trigger frame is in the EHT modulation bandwidth or in the HE modulation bandwidth.

In another design, the transceiver is configured to receive the NFRP trigger frame, where the NFRP trigger frame includes a second user information field and one or more third user information fields, a value of an AID12 field in the second user information field is 2007, the one or more third user information fields are located after the second user information field, and a third user information field is used to schedule the first-type station in a preset AID range starting from a starting AID of the third user information field to feed back the EHT TB NDP; and the transceiver is further configured to send the EHT TB NDP based on the second user information field and a $j^{th}$ third user information field when an AID of the communication apparatus falls in a preset AID range starting from a starting AID of the $j^{th}$ third user information field, where j is greater than or equal to 1, and is less than or equal to a quantity of third user information fields included in the NFRP trigger frame.

Optionally, the processor is configured to determine whether the AID of the communication apparatus falls in the preset AID range starting from the starting AID of the $j^{th}$ third user information field.

According to an eleventh aspect, this application provides an apparatus. The apparatus is implemented in a product form of a chip, including an input/output interface and a processing circuit. The apparatus is a chip in the AP according to the first aspect or the fifth aspect.

In a design, the input/output interface is configured to: output an NFRP trigger frame, process the NFRP trigger frame through a radio frequency circuit, and send the NFRP trigger frame through an antenna, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, the first user information field is the $1^{st}$ user information field following a common information field of the NFRP trigger frame, and the first user information field is used to schedule a first-type station to send an HE TB NDP in the HE modulation bandwidth, and send an EHT TB NDP in the EHT modulation bandwidth; the input/output interface is further configured to input the EHT TB NDP that is received from a first station in the first-type station in the EHT modulation bandwidth through the antenna and the radio frequency circuit, or input the HE TB NDP that is received in the HE modulation bandwidth from the first station through the antenna and the radio frequency circuit.

Optionally, the processor circuit is configured to generate the NFRP trigger frame.

In another design, the input/output interface is configured to: output the NFRP trigger frame, process the NFRP trigger frame through the radio frequency circuit, and send the NFRP trigger frame through the antenna, where the NFRP trigger frame includes a second user information field and one or more third user information fields, a value of an AID12 field in the second user information field is 2007, the one or more third user information fields are located after the second user information field, and a third user information field is used to schedule the first-type station in a preset AID range starting from a starting AID of the third user information field to feed back the EHT TB NDP; and the input/output interface is further configured to receive the EHT TB NDP from the first station in the first-type station through the antenna and the radio frequency circuit, where an AID of the first station falls in a preset AID range starting from a starting AID of a $j^{th}$ third user information field, the EHT TB NDP is determined based on the second user information field and the $j^{th}$ third user information field, and j is greater than or equal to 1, and is less than or equal to a quantity of third user information fields included in the NFRP trigger frame.

Optionally, the processor circuit is configured to generate the NFRP trigger frame.

According to a twelfth aspect, this application provides an apparatus. The apparatus is implemented in a product form of a chip, and includes an input/output interface and a processing circuit. The apparatus is a chip in the first station according to the second aspect or the sixth aspect.

In a design, the input/output interface is configured to input an NFRP trigger frame received through an antenna and a radio frequency circuit, where the NFRP trigger frame includes HE modulation bandwidth indication information and EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, the first user information field is the 1st user information field following a common information field of the NFRP trigger frame, and the first user information field is used to schedule a first-type station to send an HE TB NDP in the HE modulation bandwidth, and send an EHT TB NDP in the EHT modulation bandwidth; the input/output interface is further configured to: when a resource for scheduling the communication apparatus by the NFRP trigger frame is in the EHT modulation bandwidth, output the EHT TB NDP, process the EHT TB NDP through the radio frequency circuit, and send the EHT TB NDP through the antenna; and the input/output interface is further configured to: when the resource for scheduling the communication apparatus by the NFRP trigger frame is in the HE modulation bandwidth, output the HE TB NDP, process the HE TB NDP through the radio frequency circuit, and send the HE TB NDP through the antenna.

Optionally, the processing circuit is configured to determine whether the resource for scheduling the communication apparatus by the NFRP trigger frame is in the EHT modulation bandwidth or in the HE modulation bandwidth.

In another design, the input/output interface is configured to input the NFRP trigger frame received through the antenna and the radio frequency circuit, where the NFRP trigger frame includes a second user information field and one or more third user information fields, a value of an AID12 field in the second user information field is 2007, the one or more third user information fields are located after the second user information field, and a third user information field is used to schedule the first-type station in a preset AID range starting from a starting AID of the third user information field to feed back the EHT TB NDP; and the input/output interface is further configured to: when the AID of the communication apparatus falls in a preset AID range starting from a starting AID of a $j^{th}$ third user information field, output the EHT TB NDP, process the EHT TB NDP through the radio frequency circuit, and send the EHT TB NDP through the antenna. j is greater than or equal to 1, and is less than or equal to a quantity of third user information fields included in the NFRP trigger frame.

Optionally, the processing circuit is configured to determine whether the AID of the communication apparatus falls in the preset AID range starting from the starting AID of the $j^{th}$ third user information field.

According to a thirteenth aspect, this application provides a computer-readable storage medium, where the computer-readable storage medium stores program instructions. When the program instructions are run on a computer, the computer is enabled to perform the trigger based null data packet transmission method according to the first aspect, the second aspect, the fifth aspect, or the sixth aspect.

According to a fourteenth aspect, this application provides a computer program product including program instructions. When the computer program product runs on a computer, the computer is enabled to perform the trigger based null data packet transmission method according to the first aspect, the second aspect, the fifth aspect, or the sixth aspect.

Implementing embodiments of this application, in one aspect, may schedule the EHT station to send the EHT TB NDP or the HE TB NDP to feed back the report, support a larger bandwidth of 320 MHz, and support a feature such as the preamble puncturing; and in another aspect, may simultaneously schedule two types of stations (in other words, the HE station and the EHT station) to send an aggregated PPDU (A-PPDU) of the HE TB NDP and the EHT TB NDP, to simultaneously feed back the report.

BRIEF DESCRIPTION OF DRAWINGS

To describe technical solutions in embodiments of this application more clearly, the following briefly describes the accompanying drawings that need to be used in embodiment descriptions.

FIG. 6A and FIG. 6B are a schematic diagram of a possible frame format of an 802.11be trigger frame;

FIG. 11a-1 and FIG. 11a-2 are a schematic diagram 2 of a frame format of an NFRP trigger frame according to an embodiment of this application;

FIG. 11b-1 and FIG. 11b-2 are a schematic diagram 3 of a frame format of an NFRP trigger frame according to an embodiment of this application;

DESCRIPTION OF EMBODIMENTS

Figure 1:
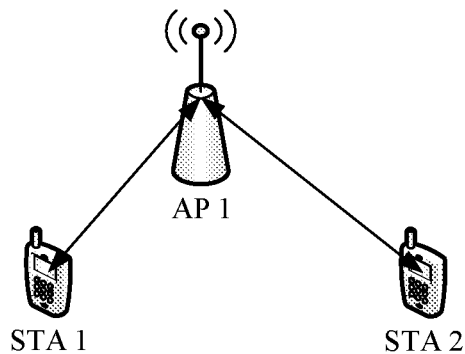
FIG. 1 is a schematic diagram of an architecture of a wireless communication system according to an embodiment of this application.

The following clearly describes technical solutions in embodiments of this application with reference to the accompanying drawings in embodiments of this application.

In descriptions of this application, unless otherwise specified, "/" means "or". For example, A/B may indicate A or B. In this specification, "and/or" describes only an association relationship for describing associated objects and indicates that three relationships may exist. For example, A and/or B may represent the following three cases: Only A exists, both A and B exist, and only B exists. In addition, "at least one" means one or more and "a plurality of" means two or more. The terms such as "first" and "second" do not limit a quantity or an execution sequence, and the terms such as "first" and "second" do not indicate a definite difference.

In this application, the term "example" or "for example" is used to represent giving an example, an illustration, or a description. Any embodiment or design scheme described as "example", "such as" or "for example" in this application should not be explained as being more preferred or having more advantages than another embodiment or design scheme. Exactly, use of the terms such as "example", "such as" or "for example" is intended to present a relative concept in a specific manner.

For ease of understanding the method according to embodiments of this application, the following describes a system architecture of the method according to embodiments of this application. It can be understood that the system architecture described in embodiments of this application aims to describe the technical solutions in embodiments of this application more clearly, but are not intended to limit the technical solutions provided in embodiments of this application.

An embodiment of this application provides a trigger based null data packet transmission method. A frame format of the 1$^{st}$ user information field in a user information list field of an original NFRP trigger frame is reused to simultaneously schedule an HE station and an EHT station to send an HE TB NDP in an HE modulation bandwidth to respond to an NFRP trigger frame, and schedule the EHT station to send an EHT TB NDP in an EHT modulation bandwidth to respond to the NFRP trigger frame. The EHT station determines whether a resource for scheduling the EHT station is in the HE modulation bandwidth or the EHT modulation bandwidth, to determine whether the HE TB NDP or the EHT TB NDP is sent, so that the EHT station may be scheduled to send the EHT TB NDP to feed back a report, and support an NDP feedback report procedure in an 802.11be standard. The trigger based null data packet transmission method can be applied to a wireless communication system, for example, a wireless local area network system. The method may be implemented by a communication device in the wireless communication system, or a chip or a processor in the communication device. The communication device may be an access point device or a station device.

The technical solutions provided in this application may be applied to communication systems, for example, a system that uses an 802.11 standard. For example, the 802.11 standard includes but is not limited to: The 802.11be standard, or a further next generation 802.11 standard. A scenario to which the technical solutions of this application are applicable includes communication between an AP and one or more STAs. In embodiments of this application, the term "communication" may also be described as "data transmission", "information transmission", or "transmission".

FIG. 1 is a schematic diagram of an architecture of a wireless communication system according to an embodiment of this application. As shown in FIG. 1, the wireless communication system may include one or more APs (for example, an AP 1 in FIG. 1) and one or more STAs (for example, a STA 1 and a STA 2 in FIG. 1). The AP and the STA support a WLAN communication protocol. The communication protocol may include 802.11be (or referred to as Wi-Fi 7, EHT protocol), and may further include protocols such as 802.11ax and 802.11ac. Certainly, with continuous evolution and development of communication technologies, the communication protocol may further include a next generation protocol of 802.11be and the like. The following uses the WLAN as an example. An apparatus for implementing the method in this application may be an AP or a STA in the WLAN, or a chip or a processing system installed in the AP or the STA.

Optionally, an access point (for example, the AP 1 in FIG. 1) in this application is an apparatus with a wireless communication function, supports communication through a WLAN protocol, and has a function of communicating with another device (for example, a station or another access point) in a WLAN network. Certainly, a function of communicating with another device can further be included. In a WLAN system, an access point may be referred to as an access point station (AP STA). The apparatus with the wireless communication function may be a device as a whole machine, or may be a chip, a processing system, or the like, installed in the device as a whole machine. Devices in which these chips or processing systems are installed may implement the method and function in embodiments of this application under control of the chip or the processing system. The AP in embodiments of this application is an apparatus that provides a service for the STA, and may support 802.11 series protocols. For example, the AP may be a communication entity such as a communication server, a router, a switch, or a bridge; the AP may include various forms of macro base stations, micro base stations, relay stations, and the like. Certainly, the AP may alternatively be a chip and a processing system in these various forms of devices, so as to implement the method and function in embodiments of this application.

Optionally, a station (for example, the STA 1 or the STA 2 in FIG. 1) in this application is an apparatus with the wireless communication function, supports communication through the WLAN protocol, and has a capability of communicating with another station or another access point in the WLAN network. In the WLAN system, a station may be referred to as a non-access point station (non-AP STA). For example, the STA can be any user communication device that allows a user to communicate with an AP and further communicate with a WLAN. The apparatus with the wireless communication function may be a device as a whole machine, or may be a chip, a processing system, or the like, installed in the device as a whole machine. Devices in which these chips or processing systems are installed may implement the method and function in embodiments of this application under control of the chip or the processing system. For example, the STA may be a user equipment that can be connected to the internet, such as a tablet computer, a desktop computer, a laptop computer, a notebook computer, an ultra-mobile personal computer (UMPC), a handheld computer, a netbook, a personal digital assistant (PDA), a mobile phone, or an internet of things node in the internet of things, or an in-vehicle communication apparatus in the internet of vehicles, or an entertainment device, a game device or system, or a device with a global positioning system. Furthermore, the STA may be a chip and a processing system in the foregoing terminals.

The WLAN system can provide high-rate and low-latency transmission. With continuous evolution of WLAN application scenarios, the WLAN system will be applied to more scenarios or industries, including an internet of things industry, an internet of vehicles industry, a banking industry, an enterprise office, a stadium, a venue, a concert hall, a hotel room, a dormitory, a ward, a classroom, a supermarket, a square, a street, a workshop, a storage warehouse, and the like. Certainly, a device that supports the WLAN communication (for example, an access point or a station) may be a sensor node in a smart city (for example, a smart water meter, a smart electricity meter, and a smart air detection node), a smart device in a smart home (for example, a smart camera, a projector, a display screen, a television set, a stereo, a refrigerator, and a washing machine), a node in the internet of things, an entertainment terminal, (for example, a wearable device such as an augmented reality (AR) device, or a virtual reality (VR) device), a smart device in a smart office (for example, a printer, a projector, a loudspeaker, and a stereo), an internet of vehicle device in the internet of vehicles, an infrastructure facility in a daily scenario (for example, a vending machine, a self-service navigation desk in a supermarket, a self-service cashier register, or a self-service ordering machine), or a device for a large sports stadium or music venue. A specific form of the STA and the AP is not limited in embodiments of this application, but is merely an example for description herein.

Figure 2A:
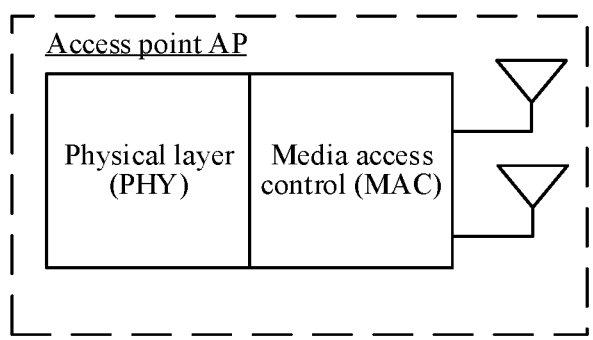
FIG. 2a is a schematic diagram of a structure of an access point according to an embodiment of this application.
Figure 2B:
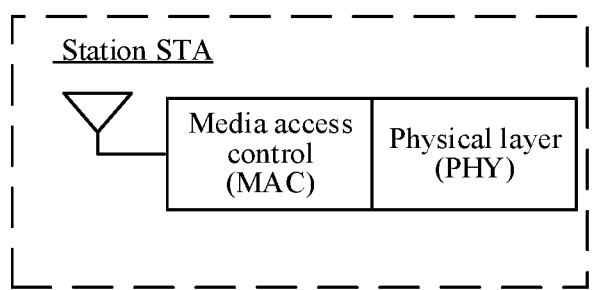
FIG. 2b is a schematic diagram of a structure of a station according to an embodiment of this application.

It should be understood that the 802.11 standard focuses on a physical layer (PHY) and a media access control (MAC) layer. In an example, FIG. 2a is a schematic diagram of a structure of an access point according to an embodiment of this application. An AP may be multi-antenna/multi-radio frequency, or may be single-antenna/single-radio-frequency, and the antenna/radio frequency is used to send/receive a data packet. In an implementation, an antenna part or a radio frequency part of the AP may be separated from a main part of the AP, and is in a remote layout structure. In FIG. 2a, the AP may include a physical layer processing circuit and a media access control processing circuit. The physical layer processing circuit may be configured to process a physical layer signal, and the MAC layer processing circuit may be configured to process a MAC layer signal. In another example, FIG. 2b is a schematic diagram of a structure of a station according to an embodiment of this application. FIG. 2b is a schematic diagram of a structure of a single-antenna/single-radio-frequency STA. In an actual scenario, the STA may further be a multi-antenna/multi-radio-frequency device, and may be a device with more than two antennas. The antenna/radio frequency is used to send/receive a data packet. In an implementation, an antenna part or a radio frequency part of the STA may be separated from a main part of the STA, and is in an extended layout structure. In FIG. 2b, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of this application. For better understanding of the technical solutions in embodiments of this application, the following describes several pieces of content related to embodiments of this application.

1. Channel Division in a WLAN

In the WLAN, channels are usually classified into a primary channel and a secondary channel, where the secondary channel may include one or more sub-channels. Within an entire channel bandwidth, 20 MHz is usually used as a basic bandwidth unit for division, and a primary channel with a bandwidth of 20 MHz is selected in the entire channel bandwidth, and is further usually referred to as a primary 20 MHz (P20) channel. The remaining one or more 20 MHz channels are secondary channels.

Figure 3A:
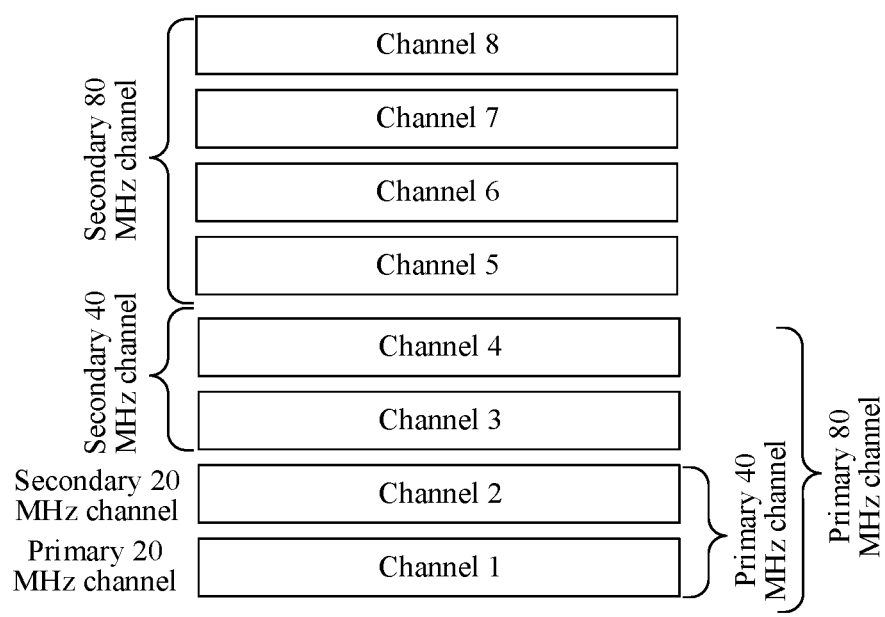
FIG. 3a is a schematic diagram of channels distributed when a bandwidth is 160 MHz.
Figure 3B:
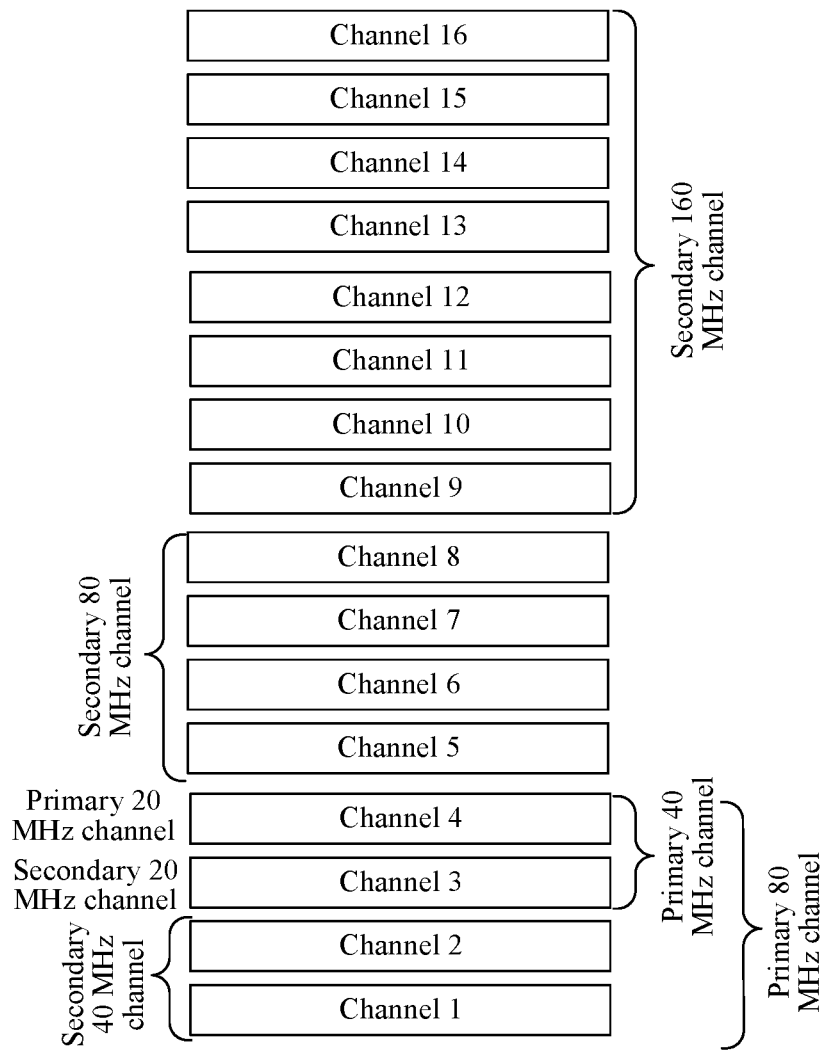
FIG. 3b is a schematic diagram of channels distributed when a bandwidth is 320 MHz.

FIG. 3a is a schematic diagram of channel distribution when a bandwidth is 160 MHz. As shown in FIG. 3a, the 160 MHz bandwidth includes a primary 20 MHz (P20) channel, a secondary 20 MHz (S20) channel, a secondary 40 MHz (S40) channel, and a secondary 80 MHz (S80) channel. FIG. 3b is a schematic diagram of channel distribution when a bandwidth is 320 MHz. As shown in FIG. 3b, the 320 MHz bandwidth includes a primary 20 MHz (P20) channel, a secondary 20 MHz (S20) channel, a secondary 40 MHz (S40) channel, a secondary 80 MHz (S80) channel, and a secondary 160 MHz (S160) channel. The primary 20 MHz channel may be any sub-channel (a bandwidth of each sub-channel is 20 MHz) in the entire channel bandwidth, and the primary channel is not fixed. In the WLAN, a 40 MHz channel including a P20 channel is referred to as a primary 40 MHz channel (Primary 40 MHz, P40). An 80 MHz channel including a P20 channel is referred to as a P80 channel. A 160 MHz channel including a P20 channel is referred to as a P160 channel.

Figure 4:
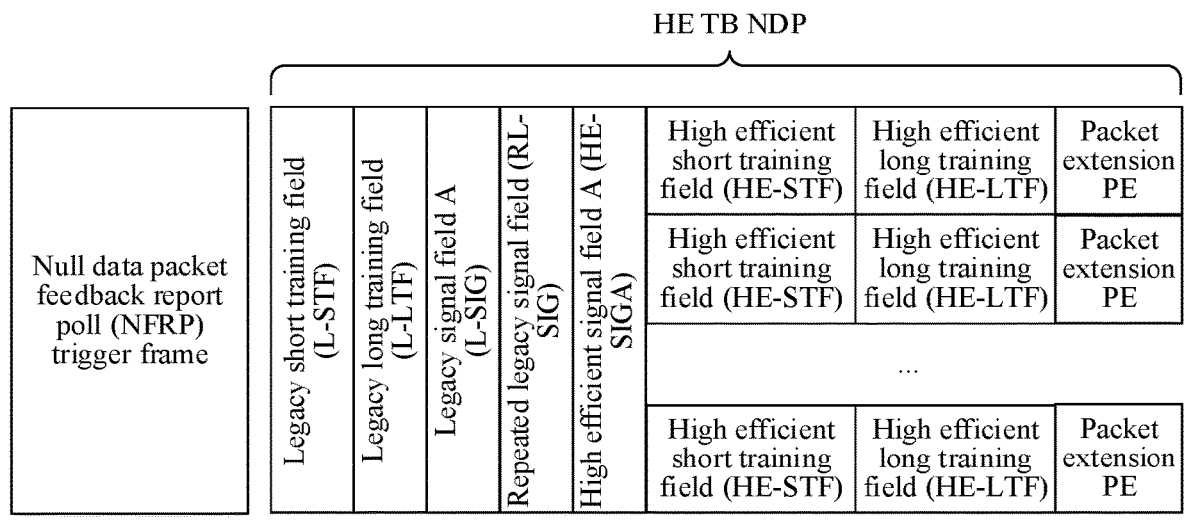
FIG. 4 is a schematic diagram of a null data packet feedback report procedure in an 802.11ax standard.
Figure 5:
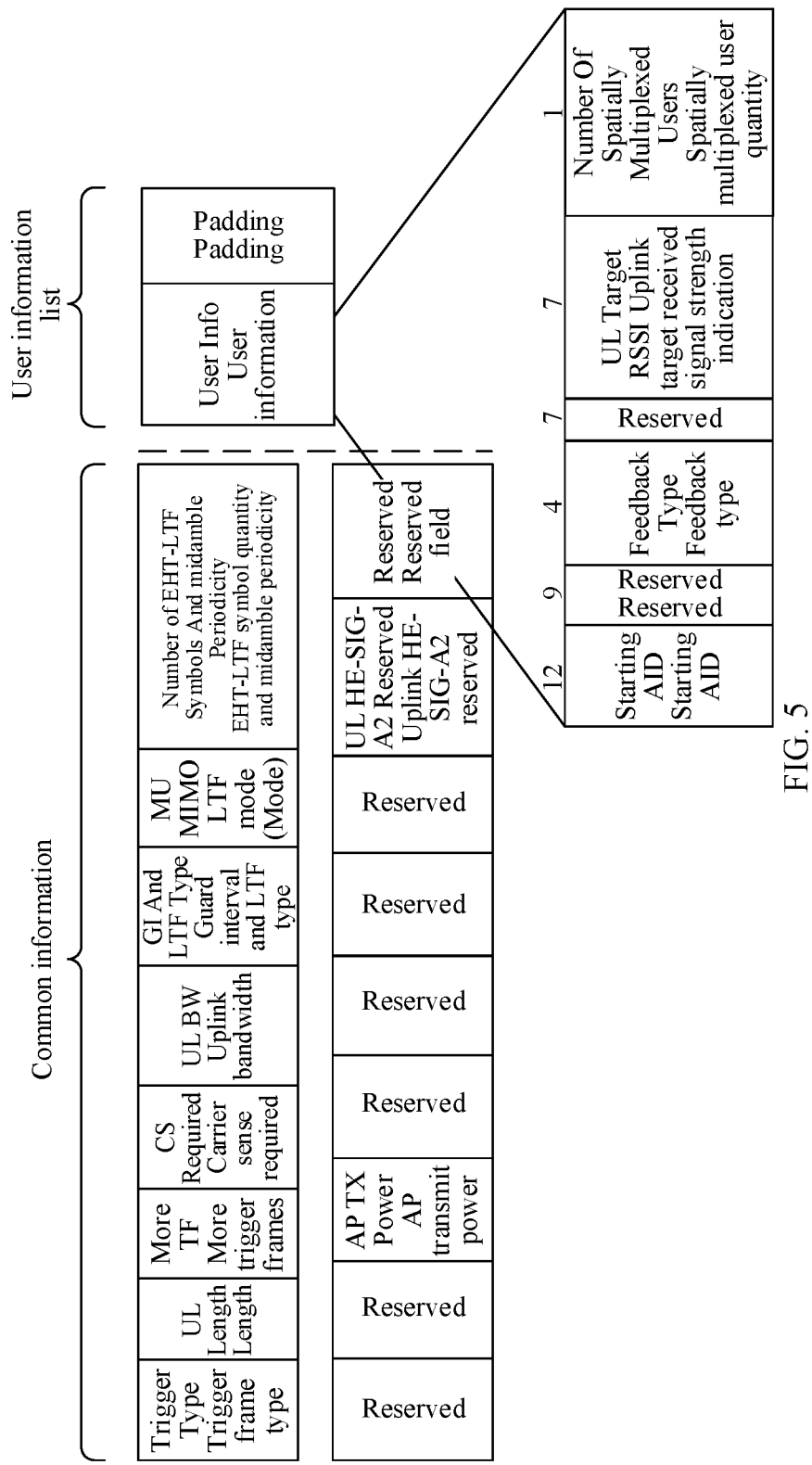
FIG. 5 is a schematic diagram of a frame format of an NFRP trigger frame in an 802.11ax standard.

2. Null Data Packet Feedback Report (NDP Feedback Report, NFRP) Procedure in an 802.11ax Standard The 802.11ax standard designs a null data packet feedback report (NDP feedback report) procedure, and allows an AP to collect feedback information such as a resource request from a plurality of STAs. FIG. 4 is a schematic diagram of a null data packet feedback report procedure in an 802.11ax standard. As shown in FIG. 4, an AP sends a null data packet feedback report poll (NDP feedback report poll, NFRP) trigger frame to collect feedback information such as a resource request from a STA. The NFRP trigger frame is a variant of the trigger frame, and a trigger frame type indication is 7. For a frame format of the NFRP trigger frame, refer to FIG. 5. FIG. 5 is a schematic diagram of a frame format of an NFRP trigger frame in the 802.11ax standard. As shown in FIG. 5, the NFRP trigger frame includes a common information field and a user information field. The user information field includes a starting association identifier (AID) field, a feedback type field, an uplink target received signal strength indication (RSSI) field, a spatially multiplexed user quantity (number of spatially multiplexed users) field, and the like. As shown in the following Table 1, Table 1 shows meanings of some fields in the NFRP trigger frame.

TABLE 1

Descriptions of some fields in an NFRP trigger frame

| Field name | Descriptions |
| --- | --- |
| Uplink bandwidth (2 bits) | Indicates a bandwidth of an HE TB PPDU (PHY Protocol Data Unit, physical layer protocol data unit, popularly speaking, data packet, or data packet)<br>Binary representation:<br>00 indicates 20 MHz<br>01 indicates 40 MHz |

TABLE 1-continued

Descriptions of some fields in an NFRP trigger frame

| Field name | Descriptions |
| --- | --- |
| | 10 indicates 80 MHz |
| | 11 indicates 160 MHz |
| Starting association identifier AID (12 bits) | A scheduled STA is indicated through an AID in a continuous range. |
| | A starting AID indicates the 1$^{st}$ AID in a scheduled AID range (or a preset AID range). |
| Feedback type (4 bits) | Indicates a type of a feedback report. The value is represented as a decimal number: |
| | 0 indicates a resource request, and 1 to 15 are reserved. |
| Uplink target received signal strength indication (7 bits) | Indicates a target received signal power |
| Spatially multiplexed user quantity (1 bit) | Indicates a quantity of users multiplexed on a same subcarrier set. 0 represents one user; and 1 represents two users. |

Because the NFRP trigger frame sent by the AP is to collect feedback information such as resource requests from a plurality of STAs, both a transmit end (in other words, the AP) and a receive end (in other words, the STA) need to know a quantity of STAs scheduled to respond to the NFRP trigger frame, and the quantity of STAs are denoted as $N_{STA}$ herein. $N_{STA}$ can be calculated based on the uplink bandwidth and the spatially multiplexed user quantity. The formula is as follows:

$$N_{STA}=18\times 2^{BWindex}\times(\text{MultiplexingFlag}+1) \quad (1\text{-}1)$$

$BW_{index}$ in the formula (1-1) is an index of an uplink bandwidth (UL BW) field. When the uplink bandwidth field indicates 20 MHz (in other words, BW is 20 MHz), $BW_{index}$ is 0; when the uplink bandwidth field indicates 40 MHz (in other words, BW is 40 MHz), $BW_{index}$ is 1; when the uplink bandwidth field indicates 80 MHz (in other words, BW is 80 MHz), $BW_{index}$ is 2; or when the uplink bandwidth field indicates 160 MHz (in other words, BW is 160 MHz or 80+80 MHz), $BW_{index}$ is 3. In the formula (1-1), MultiplexingFlag represents an indication of the spatially multiplexed user quantity field. It should be understood that when a value of MultiplexingFlag is 1, a quantity of users who can be scheduled is twice the quantity of users when the value of MultiplexingFlag is 0 in a same bandwidth.

After receiving the NFRP trigger frame, the STA determines whether an AID of the STA falls in a specific AID range (or a preset AID range) scheduled by the NFRP trigger frame, in other words, determines whether the AID of the STA is greater than or equal to the starting AID and less than the starting AID+$N_{STA}$. If the AID of the STA is greater than or equal to the starting AID and less than the starting AID+$N_{STA}$ (in other words, the starting AID≤AID<starting AID+$N_{STA}$), it indicates that the STA can send a response or the STA is scheduled. The STA may determine a resource allocation (resource unit, RU) subcarrier set index (RU_TONE_SET_INDEX) of the STA according to the following formula:

$$\text{RU\_TONE\_SET\_INDEX}=1+((\text{AID}-\text{Starting AID}) \bmod(18\times 2^{BWindex})) \quad (1\text{-}2)$$

In the formula (1-2), AID represents an AID of the STA, and Starting AID represents a value of a starting AID field. The AID of the STA that can send the response needs to be greater than or equal to the starting AID and less than the starting AID+$N_{STA}$.

When determining that the response can be sent, the STA sends an NDP feedback report (NDP feedback report). The NDP feedback report is carried in a high efficiency trigger based null data packet (HE TB NDP). The HE TB NDP is a special variant of a high efficiency trigger based physical layer protocol data unit (HE TB PPDU), which does not have a data field. It should be understood that the HE TB PPDU is one of four types of HE PPDUs. Specifically, the STA transmits two states of "1" and "0" by sending energy in a corresponding resource allocation subcarrier set (RU_TONE_SET) of a high efficiency long training field (HE-LTF). 1 indicates that a resource is available, and 0 indicates that no resource is available. The two states correspond to different subcarrier indexes. The AP can identify whether a subcarrier has energy, to determine whether a status fed back by the STA is "1" or "0".

Refer to the following Table 2. Table 2 shows a mapping relationship between RU_TONE_SET_INDEX and HE-LTF subcarriers in the 802.11ax standard. $K_{tone\_NDPu}$ in Table 2 represents a subcarrier index set.

TABLE 2

Mapping relationship between RU_TONE_SET_INDEX and HE-LTF subcarriers in the 802.11ax standard

| RU_TONE_SET_INDEX resource unit subcarrier set index | 80 MHz | | 40 MHz | | 20 MHz | |
|---|---|---|---|---|---|---|
| | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 |
| 1 | Use 20 MHz FEEDBACK_STATUS = 1 Subcarrier Indices − 384 Subtract 384 from a subcarrier index in a case in which the 20 MHz feedback status = 1 | Use 20 MHz FEEDBACK_STATUS = 0 Subcarrier Indices − 384 Subtract 384 from a subcarrier index in a case in which the 20 MHz feedback status = 0 | Use 20 MHz FEEDBACK_STATUS = 1 Subcarrier Indices − 128 Subtract 128 from the subcarrier index in a case in which the 20 MHZ feedback status = 1 | Use 20 MHz FEEDBACK_STATUS = 0 Subcarrier Indices − 128 Subtract 128 from the subcarrier index in a case in which the 20 MHZ feedback status = 0 | −113, −77, −41, 6, 42, 78 | −112, −76, −40, 7, 43, 79 |
| 2 | | | | | −111, −75, −39, 8, 44, 80 | −110, −74, −38, 9, 45, 81 |
| 3 | | | | | −109, −73, −37, 10, 46, 82 | −108, −72, −36, 11, 47, 83 |
| 4 | | | | | −107, −71, −35, 12, 48, 84 | −106, −70, −34, 13, 49, 85 |
| 5 | | | | | −105, −69, −33, 14, 50, 86 | −104, −68, −32, 15, 51, 87 |
| 6 | | | | | −103, −67, −31, 16, 52, 88 | −102, −66, −30, 17, 53, 89 |
| 7 | | | | | −101, −65, −29, 18, 54, 90 | −100, −64, −28, 19, 55, 91 |
| 8 | | | | | −99, −63, −27, 20, 56, 92 | −98, −62, −26, 21, 57, 93 |
| 9 | | | | | −97, −61, −25, 22, 58, 94 | −96, −60, −24, 23, 59, 95 |
| 10 | | | | | −95, −59, −23, 24, 60, 96 | −94, −58, −22, 25, 61, 97 |
| 11 | | | | | −93, −57, −21, 26, 62, 98 | −92, −56, −20, 27, 63, 99 |
| 12 | | | | | −91, −55, −19, 28, 64, 100 | −90, −54, −18, 29, 65, 101 |
| 13 | | | | | −89, −53, −17, 30, 66, 102 | −88, −52, −16, 31, 67, 103 |
| 14 | | | | | −87, −51, −15, 32, 68, 104 | −86, −50, −14, 33, 69, 105 |
| 15 | | | | | −85, −49, −13, 34, 70, 106 | −84, −48, −12, 35, 71, 107 |
| 16 | | | | | −83, −47, −11, 36, 72, 108 | −82, −46, −10, 37, 73, 109 |
| 17 | | | | | −81, −45, −9, 38, 74, 110 | −80, −44, −8, 39, 75, 111 |
| 18 | | | | | −79, −43, −7, 40, 76, 112 | −78, −42, −6, 41, 77, 113 |
| 19-36 | Use 20 MHz FEEDBACK_STATUS = 1 Subcarrier Indices − 128 | Use 20 MHz FEEDBACK_STATUS = 0 Subcarrier Indices − 128 | Use 20 MHz FEEDBACK_STATUS = 1 Subcarrier Indices + 128 | Use 20 MHz FEEDBACK_STATUS = 0 Subcarrier Indices + 128 | | |

TABLE 2-continued

Mapping relationship between RU_TONE_SET_INDEX and HE-LTF subcarriers in the 802.11ax standard

| | 80 MHz | | 40 MHz | | 20 MHz | |
|---|---|---|---|---|---|---|
| RU_TONE_SET_INDEX resource unit subcarrier set index | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 | $K_{tone\_NDPu}$ if FEEDBACK_STATUS is 1 Subcarrier index set when a feedback status is 1 | $K_{tone\_NDPu}$ if FEEDBACK_STATUS is 0 Subcarrier index set when a feedback status is 0 |
| 37-54 | Use 20 MHz FEEDBACK_STATUS = 1 Subcarrier Indices + 128 | Use 20 MHz FEEDBACK_STATUS = 0 Subcarrier Indices + 128 | | | | |
| 55-72 | Use 20 MHz FEEDBACK_STATUS = 1 Subcarrier Indices + 384 | Use 20 MHz FEEDBACK_STATUS = 0 Subcarrier Indices + 384 | | | | |

The RU_TONE_SET_INDEX for 80 + 80 MHz and 160 MHz shall use the 80 MHZ RU_TONE_SET_INDEX definition for the lower and upper 80 MHz. The RU_TONE_SET_INDEX values 1 to 72 are mapped to the lower 80 MHz and the RU_TONE_SET_INDEX values 73 to 144 are mapped to the upper 80 MHz.
Translation: In a case of a bandwidth of 80 + 80 MHz or 160 MHz, for lower and upper 80 MHz, shall use the 80 MHz RU_TONE_SET_INDEX in a case of 80 MHz. RU_TONE_SET_INDEX values 1 to 72 are mapped to the lower 80 MHz and RU_TONE_SET_INDEX values 73 to 144 are mapped to the upper 80 MHz.

2. 802.11be Trigger Frame

An implementation of the 802.11be trigger frame is to reuse an 802.11ax trigger frame type and sub-type, and the 802.11be trigger frame can be designed to trigger an EHT TB PPDU (extremely high throughput trigger based physical layer protocol data unit), or trigger the HE TB PPDU and the EHT TB PPDU at the same time.

Figure 6A:
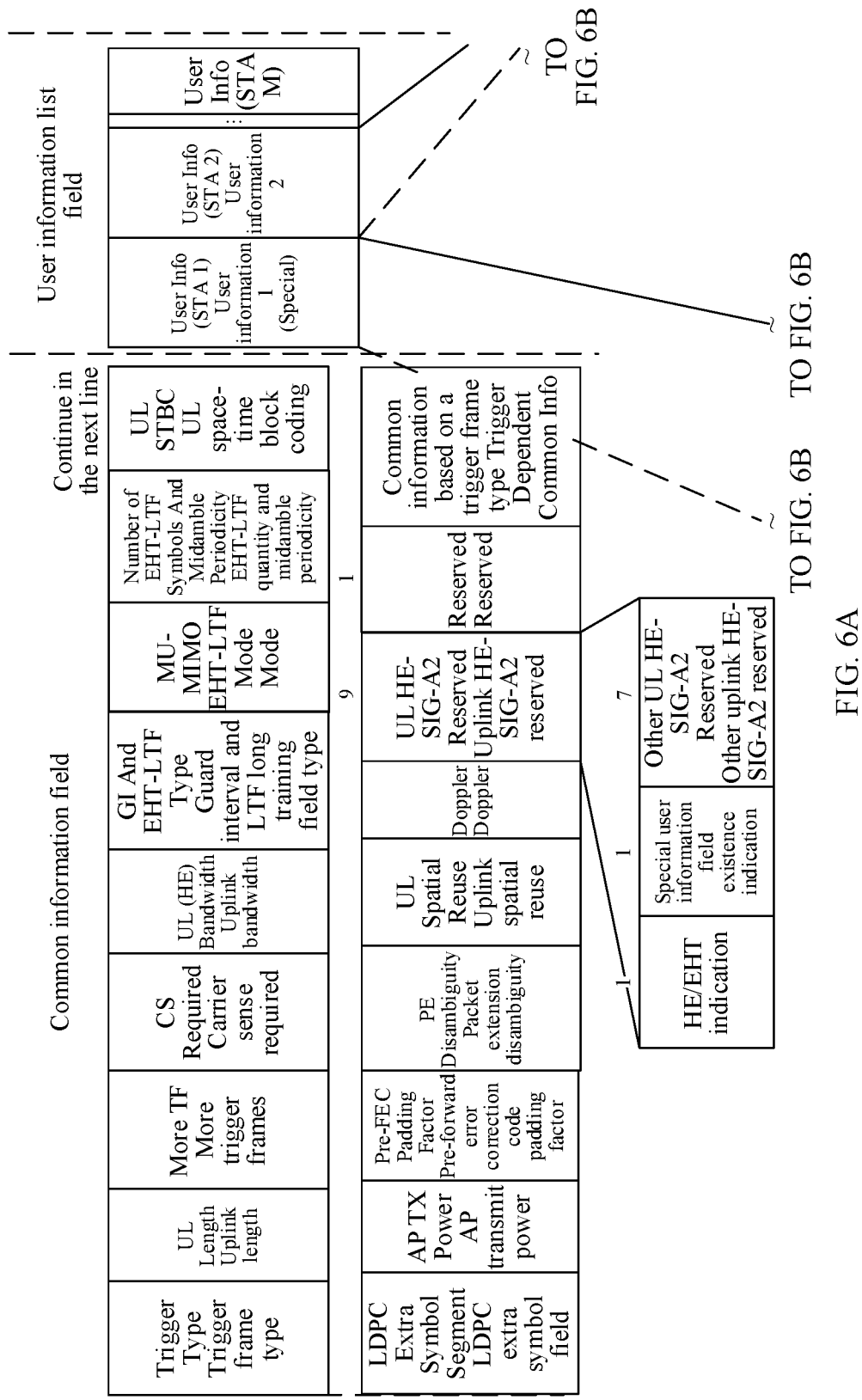

Specifically, FIG. 6A and FIG. 6B are a schematic diagram of a possible frame format of an 802.11be trigger frame. A main design idea of the 802.11be trigger frame is that, when 802.11be and 802.11ax cannot share a same field to indicate information in the common information field, a special user information field in the user information list field of the trigger frame is used to carry extra information. The special user information field is located at the 1$^{st}$ field in the user information list field, and exactly follows the common information field. An association identifier of the special user information field is 2007. The remaining bits of the special user information field are used as an indication of an 11be common information field. Another user information field in the user information list carries a separate information indication of each user, and details are not described herein. It should be understood that an AID12 field included in each user information field in the user information list herein indicates an AID of a user/station. As shown in FIG. 6A and FIG. 6B, the special user information field is the 1$^{st}$ user information field in the user information list field. It includes an AID12 field (AID12=2007), a physical layer version identifier field, an uplink bandwidth extension field, an uplink EHT spatial reuse 1 field, an uplink EHT spatial reuse 2 field, and an uplink universal signal field reserved indication, and the like.

The physical layer version identifier field indicates a specific trigger frame generation to which the trigger frame belongs and that is in an EHT standard or a later standard. The uplink EHT spatial reuse 1 field and the uplink EHT spatial reuse 2 field, indicate a spatial reuse field in a universal signal field (U-SIG) in an EHT PPDU; and The uplink spatial reuse field of the common information field indicates a spatial reuse field in a high efficiency signal field A (HE-SIG-A) in the HE PPDU. The uplink universal signal field reserved indication field indicates a reserved bit in the U-SIG. The uplink bandwidth extension field and the uplink bandwidth field jointly indicate a bandwidth of the EHT PPDU. The uplink bandwidth field may further indicate a bandwidth of the HE PPDU. As shown in Table 3, Table 3 shows an example of meanings of the uplink bandwidth and the uplink bandwidth extension field.

TABLE 3

Meanings of the uplink bandwidth and uplink bandwidth extension fields

| Uplink bandwidth (2 bits) | HE TB PPDU bandwidth (meaning) (unit: MHz) | Uplink bandwidth extension (2 bits) | EHT TB PPDU bandwidth (meaning) |
|---|---|---|---|
| 0 | 20 | 0 | 20 |
| 0 | 20 | 1 | Reserved |
| 0 | 20 | 2 | Reserved |
| 0 | 20 | 3 | Reserved |
| 1 | 40 | 0 | 40 |
| 1 | 40 | 1 | Reserved |
| 1 | 40 | 2 | Reserved |
| 1 | 40 | 3 | Reserved |
| 2 | 80 | 0 | 80 |
| 2 | 80 | 1 | 160 |
| 2 | 80 | 2 | Reserved |
| 2 | 80 | 3 | Reserved |
| 3 | 160 | 0 | 80 |
| 3 | 160 | 1 | 160 |
| 3 | 160 | 2 | 320-1 |
| 3 | 160 | 3 | 320-2 |

It can be learned from Table 3 that when the uplink bandwidth field indicates 0 and the uplink bandwidth extension field also indicates 0, the EHT PPDU bandwidth jointly indicated is 20 MHz; or when the uplink bandwidth field indicates 0, and the uplink bandwidth extension field indicates any one of 1, 2, and 3, all indicate reserved. When the uplink bandwidth field indicates 1 and the uplink bandwidth extension field indicates 0, the EHT PPDU bandwidth jointly indicated is 40 MHz; or when the uplink bandwidth field indicates 1, and the uplink bandwidth extension field indicates any one of 1, 2, and 3, all indicate reserved. When the uplink bandwidth field indicates 2, and the uplink bandwidth extension field indicates 0, the EHT PPDU bandwidth jointly indicated is 80 MHz; when the uplink bandwidth field indicates 2 and the uplink bandwidth extension field indicates 1, the EHT PPDU bandwidth jointly indicated is 160 MHz; or when the uplink bandwidth field indicates 2, and the uplink bandwidth extension field indicates any one of 2 and 3, all indicate reserved. When the uplink bandwidth field indicates 3, and the uplink bandwidth extension field indicates 0, the EHT PPDU bandwidth jointly indicated is 80 MHz; when the uplink bandwidth field indicates 3, and the uplink bandwidth extension field indicates 1, the EHT PPDU bandwidth jointly indicated is 160 MHz; when the uplink bandwidth field indicates 3 and the uplink bandwidth extension field indicates 2, the EHT PPDU bandwidth jointly indicated is 320 MHz-1; or when the uplink bandwidth field indicates 3 and the uplink bandwidth extension field indicates 3, the EHT PPDU bandwidth jointly indicated is 320 MHz-2. It should be understood that, on a 6 GHz frequency band, overlapping exists in channel division of 320 MHz. Therefore, a frequency domain location of 320 MHz needs to be distinguished, in other words, 320 MHz-1 and 320 MHz-2 need to be distinguished. To be specific, 320 MHz-1 and 320 MHz-2 respectively represent 320 MHz bandwidths at different frequency domain locations. In other words, 320 MHz-1 represents 320 MHz channels with channel numbers including 31, 95, and 159; and 320 MHz-2 represents 320 MHz channels with channel numbers including 63 127, and 191.

In addition, the uplink HE-SIG-A2 reserved field in the common information field of the 802.11ax trigger frame indicates a reserved bit in the HE-SIG-A2 (the $2^{nd}$ symbol of the HE-SIG-A) in the HE PPDU. However, the uplink HE-SIG-A2 reserved field is redefined in the 802.11be standard. As shown in FIG. 6A and FIG. 6B, the $1^{st}$ bit of the uplink HE-SIG-A2 reserved field in the common information field of the 802.11be trigger frame is redefined as an HE/EHT indication or an HE/EHT P160 channel indication, and indicates whether the HE TB PPDU or the EHT TB PPDU is transmitted on the primary 160 MHz channel; the $2^{nd}$ bit is redefined as a special user information field existence indication, and indicates whether the special user information field exists; and the remaining 7 bits are used to represent another uplink HE-SIG-A2 that is reserved.

It can be learned that the trigger frame in the 802.11be standard may trigger the EHT TB PPDU, and may simultaneously trigger the HE TB PPDU and the EHT TB PPDU, but as a universal trigger frame, the trigger frame is not applicable to an NFRP trigger frame variant. If a design of the universal trigger frame in the 802.11be standard is directly applied to an NFRP trigger frame variant, an HE station cannot feed back a report through the HE TB NDP.

Therefore, an embodiment of this application provides a trigger based null data packet transmission method, where not only an EHT station can be scheduled to send the EHT TB NDP or the HE TB NDP to feed back a report, but also two types of stations (in other words, the HE station and the EHT station) may be simultaneously scheduled to send an aggregated PPDU (A-PPDU) of the HE TB NDP and the EHT TB NDP, to simultaneously feed back the report. It should be understood that the HE station can send only the HE TB NDP, and the EHT station can send the EHT TB NDP and the HE TB NDP.

The following describes technical solutions provided in this application in detail with reference to more accompanying drawings.

The technical solutions provided in this application are described in detail through two embodiments. Embodiment 1 describes an NFRP trigger frame design and a corresponding procedure in which an EHT station and an HE station share one user information field. Embodiment 2 describes an NFRP trigger frame design and a corresponding procedure in which an EHT station and an HE station respectively use one user information field.

It may be understood that both the AP and a first-type station in this application support the 802.11be protocol (or referred to as Wi-Fi 7, EHT protocol), and may further support another WLAN communication protocol, such as 802.11ax and 802.11ac. It should be understood that the AP and the first-type station in this application may further support a next generation protocol of 802.11be. In other words, the method provided in this application is not only applicable to the 802.11be protocol, but also applicable to the next generation protocol of the 802.11be. A second-type station in this application supports the 802.11ax protocol, and may further support another WLAN communication protocol, such as the 802.11ac protocol. In other words, the first-type station in this application is a station that supports the 802.11be protocol, and the second-type station is a station that supports the 802.11ax protocol but does not support the 802.11be protocol.

Embodiment 1

Embodiment 1 of this application mainly describes an NFRP trigger frame design and a corresponding procedure in which a first-type station (an EHT station) and a second-type station (an HE station) share one user information field for scheduling.

Figure 7:
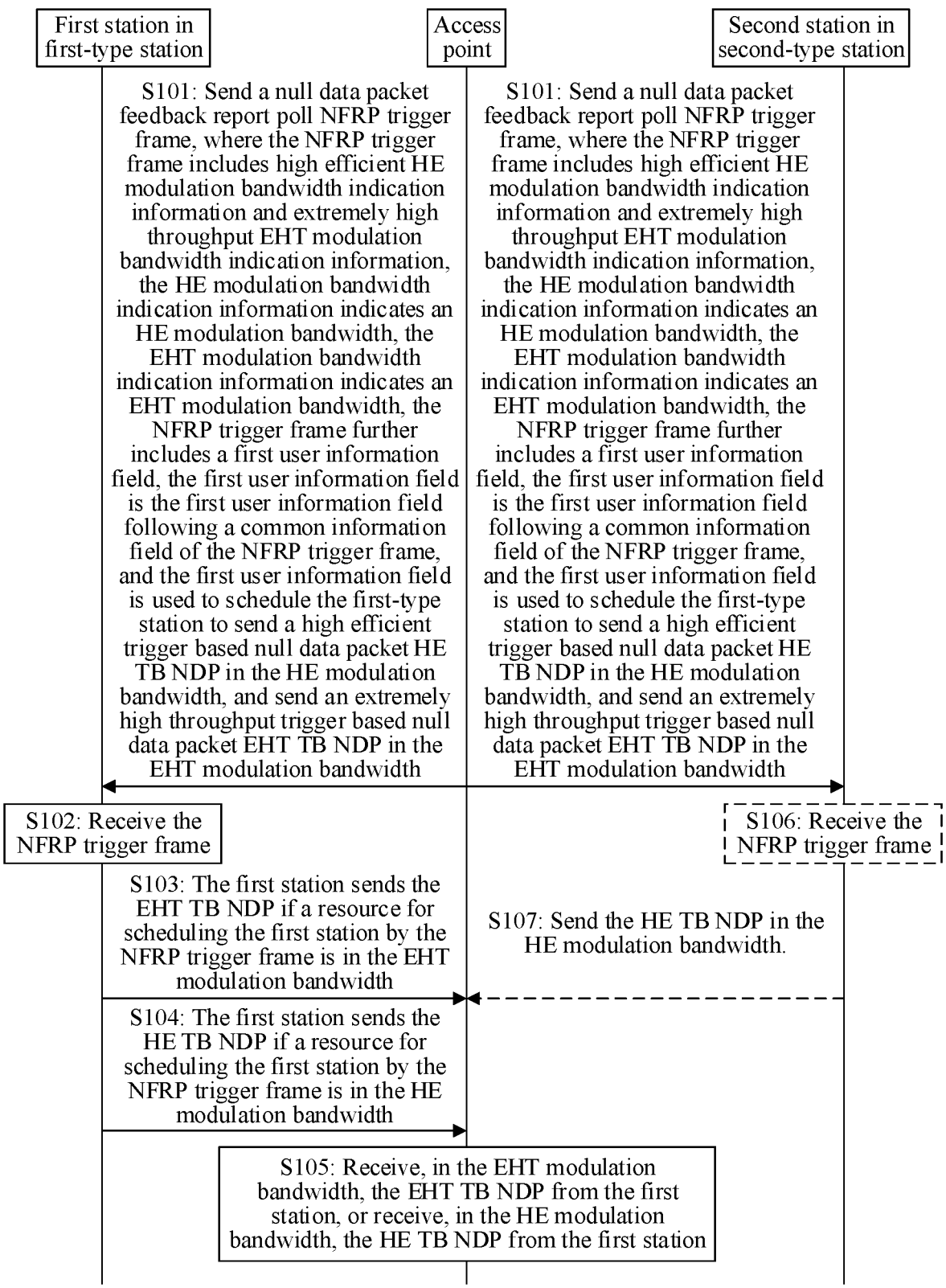
FIG. 7 is a schematic flowchart of a trigger based null data packet transmission method according to an embodiment of this application.

FIG. 7 is a schematic flowchart of a trigger based null data packet transmission method according to an embodiment of this application. A first station in the first-type station refers to any station that supports an 802.11be standard. Optionally, the first station may further support a next generation standard of the 802.11be standard; and a second station in the second-type station is any station that supports an 802.11ax standard but does not support the 802.11be standard. As shown in FIG. 7, the trigger based null data packet transmission method includes but is not limited to the following steps:

Step S101: An access point sends a null data packet feedback report poll NFRP trigger frame, where the NFRP trigger frame includes highly efficient HE modulation bandwidth indication information and extremely high-throughput EHT modulation bandwidth indication information, the HE modulation bandwidth indication information indicates an HE modulation bandwidth, the EHT modulation bandwidth indication information indicates an EHT modulation bandwidth, the NFRP trigger frame further includes a first user information field, the first user information field is the $1^{st}$ user information field following a common information field of the NFRP trigger frame, and the first user information field is used to schedule the first-type station to send a highly efficient trigger based null data packet HE TB NDP in the HE modulation bandwidth, and send an extremely high-throughput trigger based null data packet EHT TB NDP in the EHT modulation bandwidth.

Optionally, the NFRP trigger frame includes a common information field and a user information list field. The user information list field includes at least two user information fields: a first user information field and a second user information field. The first user information field is the $1^{st}$ user information field following a common information field of the NFRP trigger frame, in other words, the first user information field is the $1^{st}$ user information field in the user information list. The second user information field is located after the first user information field, including an uplink bandwidth extension field and an AID12 field. A value of the AID12 field is 2007, or another reserved value, for example, a value in 1 to 2006 that is not allocated to any STA, or a value in 2008 to 2044.

The NFRP trigger frame further includes the HE modulation bandwidth indication information and the EHT modulation bandwidth indication information. The HE modulation bandwidth indication information indicates the HE modulation bandwidth, and the EHT modulation bandwidth indication information indicates the EHT modulation bandwidth. In an implementation, the EHT modulation bandwidth indication information may be carried in the uplink bandwidth extension field in the second user information field and the uplink bandwidth field in the NFRP trigger frame. In other words, the uplink bandwidth extension field and the uplink bandwidth field jointly indicate the EHT modulation bandwidth. The HE modulation bandwidth indication information included in the NFRP trigger frame can be carried in the uplink bandwidth field, to be specific, the uplink bandwidth field indicates the HE modulation bandwidth. In another implementation, the EHT modulation bandwidth indication information may be carried in a reserved bit in the common information field of the NFRP trigger frame. For example, four reserved bits (which may indicate 0 to 15 in total) in the common information field of the NFRP trigger frame respectively indicate the EHT modulation bandwidth as 20 MHz, 40 MHz, 80 MHz, 160 MHz, and 320 MHz. It can be learned that in this embodiment of this application, the EHT modulation bandwidth indication information is carried in the NFRP trigger frame to indicate the EHT modulation bandwidth, and the EHT station can be scheduled to send the EHT TB NDP in the 320 MHz bandwidth to feed back a report, to support feedback in a larger bandwidth.

In an implementation, the first user information field is used to schedule the first-type station (which herein refers to some EHT stations in the first-type station) to send the HE TB NDP in the HE modulation bandwidth, and the first user information field is used to schedule the first-type station (which herein refers to some other EHT stations in the first-type station) to send the EHT TB NDP in the EHT modulation bandwidth. In other words, the first user information field is used to schedule one or more EHT stations to send the HE TB NDP in the HE modulation bandwidth, and schedule one or more other EHT stations to send the EHT TB NDP in the EHT modulation bandwidth. It should be understood that the EHT station can only be scheduled to send one corresponding TB NDP in one modulation bandwidth at a time. For example, if an EHT station 1 sends the HE TB NDP in the HE modulation bandwidth, the EHT station 1 cannot send the EHT TB NDP in the EHT modulation bandwidth.

Optionally, the first user information field is further used to: when scheduling the first-type station, schedule the second-type station to send the HE TB NDP in the HE modulation bandwidth. In other words, the first user information field is used to schedule both the HE STA and the EHT STA to send the HE TB NDP in the HE modulation bandwidth indicated by the uplink bandwidth field, and schedule the EHT STA to send the EHT TB NDP in the EHT modulation bandwidth jointly indicated by the uplink bandwidth field and the uplink bandwidth extension field. In this embodiment of this application, the first-type station is the EHT station, and the second-type station is the HE station.

Figure 8:
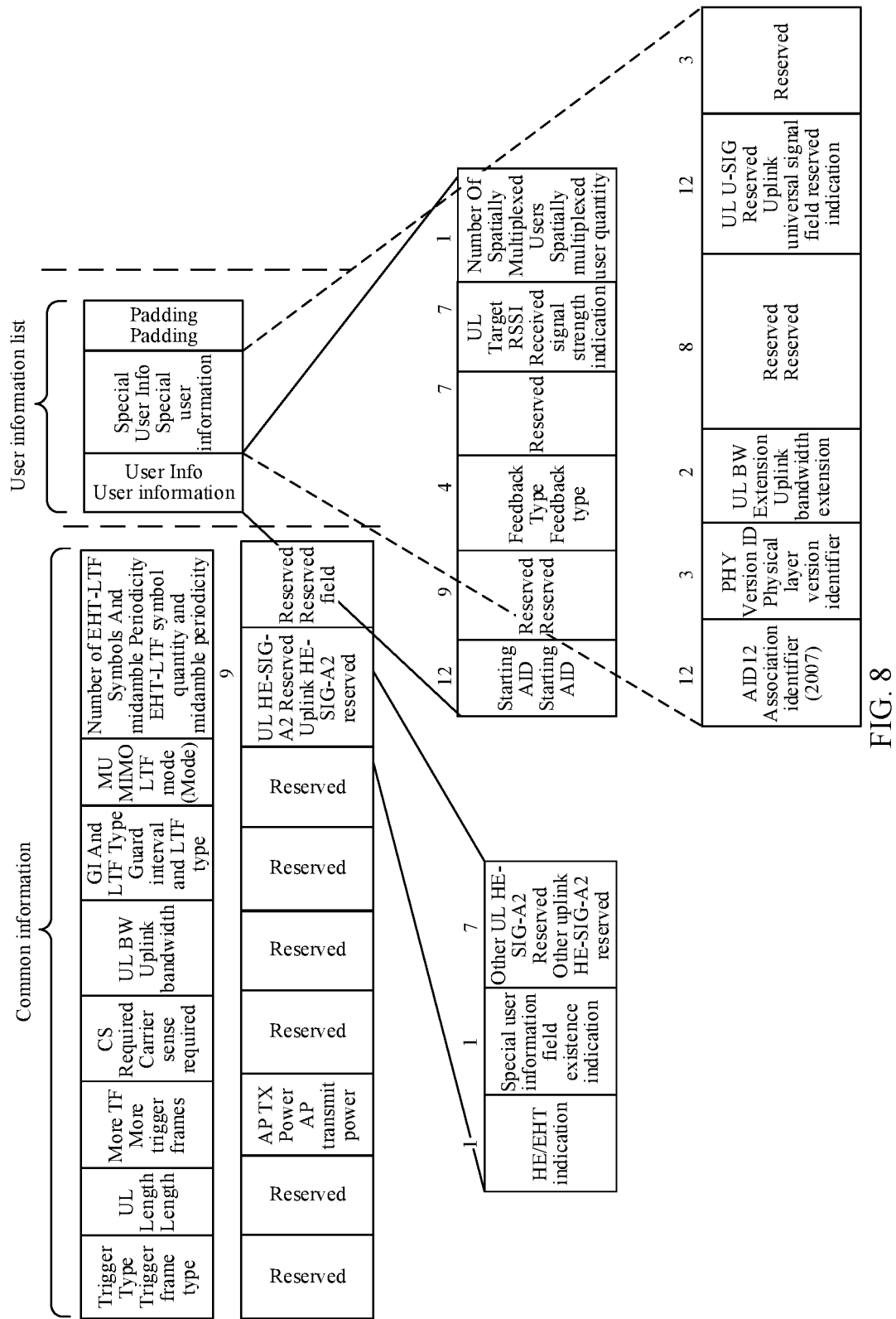
FIG. 8 is a schematic diagram 1 of a frame format of an NFRP trigger frame according to an embodiment of this application.

FIG. 8 is a schematic diagram 1 of a frame format of an NFRP trigger frame according to an embodiment of this application. The NFRP trigger frame shown in FIG. 8 can be applied to the 802.11be standard. As shown in FIG. 8, the NFRP trigger frame includes a common information field and a user information list field. The user information list field includes the user information field (in other words, the first user information field). Optionally, the NFRP trigger frame further includes a special user information field (in other words, the second user information field), and the special user information field is located after the user information field. The special user information field (in other words, the second user information field) includes the AID12 field, a physical layer version identifier field, the uplink bandwidth extension field, an uplink universal signal field reserved indication field, and one or more reserved fields. In an implementation, a value of the AID12 field is 2007; the value of the AID12 field may alternatively be a value larger than 2007; or the value of the AID12 field may alternatively be another value different from an ordinary AID. The uplink bandwidth extension field and the uplink bandwidth field in the common information field of the NFRP trigger frame jointly indicate the EHT modulation bandwidth. Refer to the Table 3. For example, when the uplink bandwidth field indicates 2 and the uplink bandwidth extension field indicates 1, the HE modulation bandwidth (because the HE station does not support the HE TB NDP transmission with preamble puncturing, the HE modulation bandwidth in this application is an HE PPDU bandwidth) is a primary 80 MHz channel, and the EHT modulation bandwidth (in a non-puncturing case, the EHT modulation bandwidth may also be referred to as an EHT PPDU bandwidth) is a secondary 160 MHz channel. When the uplink bandwidth field indicates 3 and the uplink bandwidth extension field indicates 0, the HE modulation bandwidth is a primary 160 MHz channel, and the EHT modulation bandwidth is an 80 MHz channel with a lower (or higher) frequency in the secondary 160 MHz channel (the two cases may also be indicated separately). When the uplink bandwidth field indicates 3 and the uplink bandwidth extension field indicates 1, the HE modulation bandwidth is the primary 160 MHz channel, and the EHT modulation bandwidth is the secondary 160 MHz channel. The other two methods for indicating the HE modulation bandwidth as the primary 160 MHz channel and the EHT modulation bandwidth as the secondary 160 MHz channel are as follows: the uplink bandwidth field indicates 3, and the uplink bandwidth extension field indicates 2 or 3. In this case, the EHT modulation bandwidth is a secondary 160 MHz channel other than the primary 160 MHz channel in the corresponding 320 MHz channel. For meanings of another field in the special user information field (in other words, the second user information field), refer to descriptions of a trigger frame (in other words, FIG. 6A and FIG. 6B) in the 802.11be standard. Details are not described herein again.

As shown in FIG. 8, the user information field (in other words, the first user information field) includes a starting AID field, a feedback type field, an uplink target RSSI field, and a spatially multiplexed user quantity field. For a meaning of each field in the user information field (in other words, the foregoing first user information field), refer to the Table 1. Because the user information field (in other words, the first user information field) may be used to simultaneously schedule two types of stations (the HE station and the EHT station), the starting AID field in the user information field (in other words, the first user information field) may be understood as: indicating a starting value of the AID of the scheduled HE STA and the scheduled EHT STA in a specific AID range (or a preset AID range). It should be understood that, in this application, the AID allocated to the HE station and the EHT station is not allowed to be repeated. In other words, each station has a unique AID that is different from one another.

It can be learned that, in this embodiment of this application, the special user information field (in other words, the second user information field) is placed after the 1$^{st}$ user information field (in other words, the first user information field). This can avoid a case in which the HE station (in other words, the second-type station) mistakenly considers that the AP sends the HE TB NDP when scheduling a STA that falls in a specific AID range starting from a starting value 2007. Therefore, the HE station cannot be scheduled to send the HE TB NDP, and the HE station and the EHT station cannot be scheduled at the same time. This is because an AID in a range starting from the starting value 2007 is not allocated to any HE STA associated with the AP.

Step S102: The first station in the first-type station receives the NFRP trigger frame.

Step S103: The first station sends the EHT TB NDP if a resource for scheduling the first station by the NFRP trigger frame is in the EHT modulation bandwidth.

Step S104: The first station sends the HE TB NDP if the resource for scheduling the first station by the NFRP trigger frame is in the HE modulation bandwidth.

Optionally, after receiving the NFRP trigger frame, the first station in the first-type station may determine, through the uplink bandwidth field and the uplink bandwidth extension field in the NFRP trigger frame, whether a resource for scheduling the first station (by the NFRP trigger frame) is in the HE modulation bandwidth or the EHT modulation bandwidth; and calculate a quantity of stations $N_{STA,HE-TB}$ scheduled by the NFRP trigger frame to feed back the HE TB NDP and a quantity of first-type stations $N_{STA,EHT-TB}$ of first-type stations scheduled by the NFRP trigger frame to feed back the EHT TB NDP. Then, a corresponding TB NDP is sent based on the resource for scheduling the first station (by the NFRP trigger frame). A station scheduled by the NFRP trigger frame to feed back the HE TB NDP may be an HE STA, or may be an EHT STA; and therefore, the quantity of stations scheduled by the NFRP trigger frame to feed back the HE TB NDP may be understood as: a sum of first-type stations (the EHT stations) and second-type stations (the HE stations) that are scheduled by the NFRP trigger frame to feed back the HE TB NDP.

Optionally, a quantity of stations $N_{STA,HE-TB}$ (in other words, a total quantity of scheduled STAs that send HE TB NDPs) scheduled by the NFRP trigger frame to feed back an HE TB NDP is determined based on the HE modulation bandwidth and the value indicated by the spatially multiplexed user quantity field in the first user information field, and can be specifically calculated according to the following formula (2-1):

$$N_{SSTA,HE-TB}=18\times 2^{BW\text{-}HE_{index}}\times(\text{MultiplexingFlag}+1) \quad (2\text{-}1)$$

BW-HE in the formula (2-1) represents the HE modulation bandwidth indicated by the uplink bandwidth field. BW-HE$_{index}$ represents an index of the uplink bandwidth field, and shares a same meaning with BW$_{index}$ in the formula (1-1). Details are not described herein again. It should be understood that the formula (2-1) is the same as the formula (1-1). To distinguish the HE modulation bandwidth from the EHT modulation bandwidth, BW$_{index}$ in the formula (1-1) is for representation of BW-HE$_{index}$, and the formula (2-1) is generated. To be specific, a meaning of each parameter in the formula (2-1) is the same as a meaning of a corresponding parameter in the formula (1-1).

Optionally, a quantity $N_{STA,EHT-TB}$ of first-type stations scheduled by the NFRP trigger frame to feed back the EHT TB NDP is determined based on the EHT modulation bandwidth and the value indicated by the spatially multiplexed user quantity field in the first user information field. Specifically, it can be calculated according to the following formula (2-2):

$$N_{STA,EHT-TB}=18\times 2^{BW\text{-}EHT_{index}}\times(\text{MultiplexingFlag}+1) \quad (2\text{-}2)$$

In the formula (2-2), MultiplexingFlag indicates the value indicated by the spatially multiplexed user quantity field in the first user information field. For details, refer to the descriptions of the spatially multiplexed user quantity field in Table 1. Details are not described herein again. A meaning of BW-EHT$_{index}$ in the formula (2-2) is different from the meaning of BW-HE$_{index}$ in the formula (2-1), and BW-EHT$_{index}$ can be calculated according to the following formula (2-3):

$$BW-EHT_{index} = \log_2^{\left(\frac{BW-EHT}{20}\right)} \quad (2-3)$$

In the formula (2-3), BW-EHT represents the EHT modulation bandwidth jointly indicated by the uplink bandwidth field and the uplink bandwidth extension field. A unit is MHz. It is analogous to the meaning of BW-HE$_{index}$ that, BW-EHT$_{index}$ herein can represent an index of the EHT modulation bandwidth. Therefore, in a same bandwidth, a value of BW-EHT$_{index}$ is the same as a value of BW-HE$_{index}$. For example, if the HE modulation bandwidth is 80 MHz (namely, BW-HE=80 MHz), the EHT modulation bandwidth is also 80 MHz (namely, BW-EHT=80 MHz). According to the 802.11ax standard, when the uplink bandwidth field indicates 80 MHz, BW$_{index}$ is 2. According to the formula (2-3), BW-EHT$_{index}$=log$_2$(80/20)=2.

Optionally, the AID range of stations (including the first-type station and the second-type station herein) scheduled by the first user information field falls in a first range. In other words, all stations (which may include both the first-type station and the second-type station, or may include only the first-type station) whose AIDs are in the first range are scheduled by the AP. A starting value of the first range is a first value, and the first value is a value of the starting AID field in the first user information field. An end value of the first range is a second value, and the second value is a sum of the value of the starting AID field, the quantity of stations scheduled by the NFRP trigger frame to feed back the HE TB NDP, and the quantity of first-type stations scheduled by the NFRP trigger frame to feed back the EHT TB NDP. In other words, the second value is equal to the starting AID+$N_{STA,HE-TB}$+$N_{STA,EHT-TB}$. The first range is greater than or equal to the starting AID, and is less than the starting AID+$N_{STA,HE-TB}$+$N_{STA,EHT-TB}$. To sum up, the first range is an interval [starting AID, AID+$N_{STA,HE-TB}$+$N_{STA,EHT-TB}$).

Optionally, the resource for scheduling the first station by the NFRP trigger frame can be determined based on the AID of the first station and an indication of the first user information field. If the AID of the first station is greater than or equal to the value of starting AID field in the first user information field, and is less than the sum of the value of the starting AID field and the quantity of stations ($N_{STA,HE-TB}$) scheduled by the NFRP trigger frame to feed back the HE TB NDP, the resource for scheduling the first station by the NFRP trigger frame is in the HE modulation bandwidth. If the AID of the first station is greater than or equal to the sum of the value of the starting AID field and the quantity of stations ($N_{STA,HE-TB}$) scheduled by the NFRP trigger frame to feed back the HE TB NDP, and is less than the sum of the value of the starting AID field, the quantity of stations scheduled by the NFRP trigger frame to feed back the HE TB NDP, and the quantity of first-type stations ($N_{STA,EHT-TB}$) scheduled by the NFRP trigger frame to feed back the EHT TB NDP, the resource for scheduling the first station by the NFRP trigger frame is in the EHT modulation bandwidth. In other words, the first station determines, based on the AID of the first station, the starting AID, the quantity of stations ($N_{STA,HE-TB}$) to feed back the HE TB NDP, and the quantity of EHT stations to feed back the EHT TB NDP ($N_{STA,EHT-TB}$), whether the modulation bandwidth to which RU_TONE_SET_INDEX (resource unit subcarrier set index) of the first station belongs is the HE modulation bandwidth or the EHT modulation bandwidth. When the AID of the first station is greater than or equal to the starting AID, and is less than the starting AID+$N_{STA,HE-TB}$, the modulation bandwidth to which RU_TONE_SET_INDEX of the first station belongs is the HE modulation bandwidth, in other words, the first station needs to feed back the HE TB NDP. When the AID of the first station is greater than or equal to the starting AID+$N_{STA,HE-TB}$, and is less than the starting AID+$N_{STA,HE-TB}$+$N_{STA,EHT-TB}$, the modulation bandwidth to which RU_TONE_SET_INDEX of the first station belongs is the EHT modulation bandwidth, in other words, the first station needs to feed back an EHT TB NDP.

Optionally, if the resource for scheduling the first station by the NFRP trigger frame is in the EHT modulation bandwidth (in other words, the AID of the first station is greater than or equal to the starting AID+$N_{STA,HE-TB}$, and is less than the starting AID+$N_{STA,HE-TB}$+$N_{STA,EHT-TB}$), the first station sends the EHT TB NDP. If the resource for scheduling the first station by the NFRP trigger frame is in the HE modulation bandwidth (in other words, the AID of the first station is greater than or equal to the starting AID, and is less than the starting AID+$N_{STA,HE-TB}$), the first station sends the HE TB NDP. Optionally, if the resource for scheduling the first station by the NFRP trigger frame is in the EHT modulation bandwidth (in other words, the AID of the first station is greater than or equal to the starting AID+$N_{STA,HE-TB}$, and is less than the starting AID+$N_{STA,HE-TB}$+$N_{STA,EHT-TB}$), the first station may send either the EHT TB NDP or the HE TB NDP. However, a specific type of the TB NDP sent by the first station can be specified according to a standard or indicated by the NFRP trigger frame. In other words, the EHT station may send either the EHT TB NDP or the HE TB NDP in the EHT modulation bandwidth, with a corresponding standard. Alternatively, a bit in the NFRP trigger frame indicates whether the HE TB NDP or the EHT TB NDP is sent in the EHT modulation bandwidth by the EHT station.

It should be understood that for the HE STA, the HE STA considers that there is only the HE modulation bandwidth, and sends the HE TB NDP in the HE modulation bandwidth indicated by the uplink bandwidth field. Therefore, to avoid affecting feedback of the HE STA, for the EHT STA, if the AID of the EHT STA is greater than or equal to the starting AID, and is less than the starting AID+$N_{STA,HE-TB}$, the EHT STA operates based on behavior of the HE STA. In other words, when the AID of the EHT STA is greater than or equal to the starting AID and is less than the starting AID+$N_{STA,HE-TB}$, the HE TB NDP is fed back. When the AID of the EHT STA is greater than or equal to the AID+$N_{STA,HE-TB}$, and is less than the AID+$N_{STA,HE-TB}$+$N_{STA,EHT-TB}$, the EHT TB NDP is sent in the EHT modulation bandwidth. This is because HE STAs cannot perceive the existence of the EHT modulation bandwidth (because the EHT modulation bandwidth is outside the HE modulation bandwidth), even if the AID is in this range (greater than or equal to AID+$N_{STA,HE-TB}$, and less than AID+$N_{STA,HE-TB}$+$N_{STA,EHT-TB}$), the HE TB NDP would not be sent.

Optionally, when sending the EHT TB NDP, the first station can send the EHT TB NDP on the subcarrier corresponding to the resource unit subcarrier set index of the first station. The resource unit subcarrier set index of the first station can be determined based on the AID of the first station, the value of the starting AID in the first user information field, the EHT modulation bandwidth, and the quantity of stations scheduled by the NFRP trigger frame to feed back the HE TB NDP. To be specific, in a process in which or before the first station sends the EHT TB NDP, or after the first station receives the NFRP trigger frame, the first station can determine the resource unit subcarrier set index (RU_TONE_SET_INDEXEHT) of the first station according to the following formula. In other words, if the AID of the first station is greater than or equal to the starting AID+$N_{STA,HE-TB}$, and is less than AID+$N_{STA,HE-TB}$+$N_{STA,EHT-TB}$, the resource unit subcarrier set index of the first station is calculated according to the following formula (2-4):

$$\text{RU\_TONE\_SET\_INDEX}_{EHT} = 1 + N_{STA,HE-TB} + ((\text{AID}_{STA} - \text{Starting AID} - N_{STA,HE-TB}) \bmod (18 \times 2^{BW\text{-}EHT_{index}})) \quad (2\text{-}4)$$

In the formula (2-4), RU_TONE_SET_INDEX$_{EHT}$ represents the resource unit subcarrier set index of the first station. $N_{STA,HE-TB}$ represents the quantity of stations scheduled by the NFRP trigger frame to feed back the HE TB NDP. AID$_{STA}$ represents the association identifier of the first station. Starting AID represents the value of the starting AID field in the first user information field. BW-EHT$_{index}$ can be calculated according to the above formula (2-3). It is analogous to the meaning of BW-HE$_{index}$ that, BW-EHT$_{index}$ herein can represent the index of the EHT modulation bandwidth.

Optionally, when sending the HE TB NDP, the first station can send the HE TB NDP on the subcarrier corresponding to the resource unit subcarrier set index of the first station. The resource unit subcarrier set index of the first station can be determined based on the AID of the first station, the value of the starting AID in the first user information field, and the HE modulation bandwidth. To be specific, in a process in which or before the first station sends the HE TB NDP, or after the first station receives the NFRP trigger frame, the first station can determine the resource unit subcarrier set index (RU_TONE_SET_INDEX$_{HE}$) of the first station according to the following formula. In other words, if the AID of the first station is greater than or equal to the starting TB, and is less than AID+$N_{STA,HE-TB}$, the resource unit subcarrier set index of the first station is calculated according to the following formula (2-5):

$$\text{RU\_TONE\_SET\_INDEX}_{HE} = 1 + ((\text{AID}_{STA} - \text{Starting AID}) \bmod (18 \times 2^{BW\text{-}HE_{index}})) \quad (2\text{-}5)$$

In the formula (2-5), RU_TONE_SET_INDEX$_{HE}$ represents the resource allocation subcarrier set index in the HE modulation bandwidth. $AID_{STA}$ represents the association identifier of the first station. Starting AID represents the value of the starting AID field in the first user information field. BW-HE$_{index}$ indicates the index of the uplink bandwidth field, and shares a same meaning with BW$_{index}$ in the formula (1-1). Details are not described herein again.

In the 802.11ax standard, resource unit subcarrier set indexes (RU_TONE_SET_INDEX) are all numbered in ascending order of frequencies. In other words, refer to Table 2. When RU_TONE_SET_INDEX=1, a corresponding frequency is the lowest. A larger resource unit subcarrier set index indicates a higher frequency. However, in this application, the resource unit subcarrier set index in the EHT modulation bandwidth is also numbered in ascending order of frequencies, but the resource unit subcarrier set index in the EHT modulation bandwidth is greater than the resource unit subcarrier set index in the HE modulation bandwidth. In other words, the resource unit subcarrier set index in this application is first numbered from a lowest frequency to a highest frequency in the HE modulation bandwidth that can be perceived by the HE STA, and then numbered from a lowest frequency to a highest frequency in the EHT modulation bandwidth, which is outside the HE modulation bandwidth. In addition, the largest resource unit subcarrier set index in the HE modulation bandwidth is less than the smallest resource unit subcarrier set index in the EHT modulation bandwidth.

It should be understood that, because the 802.11be standard supports a preamble puncturing technology, numbers of a resource unit subcarrier set index in the EHT modulation bandwidth in a preamble puncturing case and in a non-preamble puncturing case may be different. A main difference is whether to number the resource unit subcarrier set index in a punctured channel in ascending order of frequencies in the preamble puncturing case. For ease of understanding, the following uses several examples respectively to describe the difference of the resource unit subcarrier set index in the EHT modulation bandwidth between the preamble puncturing case and the non-puncturing case. Example 1 is for the non-puncturing case. Examples 2, 3, and 4 are all for the puncturing case.

Example 1: If both the HE modulation bandwidth and the EHT modulation bandwidth are 160 MHz, RU_TONE_SET_INDEX in the lower 80 MHz in the HE modulation bandwidth ranges from 1 to 72, and RU_TONE_SET_INDEX in the upper 80 MHz ranges from 73 to 144. RU_TONE_SET_INDEX in the lower 80 MHz in the EHT modulation bandwidth ranges from 145 to 216, and RU_TONE_SET_INDEX in the upper 80 MHz ranges from 217 to 288. It should be understood that, because it is not specified in the 320 MHz channel that a frequency of the primary 160 MHz channel needs to be greater than a frequency of the secondary 160 MHz channel, resource unit subcarrier set index on the entire 320 MHz channel is not necessarily numbered in ascending order of frequencies. For example, a frequency of the primary 160 MHz channel is greater than that of the secondary 160 MHz channel. In this case, a resource unit subcarrier set index on the primary 160 MHz channel ranges from 1 to 144, and a resource unit subcarrier set index on the secondary 160 MHz channel ranges from 145 to 288.

Example 2: If the HE modulation bandwidth is 80 MHz, and the EHT modulation bandwidth is 160 MHz, another 80 MHz in the 160 MHz of the HE modulation bandwidth is punctured. In this case, RU_TONE_SET_INDEX in the HE modulation bandwidth ranges from 1 to 72, and RU_TONE_SET_INDEX in the lower 80 MHz in the EHT modulation bandwidth may range from 73 to 144 (RU_TONE_SET_INDEX in the punctured 80 MHz channel is not numbered in this manner), and may range from 145-216 (RU_TONE_SET_INDEX in the punctured 80 MHz channel is numbered in this manner, and RU_TONE_SET_INDEX in the punctured 80 MHz channel ranges from 73 to 144). Correspondingly, RU_TONE_SET_INDEX in the upper 80 MHz in the EHT modulation bandwidth ranges from 145 to 216, or from 217 to 288.

Example 3: If the HE modulation bandwidth is 160 MHz, and the EHT modulation bandwidth is 80 MHz, another 80 MHz bandwidth of the 160 MHz modulation bandwidth of the EHT is punctured. In this case, RU_TONE_SET_INDEX in the lower 80 MHz in the HE modulation bandwidth ranges from 1 to 72, and RU_TONE_SET_INDEX in the upper 80 MHz ranges from 73 to 144. The resource unit subcarrier set index in the EHT modulation bandwidth may range from 145 to 216 (RU_TONE_SET_INDEX in the punctured 80 MHz channel is not numbered), may also be located at the lower 80 MHz or the higher 80 MHz of the secondary 160 MHz channel based on the EHT modulation bandwidth (RU_TONE_SET_INDEX in the punctured 80 MHz channel is numbered), and ranges from 145 to 216 or ranges from 217 to 288 respectively. If the EHT modulation bandwidth of 80 MHz is located at the lower 80 MHz of the secondary 160 MHz channel, the resource unit subcarrier set index in the EHT modulation bandwidth ranges from 145 to 216; or if the EHT modulation bandwidth of 80 MHz is located at the higher 80 MHz of the secondary 160 MHz channel, a resource unit subcarrier set index in the EHT modulation bandwidth ranges from 217 to 288.

Example 4: If the HE modulation bandwidth is 80 MHz, the EHT modulation bandwidth is 240 MHz. It should be understood that the EHT modulation bandwidth is not necessarily equal to the bandwidth of the EHT PPDU. When the EHT modulation bandwidth is 240 MHz, it may be understood that the bandwidth of the EHT PPDU is 320 MHz, which is equivalent to that 80 MHz of the 320 MHz EHT TB NDP is punctured (in other words, the HE TB NDP is actually transmitted on the 80 MHz that is punctured). Therefore, RU_TONE_SET_INDEX in the HE modulation bandwidth ranges from 1 to 72. RU_TONE_SET_INDEX corresponding to the three 80 MHz bandwidths in ascending order of frequencies in the EHT modulation bandwidth ranges respectively from 73 to 144, from 145 to 216, and from 217 to 288 (in this way, RU_TONE_SET_INDEX in the punctured 80 MHz channel is numbered).

Optionally, because the 802.11ax standard defines a mapping relationship between a resource unit subcarrier set index ranging from 1 to 72 and a subcarrier in an 80 MHz bandwidth with a lowest frequency, in other words, as shown in Table 2, in this application, the following formula (2-6) may be used to map the resource unit subcarrier set index of the first station to the resource unit subcarrier set index in 80 MHz bandwidth with a lowest frequency in the HE modulation bandwidth in the 802.11ax protocol:

$$\text{RU\_TONE\_SET\_INDEX}_{HE,80} = \text{RU\_TONE\_SET\_INDEX}_{EHT} - (\text{BW-HE}/80 + M) \times 72 \quad (2\text{-}6)$$

In the formula (2-6), RU_TONE_SET_INDEX$_{HE,80}$ represents a resource unit subcarrier set index in the 80 MHz bandwidth with the lowest frequency in the HE modulation bandwidth in the 802.11ax protocol. RU_TONE_SET_INDEX$_{EHT}$ represents the resource unit subcarrier set index in the EHT modulation bandwidth. BW-HE indicates the HE modulation bandwidth. M represents an index of 80

MHz of RU_TONE_SET_INDEX$_{EHT}$, or M represents a sequence number of an 80 MHz bandwidth of RU_TONE_SET_INDEX$_{EHT}$ in ascending order of frequencies. M is one value in 0, 1, 2, and 3. When M is set to 0, 1, 2, or 3, M represents respectively four 80 MHz bandwidths in ascending order of frequencies in the EHT modulation bandwidth.

For example, if the HE modulation bandwidth is 160 MHz, RU_TONE_SET_INDEX$_{HE,80}$ in the lower 80 MHz ranges from 1 to 72, and RU_TONE_SET_INDEX$_{HE}$ in the upper 80 MHz ranges from 73 to 144. The EHT modulation bandwidth is 160 MHz, and RU_TONE_SET_INDEX$_{EHT}$ in the lower 80 MHz ranges from 145 to 216. Mapping may be performed according to the formula (2-6). In this case, the value of M in the formula (2-6) is set to 0, which means that (160/80+0)*72 is subtracted from 145 to 216 separately. In other words, a range after the mapping is from 1 to 72, and is in a one-to-one correspondence with the mapping relationship between RU_TONE_SET_INDEX$_{HE,80}$ in the 80 MHz with the lowest frequency in the HE modulation bandwidth and a subcarrier. Similarly, RU_TONE_SET_INDEX$_{EHT}$ in the higher 80 MHz in the EHT modulation bandwidth ranges from 217 to 288, and mapping is performed according to the formula (2-6). In this case, the value of M in the formula (2-6) is 1, which means that (160/80+1)*72 is subtracted from 217 to 288 separately, and the range after the mapping is from 1 to 72.

For another example, if the HE modulation bandwidth is 80 MHz and the EHT modulation bandwidth is 240 MHz, RU_TONE_SET_INDEX$_{HE,80}$ in the HE modulation bandwidth ranges from 1 to 72; and RU_TONE_SET_INDEX$_{EHT}$ corresponding to three 80 MHz bandwidths in ascending order of frequencies in the EHT modulation bandwidth ranges respectively from 73 to 144, from 145 to 216, and from 217 to 288. A range of RU_TONE_SET_INDEX$_{EHT}$ corresponding to each 80 MHz bandwidth in the EHT modulation bandwidth can be mapped according to the formula (2-6). In this case, values of M in the formula (2-6) are 0, 1, and 2 respectively in ascending order of frequencies. In other words, M is set to 0 in 80 MHz with a lowest frequency; M is set to 1 in 80 MHz with a middle frequency; and M is set to 2 in 80 MHz with a highest frequency.

Optionally, after determining an allocated subcarrier based on the resource unit subcarrier set index, the first station sends the EHT TB NDP or sends the HE TB NDP on the subcarrier corresponding to the resource unit subcarrier set index of the first station. If the modulation bandwidth to which the resource unit subcarrier set index of the first station belongs is the HE modulation bandwidth, the HE TB NDP is sent; or if the bandwidth is the EHT modulation bandwidth, the EHT TB NDP is sent.

Optionally, because the 802.11be standard supports the preamble puncturing technology, the NFRP trigger frame may further include preamble puncturing indication information, and the preamble puncturing indication information indicates a punctured channel. The preamble puncturing indication information may be located in 16 reserved bits or some reserved bits of the first user information field.

In an implementation, when a bandwidth of the PPDU is 20 MHz or 40 MHz, the preamble puncturing indication is neither supported nor required. When the PPDU bandwidth (including the HE modulation bandwidth and the EHT modulation bandwidth) is 80 MHz, if the preamble puncturing indication information has 4 bits, each bit separately indicates, in ascending order of frequencies, whether a 20 MHz sub-channel is punctured. When the PPDU bandwidth (including the HE modulation bandwidth and the EHT modulation bandwidth) is 160 MHz, if the preamble puncturing indication information has 8 bits, each bit separately indicates, in ascending order of frequencies, whether a 20 MHz sub-channel is punctured. When the PPDU bandwidth (including the HE modulation bandwidth and the EHT modulation bandwidth) is 320 MHz, if the preamble puncturing indication information has 16 bits, each bit separately indicates, in ascending order of frequencies, whether a 20 MHz sub-channel is punctured. When the PPDU bandwidth (including the HE modulation bandwidth and the EHT modulation bandwidth) is 320 MHz, indication granularity is widened to reduce the quantity of bits. For example, the preamble puncturing indication information has 8 bits, each bit separately indicates, in ascending order of frequencies, whether a 40 MHz sub-channel is punctured.

In another implementation, the preamble puncturing indication information is always 8 bits. When the PPDU bandwidth is 20 MHz or 40 MHz, all the 8 bits are reserved and do not indicate the preamble puncturing. When the PPDU bandwidth (including the HE modulation bandwidth and the EHT modulation bandwidth) is 80 MHz, the first 4 bits are used to respectively indicate whether the four 20 MHz sub-channels in ascending order of frequencies are punctured, and the last 4 bits are reserved. When the PPDU bandwidth (including the HE modulation bandwidth and the EHT modulation bandwidth) is 160 MHz, 8 bits are used to respectively indicate whether the four 20 MHz sub-channels in ascending order of frequencies are punctured. When the PPDU bandwidth (including the HE modulation bandwidth and the EHT modulation bandwidth) is 320 MHz, 8 bits are used to respectively indicate whether the four 40 MHz sub-channels in ascending order of frequencies are punctured.

In still another implementation, the preamble puncturing indication information is always 16 bits. When the PPDU bandwidth is 20 MHz or 40 MHz, all the 16 bits are reserved and do not indicate the preamble puncturing. When the PPDU bandwidth (including the HE modulation bandwidth and the EHT modulation bandwidth) is 80 MHz, the first 4 bits are used to respectively indicate whether the four 20 MHz sub-channels in ascending order of frequencies are punctured, and the last 12 bits are reserved. When the PPDU bandwidth (including the HE modulation bandwidth and the EHT modulation bandwidth) is 160 MHz, the first 8 bits are used to respectively indicate whether the four 20 MHz sub-channels in ascending order of frequencies are punctured. When the PPDU bandwidth (including the HE modulation bandwidth and the EHT modulation bandwidth) is 320 MHz, the 16 bits are used to respectively indicate whether the sixteen 20 MHz sub-channels in ascending order of frequencies are punctured.

In the three implementations, a bit sequence may perform indication in ascending order of frequencies; or may perform indication first in the HE modulation bandwidths, then in the EHT modulation bandwidth, and then in each modulation bandwidth in ascending order of frequencies; or may perform indication only in the EHT modulation bandwidth, because HE STA does not support the preamble puncturing. Optionally, the bit sequence of the preamble puncturing indication information may alternatively perform indication in descending order of frequencies or another predetermined order in the EHT modulation bandwidth.

It should be understood that the preamble puncturing can affect actual transmission bandwidth of the EHT TB NDP. It should be understood that, because the HE station does not support the HE TB NDP transmission with the preamble puncturing, the HE modulation bandwidth in this application is an HE PPDU bandwidth. However, the EHT modulation bandwidth in this application is not necessarily an EHT PPDU bandwidth. In a first implementation, when the NFRP trigger frame further includes the preamble puncturing indication information, the EHT modulation bandwidth refers to the actual transmission bandwidth, to be specific, the bandwidth obtained by removing the punctured channel indicated by the preamble puncturing indication information from the EHT PPDU bandwidth. In other words, $RU\_TONE\_SET\_INDEX_{EHT}$ calculated according to the formula (2-4) skips those punctured sub-channels. In other words, in this implementation, a punctured channel is first removed from the EHT PPDU bandwidth to form an equivalent channel size, and then calculate according to the formula (2-4). In this case, the sending depends on whether the AID of the station falls in a scheduled range.

In a second implementation, when the NFRP trigger frame further includes preamble puncturing indication information, if the resource for scheduling the first station by the NFRP trigger frame is in the EHT modulation bandwidth and is not on the punctured channel indicated by the preamble puncturing indication information, the first station can send the EHT TB NDP. If the resource for scheduling the first station by the NFRP trigger frame is in the EHT modulation bandwidth, and is on the punctured channel indicated by the preamble puncturing indication information, the first station neither sends the EHT TB NDP nor sends the HE TB NDP. In other words, if $RU\_TONE\_SET\_INDEX_{EHT}$ calculated by the first station according to the formula (2-4) is on the punctured channel, the first station does not reply. In other words, in this implementation, calculation according to the formula (2-4) is performed on an assumption that no puncturing is performed. When the AID of the first station falls in a scheduled range, whether the first station is scheduled to the punctured sub-channel needs to be checked, to determine whether the sending can be performed. It should be understood that, in this implementation, the EHT modulation bandwidth includes the bandwidth of the punctured channel. In other words, the EHT modulation bandwidth in this implementation may be understood as the EHT PPDU bandwidth. A quantity of EHT STAs that are scheduled to feed back the EHT TB NDP is the same in the first implementation and the second implementation.

It can be learned that, in this embodiment of this application, the EHT station further supports the EHT TB NDP transmission with the preamble puncturing.

Step S105: The access point receives, in the EHT modulation bandwidth, the EHT TB NDP from the first station, or receives, in the HE modulation bandwidth, the HE TB NDP from the first station.

Optionally, before the access point sends the NFRP trigger frame, the access point needs to configure, according to the formulas (2-1) to (2-3), a station to be scheduled. In addition, a resource is configured for the scheduled station according to the formulas (2-4) to (2-6). Therefore, the access point knows which stations are scheduled by the access point, and a location and a size of a resource of each station scheduled by the access point.

Optionally, the access point receives, in the EHT modulation bandwidth, the EHT TB NDP from the first station, or receives, in the HE modulation bandwidth, the HE TB NDP from the first station. Whether the access point receives the EHT TB NDP or the HE TB NDP depends on which type is sent by the first station. Specifically, when receiving the EHT TB NDP from the first station in the EHT modulation bandwidth, the access point may receive the EHT TB NDP on the subcarrier corresponding to the resource unit subcarrier set index of the first station. The resource unit subcarrier set index of the first station can be calculated according to the formula (2-4).

Optionally, if the NFRP trigger frame schedules the second-type station to send the HE TB NDP in the HE modulation bandwidth, after the step S101, the trigger based null data packet transmission method further includes the following steps:

Step S106: The second station in the second-type station receives the NFRP trigger frame.

Step S107: The second station sends the HE TB NDP in the HE modulation bandwidth. Correspondingly, the access point receives the HE TB NDP from the second station in the HE modulation bandwidth.

Optionally, in this application, behavior of the second station is the same as behavior of the HE station in the 802.11ax standard. Refer to descriptions of a station side in the 802.11ax standard. Details are not described herein again.

Figure 9:
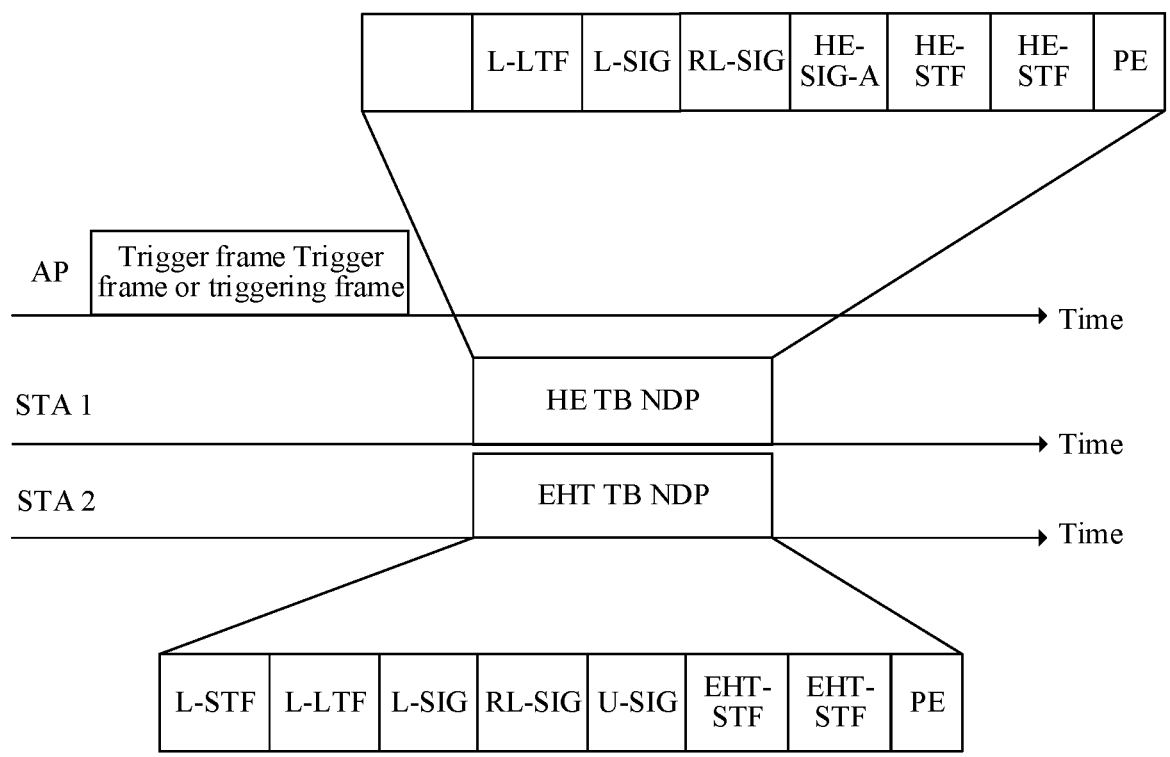
FIG. 9 is a schematic flowchart of a procedure in which a same NFRP trigger frame is used to trigger HE TB NDP transmission and EHT TB NDP transmission according to an embodiment of this application.

Optionally, for ease of understanding, the following uses an example to describe a method procedure provided in this embodiment of this application. FIG. 9 is a schematic flowchart of a procedure in which a same NFRP trigger frame is used to trigger HE TB NDP transmission and EHT TB NDP transmission according to an embodiment of this application. As shown in FIG. 9, the AP uses an NFRP trigger frame or a PPDU that carries the NFRP trigger frame to simultaneously schedule the HE TB NDP transmission and the EHT TB NDP transmission. After receiving the trigger frame, each station sends the HE TB NDP or the EHT TB NDP. It should be understood that, the trigger frame sent by the AP may schedule only the EHT TB NDP, without the HE TB NDP. Refer to the following Table 4. Table 4 shows meanings of some fields in the EHT TB PPDU.

TABLE 4

Meanings of some fields in the EHT TB NDP

| English acronyms and abbreviations | Full English names | Chinese meanings | Functions |
| --- | --- | --- | --- |
| L-STF | Legacy Short Training Field | Legacy short training field | PPDU discovery, coarse synchronization, and automatic gain control |
| L-LTF | Legacy Long Training Field | Legacy long training field | Fine synchronization and channel estimation |

TABLE 4-continued

Meanings of some fields in the EHT TB NDP

| English acronyms and abbreviations | Full English names | Chinese meanings | Functions |
|---|---|---|---|
| L-SIG | Legacy Signal Field A | Legacy signal field A | Carrying signaling information related to PPDU length to ensure coexistence |
| U-SIG | Universal SIG | Universal signal field | It is similar to HE-SIG-A, and a difference lies in that a unified signal field is used in subsequent standards starting from the EHT PPDU. Therefore, it is referred to as a universal signal field. |
| EHT-STF | Extremely High Throughput Short Training Field | Extremely high throughput short training field | Automatic gain control for subsequent fields |
| EHT-LTF | Extremely High Throughput Long Training Field | Extremely high throughput long training field | Channel estimation |
| PE | Packet Extension | Data packet extension | Increasing processing time of a receiver |

It can be learned that in embodiments of this application, in one aspect, a frame format of the 1$^{st}$ user information field in the user information list field of the original NFRP trigger frame is reused to schedule the EHT station to send the HE TB NDP in the HE modulation bandwidth, and send the EHT TB NDP in the EHT modulation bandwidth to respond to the NFRP trigger frame. The EHT station determines whether the resource for scheduling the EHT station is in the HE modulation bandwidth or the EHT modulation bandwidth, to determine whether the HE TB NDP or the EHT TB NDP is sent, so that the EHT station may be scheduled to send the EHT TB NDP to feed back the report, support the NDP feedback report procedure in the 802.11be standard, support the 320 MHz bandwidth, and support a feature such as the preamble puncturing. In another aspect, the special user information field (the value of the association identifier 12 field of the special user information field equals 2007) is added to the NFRP trigger frame and placed after the 1$^{st}$ user information field in the user information list field. The uplink bandwidth extension field in the special user information field and the uplink bandwidth field in the common information field jointly indicate the EHT modulation bandwidth. The EHT station can be scheduled without affecting the feedback of the HE station, so that the two types of stations are simultaneously scheduled to feed back the report.

In an optional embodiment, the first user information field can be used only to schedule the first-type station to send the EHT TB NDP in the EHT modulation bandwidth. In this case, the common information field of the NFRP trigger frame further includes an HE/EHT indication field, and the HE/EHT indication field may be set to 0, to indicate that the EHT TB NDP is transmitted on the primary 160 MHz channel. In other words, the entire PPDU bandwidth is the EHT modulation bandwidth. Only the EHT TB NDP is sent. When the AP is associated with the STA and performs AID allocation, the AP may set the AID of the HE STA (the second-type station) and the AID of the EHT STA (the first-type station) separately as much as possible. For example, if an AID allocated to the HE STA ranges from 1 to 72, and an AID allocated to the EHT STA ranges from 73 to 144, the starting AID field in the first user information field may be set to 73, and only the EHT STA is scheduled to send the EHT TB NDP. In this case, in the formula (2-1) and the formula (2-4), $N_{STA,HE-TB}=0$, and BW-EHT is the entire EHT PPDU bandwidth.

For RU_TONE_SET_INDEX, when the EHT modulation bandwidth is less than or equal to 160 MHz, refer to Table 2 for a mapping relationship between RU_TONE_SET_INDEX and a subcarrier. Details are not described herein again. When the EHT modulation bandwidth is greater than 160 MHz, RU_TONE_SET_INDEX in the EHT modulation bandwidth and RU_TONE_SET_INDEX in the HE modulation bandwidth can be mapped according to the following formula (2-7):

$$\text{RU\_TONE\_SET\_INDEX}_{HE,80} = \text{RU\_TONE\_SET\_INDEX}_{EHT} - M \times 72 \quad (2\text{-}7)$$

It should be understood that the formula (2-7) is a variant of the formula (2-6). Because there is only EHT modulation bandwidth in this embodiment of this application, BW-HE in formula (2-6) is equal to 0. BW-HE=0 substituted into the formula (2-6), and the formula (2-7) is obtained. Therefore, a meaning of each parameter in the formula (2-7) is the same as the meaning of the corresponding parameter in the formula (2-6). Details are not described herein again.

In addition, in a puncturing case, no index may be allocated to the punctured 80 MHz bandwidth. In other words, the value of M does not consider the punctured 80 MHz bandwidth. For example, if one 80 MHz bandwidth of the 320 MHz bandwidth is punctured, indexes of three remaining 80 MHz bandwidths are respectively M=0, 1, and 2 in ascending order of frequencies. In another manner, the punctured 80 MHz bandwidth may also be indexed. For example, if 80 MHz with a second lowest frequency of the 320 MHz bandwidth is punctured, indexes of three remaining 80 MHz bandwidths are respectively M=0, 1, and 3 in ascending order of frequencies. In still another manner, an index is also allocated to the punctured 80 MHz, but if the AID of the station is scheduled to the punctured 80 MHz, the NDP is not sent.

It can be learned that this embodiment of this application provides a solution of scheduling only the first-type station to send the EHT TB NDP in EHT modulation bandwidth.

Embodiment 2

Embodiment 2 of this application mainly describes an NFRP trigger frame design and a corresponding procedure in which a first-type station (an EHT station) and a second-type station (an HE station) respectively use a user information field for scheduling.

Figure 10:
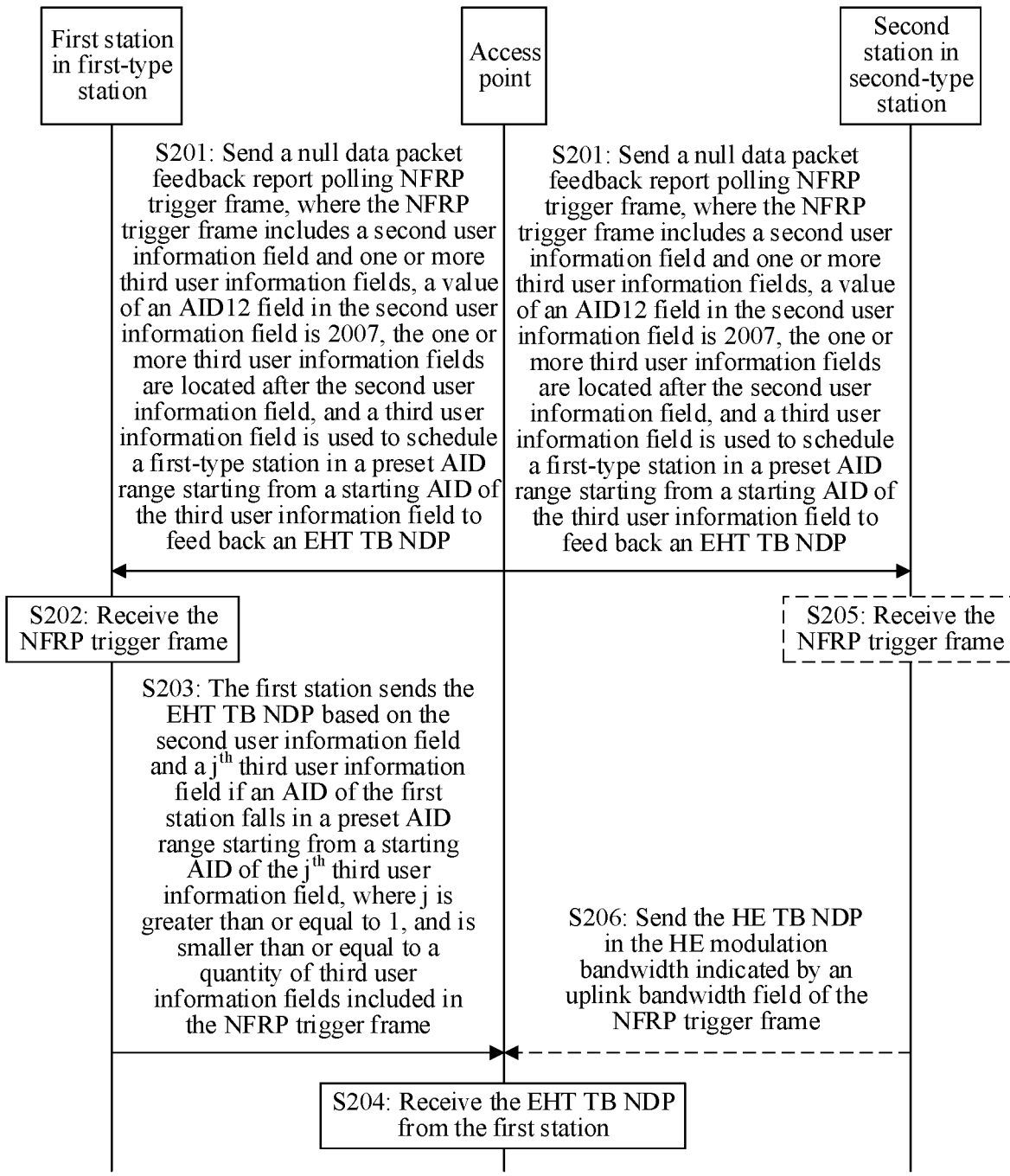
FIG. 10 is another schematic flowchart of a trigger based null data packet transmission method according to an embodiment of this application.

FIG. 10 is another schematic flowchart of a trigger based null data packet transmission method according to an embodiment of this application. A first station in the first-type station refers to any station that supports an 802.11be standard. Optionally, the first station may further support a next generation standard of the 802.11be standard; and a second station in the second-type station is any station that supports an 802.11ax standard but does not support the 802.11be standard. As shown in FIG. 10, the trigger based null data packet transmission method includes but is not limited to the following steps:

Step S201: An access point sends a null data packet feedback report poll NFRP trigger frame, where the NFRP trigger frame includes a second user information field and one or more third user information fields, a value of an AID12 field in the second user information field is 2007, the one or more third user information fields are located after the second user information field, and a third user information field is used to schedule a first-type station in a preset AID range starting from a starting AID of the third user information field to feed back an EHT TB NDP.

Optionally, the NFRP trigger frame includes a common information field and a user information list field. The user information list field includes a second user information field (in other words, a special user information field) and one or more third user information fields (in other words, an EHT user information field). The one or more third user information fields are located after the second user information field. The third user information field is used to schedule the first-type station in the preset AID range starting from the starting AID of the third user information field to feed back the EHT TB NDP. The second user information field includes an uplink bandwidth extension field and an AID12 field. A value of the AID12 field is 2007, or another reserved value, for example, a value in 1 to 2006 that is not allocated to any STA, or a value in 2008 to 2044. The uplink bandwidth extension field and an uplink bandwidth field of the NFRP trigger frame jointly indicate the EHT modulation bandwidth. The third user information field represents a user information field of the EHT station, and is referred to as an EHT user information field for short in this embodiment of this application. The EHT user information field and the HE user information field may have a same subfield (but may have different indications); and it can also be redesigned to be different from an HE user field. In this embodiment of this application, the HE user information field represents a user information field of the HE station.

Figures 1, 11A:
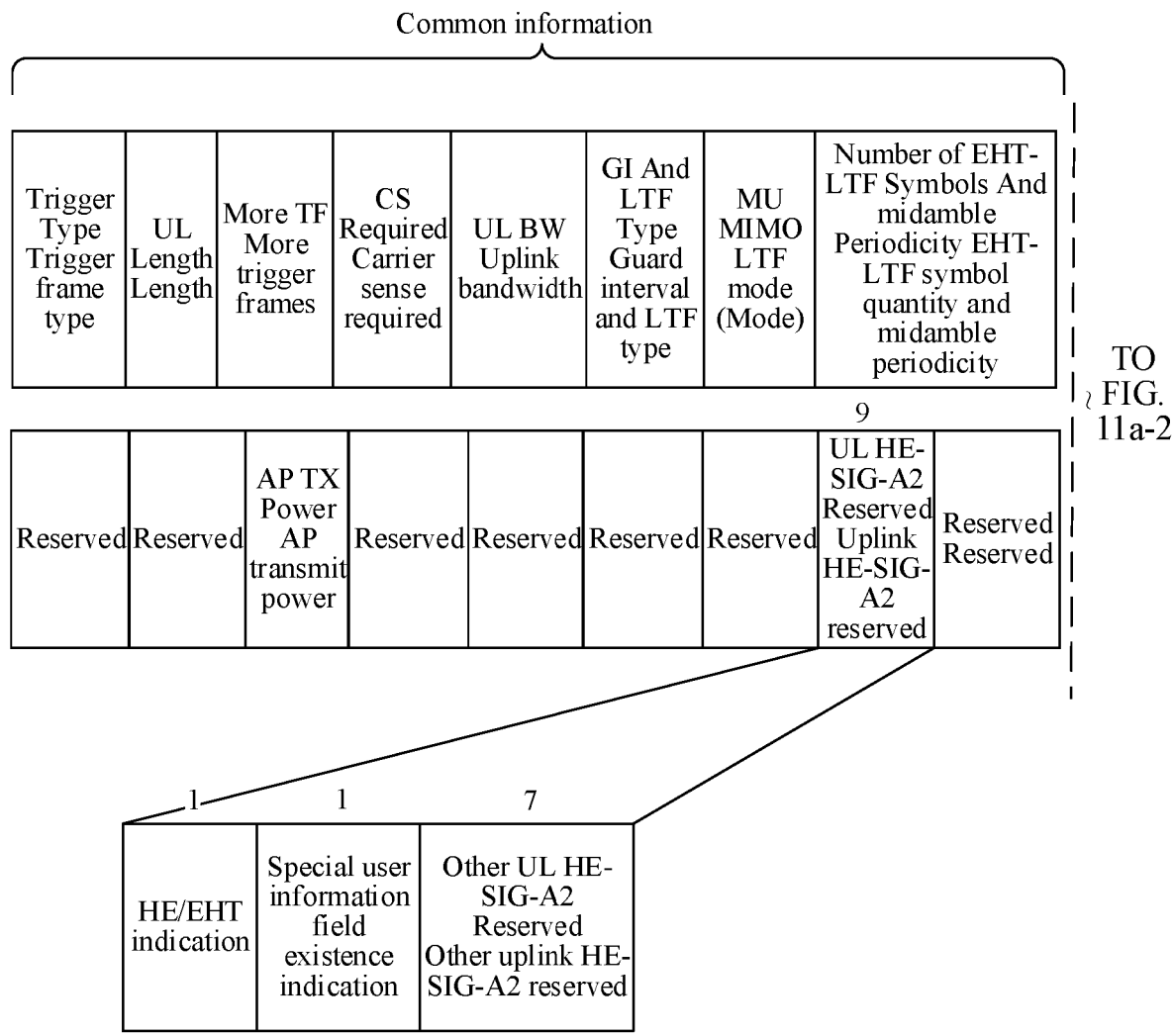
Figures 2, 11A:
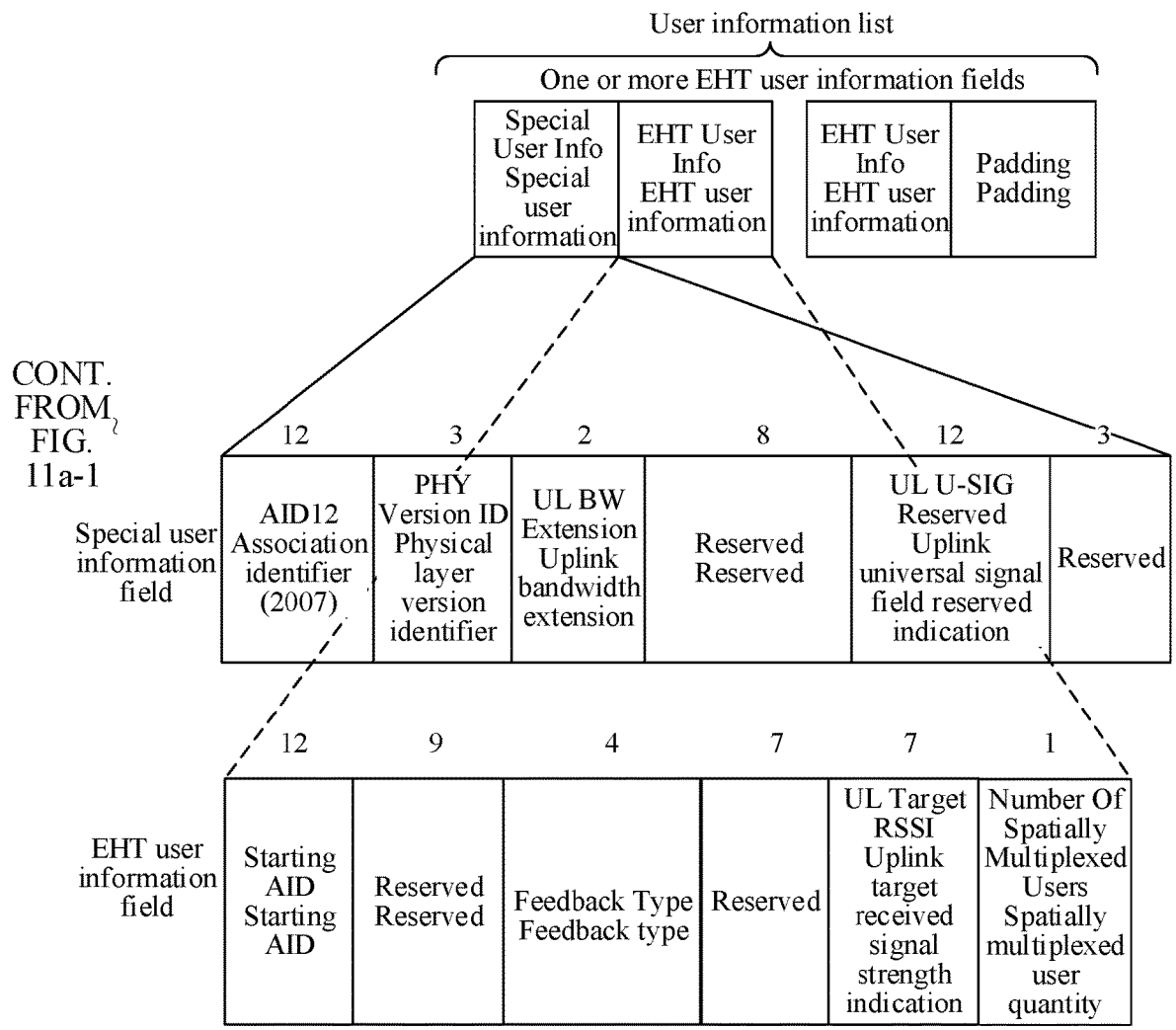

Optionally, the EHT user information field and the HE user information field have a same subfield. The third user information field includes the starting AID field, one or more reserved fields, a feedback type field, an uplink target received signal strength indication field, and a spatially multiplexed user quantity field. The starting AID field indicates the $1^{st}$ AID in the scheduled preset AID range. In other words, a frame format of the EHT user information field in the NFRP trigger frame is the same as a frame format of the $1^{st}$ user information field (referred to as the HE user information field in this application) included in the NFRP trigger frame in the 802.11ax standard. FIG. 11a-1 and FIG. 11a-2 are a schematic diagram 2 of a frame format of an NFRP trigger frame according to an embodiment of this application. As shown in FIG. 11a-1 and FIG. 11a-2, the NFRP trigger frame includes the common information field and the user information list field. The user information list field includes a special user information field (in other words, the second user information field) and one or more EHT user information fields (in other words, the third user information field). The special user information field is located before the one or more EHT user information fields.

Figures 1, 11B:
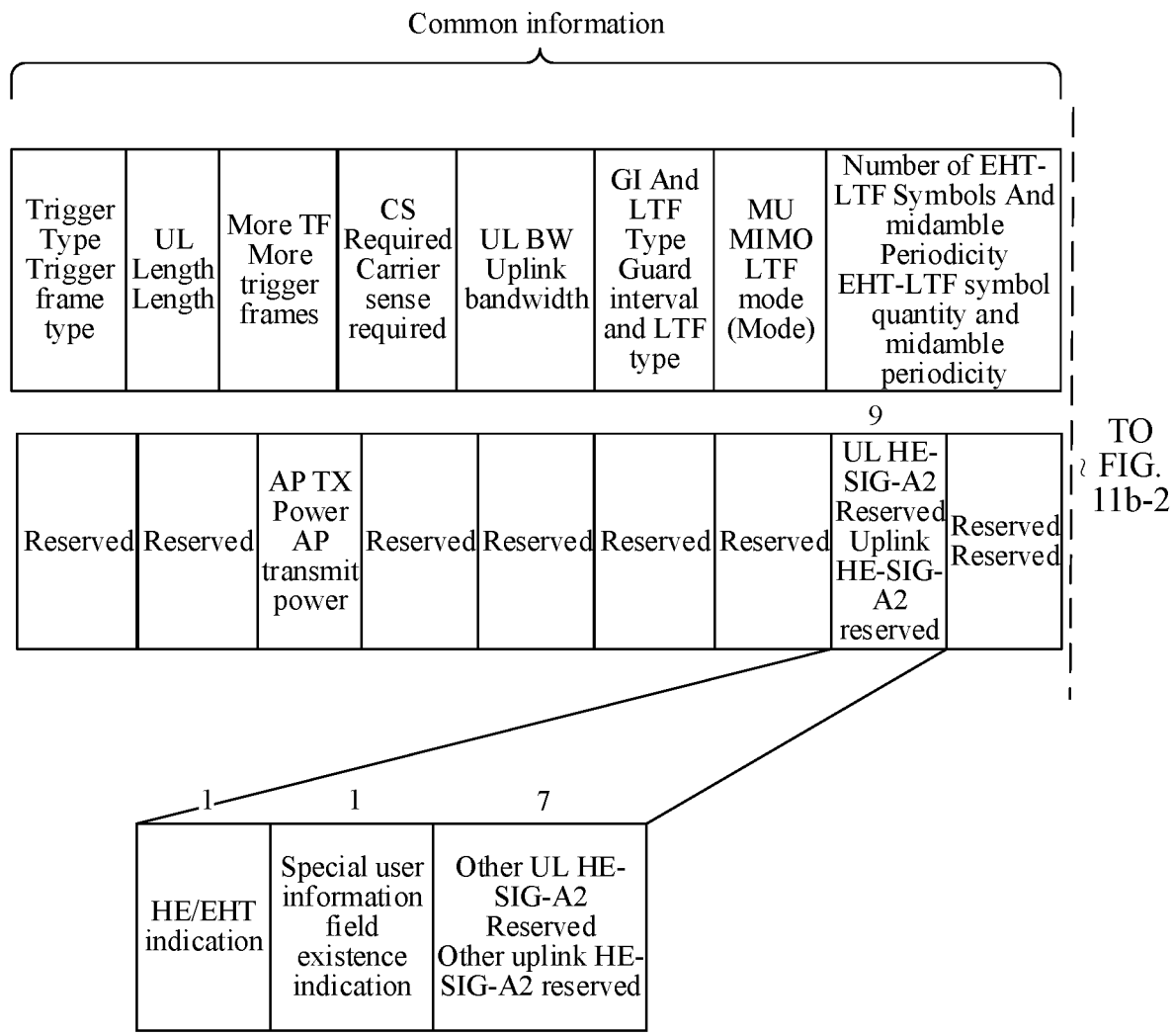
Figures 2, 11B:
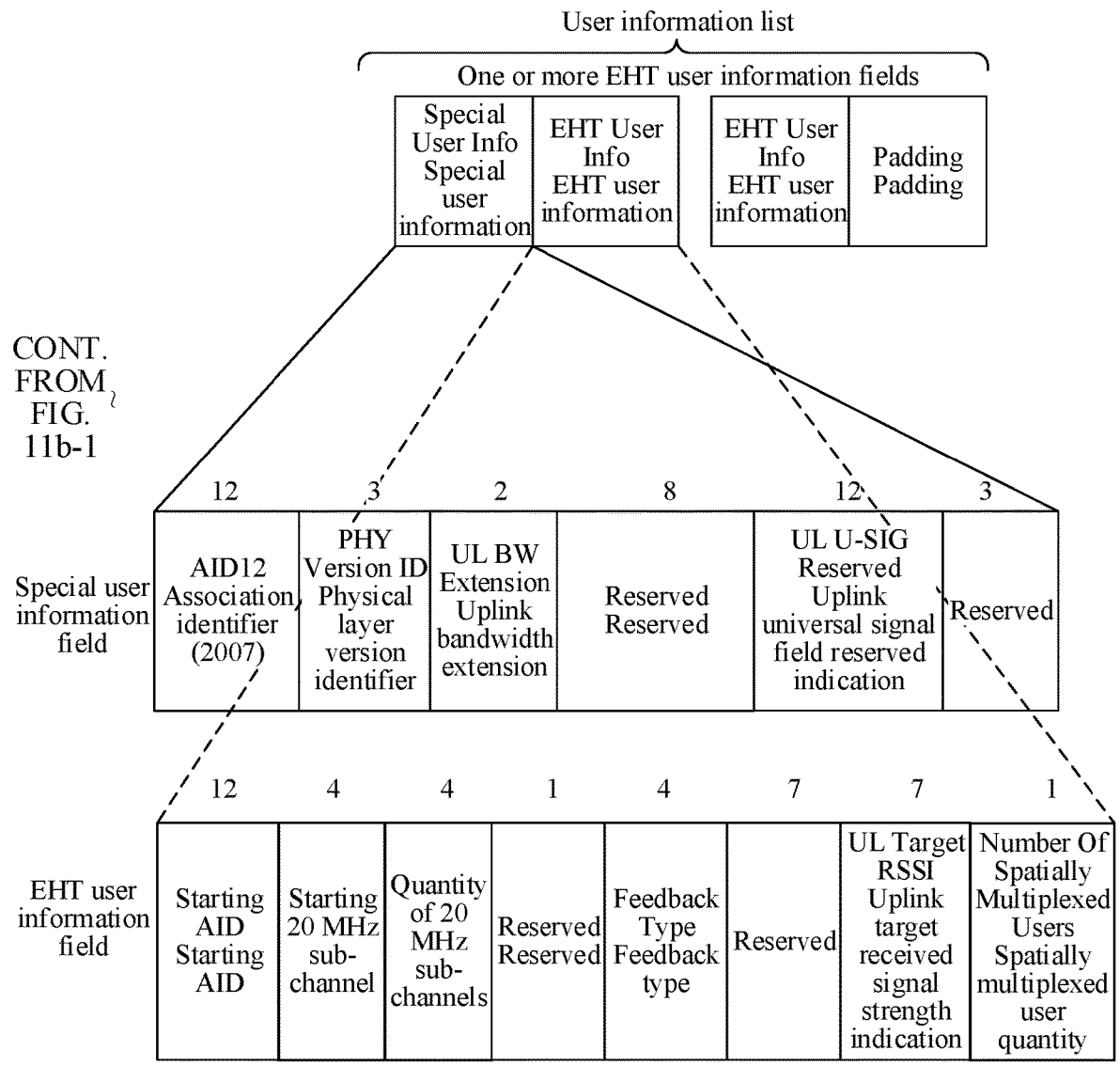

Optionally, the EHT user information field is different from the HE user information field. The third user information field includes the starting AID field, the EHT modulation bandwidth indication field, the one or more reserved fields, the feedback type field, the uplink target received signal strength indication field, and the spatially multiplexed user quantity field. The starting AID field indicates the $1^{st}$ AID in the scheduled preset AID range, and the EHT modulation bandwidth indication field indicates the EHT modulation bandwidth of the first-type station scheduled by the third user information field. The EHT modulation bandwidth indication field includes at least two of the following: a starting 20 MHz sub-channel, a quantity of 20 MHz sub-channels, and an end 20 MHz sub-channel. The starting 20 MHz sub-channel indicates a starting frequency of the EHT modulation bandwidth, the quantity of 20 MHz sub-channels indicates a size of the EHT modulation bandwidth, and the end 20 MHz sub-channel indicates an end frequency of the EHT modulation bandwidth. FIG. 11b-1 and FIG. 11b-2 are a schematic diagram 3 of a frame format of an NFRP trigger frame according to an embodiment of this application. As shown in FIG. 11b-1 and FIG. 11b-2, the user information list field of the NFRP trigger frame includes a special user information field (in other words, the second user information field) and one or more EHT user information fields (in other words, the third user information field). The special user information field is located before the one or more EHT user information fields. Each EHT user information field includes the starting AID field, the starting 20 MHz sub-channel field, the 20 MHz sub-channel quantity field, the reserved field, the feedback type field, the uplink target received signal strength indication field, and the spatially multiplexed user quantity field. It should be understood that the starting 20 MHz sub-channel field and the 20 MHz sub-channel quantity field can be represented by a reserved bit.

Figure 11C:
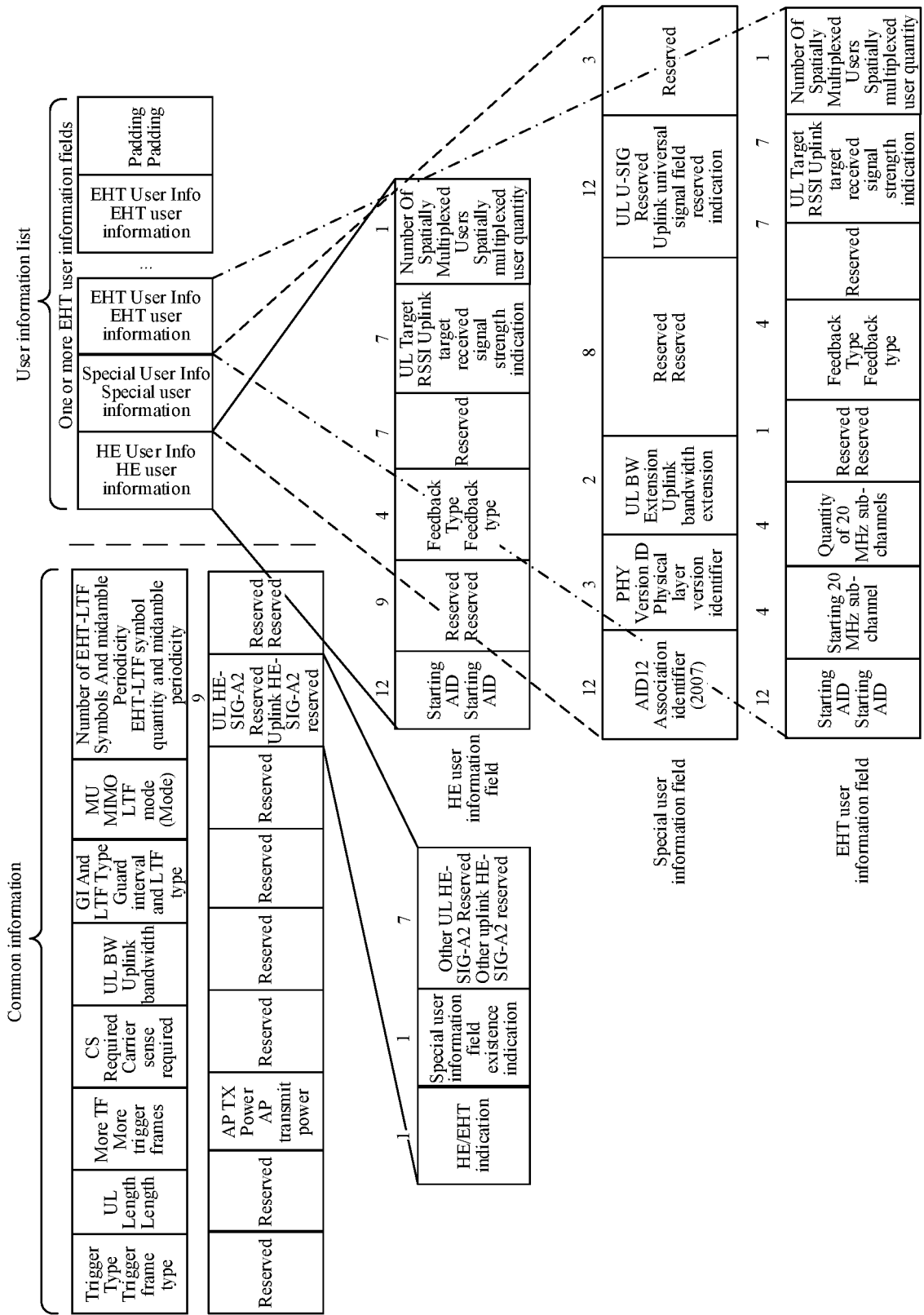
FIG. 11c is a schematic diagram 4 of a frame format of an NFRP trigger frame according to an embodiment of this application.

Optionally, the NFRP trigger frame further includes a fourth user information field. The fourth user information field is located before the second user information field, in other words, the fourth user information field is the $1^{st}$ user information field following the common information field of the NFRP trigger frame, in other words, the fourth user information field is the $1^{st}$ user information field in the user information list field. The fourth user information field is used to schedule the second-type station in the preset AID range starting from the starting AID of the fourth user information field to feed back the HE TB NDP. In this application, the first-type station is the EHT station, and the second-type station is the HE station. FIG. 11c is a schematic diagram 4 of a frame format of an NFRP trigger frame according to an embodiment of this application. It should be understood the HE user information field (in other words, the third user information field) and the EHT user information field (in other words, the third user information field) include different fields as an example shown in FIG. 11c. Actually, the fields may be the same. As shown in FIG. 11c, the HE user information field is located before the special user information field (the second user information field), and is used to collect the HE TB NDP from the HE STA; and the EHT user information field is located after the special user information field, and is used to collect the EHT TB NDP from the EHT STA.

Optionally, as shown in FIG. 11c, the feedback type of the EHT STA may be different from the feedback type of the HE STA. In other words, an indication of a feedback type field in the fourth user information field is different from an indication of a feedback type field in the third user information field. For example, the feedback type of the HE STA is a resource request, and the feedback type of the EHT STA is a report that the HE STA is in an awake state. Certainly, the feedback type of the EHT STA may be the same as the feedback type of the HE STA.

It can be learned that in this embodiment of this application, the EHT user information field (the third user information field) is located after the special user information field (the second user information field), so that the HE station can feed back the HE TB NDP without interfering with the EHT TB NDP fed back by the EHT station.

Step S202: The first station in the first-type station receives the NFRP trigger frame.

Step S203: The first station sends the EHT TB NDP based on the second user information field and a $j^{th}$ third user information field if an AID of the first station falls in a preset AID range starting from a starting AID of the $j^{th}$ third user information field, where j is greater than or equal to 1, and is less than or equal to a quantity of third user information fields included in the NFRP trigger frame.

Optionally, after receiving the NFRP trigger frame, the first station in the first-type station may first determine whether the AID of the first station falls in the preset AID range starting from the starting AID of the third user information field. If the AID of the first station falls in a preset AID range starting from the starting AID of the $j^{th}$ third user information field, the first station generates the EHT TB NDP based on the second user information field, and sends the EHT TB NDP on a subcarrier corresponding to the resource unit subcarrier set index of the first station based on an indication of the $j^{th}$ third user information field. j is greater than or equal to 1, and is less than or equal to the quantity of third user information fields included in the NFRP trigger frame. It should be understood that, if the quantity of third user information fields included in the NFRP trigger frame is 1, j herein is equal to 1.

Optionally, the AID range (in other words, the preset AID range) of the first-type station scheduled by the third user information field starts from the value of the starting AID field in the third user information field, and ends with a sum of the value of the starting AID field and a quantity of first-type stations scheduled by the third user information field. In other words, the AID range (in other words, the preset AID range) of the first-type station scheduled by the third user information field is greater than or equal to the value of the starting AID field, and is less than the quantity of first-type stations scheduled by the third user information field. The AID range is namely an interval [starting AID, starting AID+quantity of first-type stations scheduled by the third user information field). There are two manners for determining the quantity of first-type stations scheduled by the third user information field. The first determining manner is for the frame format in FIG. 11a-1 and FIG. 11a-2, and the second determining manner is for the frame format in FIG. 11b-1 and FIG. 11b-2 or FIG. 1c. In other words, the first determining manner is applicable to a case in which the EHT user information field is the same as the HE user information field, and the second determining manner is applicable to a case in which the EHT user information field is different from the HE user information field.

First determining manner: If there is only one third user information field included in the NFRP trigger frame, the quantity of first-type stations scheduled by the third user information field is based on the EHT modulation bandwidth jointly indicated by the uplink bandwidth extension field and the uplink bandwidth field, and a value indicated by the spatially multiplexed user quantity field in the third user information field. If there are a plurality of third user information fields included in the NFRP trigger frame, there also need to be a plurality of uplink bandwidth extension fields in a one-to-one correspondence with the third user information fields. In this case, a reserved bit in the second user information field or a reserved bit in the common information field of the NFRP trigger frame can be used to carry the plurality of uplink bandwidth extension fields. The quantity of first-type stations scheduled by the third user information field is determined based on the EHT modulation bandwidth (the EHT modulation bandwidth herein is for the group of EHT stations scheduled by the third user information field) jointly indicated by the uplink bandwidth extension field corresponding to the third user information field and the uplink bandwidth field in the common information field of the NFRP trigger frame, and the value indicated by the spatially multiplexed user quantity field in the third user information field.

Second determining manner: The quantity of first-type stations scheduled by the third user information field is determined based on the EHT modulation bandwidth indicated by the EHT modulation bandwidth indication field (namely, any two of the starting 20 MHz sub-channel, the quantity of 20 MHz sub-channels, and the end 20 MHz sub-channel) in the third user information field, and a value indicated by the spatially multiplexed user quantity field in the third user information field.

The first determining manner and the second determining manner may also be described through a mathematical expression form, and are specifically shown in the following formula (3-1). In other words, the quantity $N_{STA,EHT-TB,Gj}$ of first-type stations (EHT STA) scheduled by the $j^{th}$ third user information field may be calculated according to the following formula (3-1):

$$N_{STA,EHT-TB,Gj} = 18 \times 2^{BW-EHT_{index,Gj}} \times (\text{Multiplexing-Flag}+1) \qquad (3-1)$$

MultiplexingFlag in the formula (3-1) represents the value indicated by the spatially multiplexed user quantity field in the $j^{th}$ third user information field. $BW\text{-}EHT_{index,Gj}$ can be calculated according to the following formula (3-2):

$$BW - EHT_{index,Gj} = \log_2\left(\frac{BW - EHT_{Gj}}{20}\right) = \log_2 N_{20\,MHz,Gj} \qquad (3-2)$$

In the formula (3-2), for the frame format shown in FIG. 11a-1 and FIG. 11a-2, $BW\text{-}EHT_{Gj}$ represents the EHT modulation bandwidth jointly indicated by the uplink bandwidth extension field and the uplink bandwidth field corresponding to the $j^{th}$ third user information field. $BW\text{-}EHT_{index,Gj}$ represents an index of the EHT modulation bandwidth corresponding to the $j^{th}$ third user information field. For the frame format shown in FIG. 11b-1 and FIG. 11b-2 or FIG. 11c, $BW\text{-}EHT_{Gj}$ represents an EHT modulation bandwidth jointly indicated by the starting 20 MHz sub-channel and the quantity of 20 MHz sub-channels in the $j^{th}$ third user information field. A subscript Gj in BW-EHT$_{Gj}$ represents a group of EHT stations scheduled by the $j^{th}$ third user information field. BW-EHT$_{Gj}$ can further represent the EHT modulation bandwidth allocated by the AP to the group of EHT stations scheduled by the $j^{th}$ third user information field. For example, the subscript G1 in BW-EHT$_{G1}$ represents a group of EHT users scheduled by the $1^{st}$ EHT user information field following the special user information field; and BW-EHT$_{G1}$ indicates the EHT modulation bandwidth allocated by the AP to a group of EHT users scheduled by the $1^{st}$ EHT user information field following the special user information field. A subscript Gj in N$_{STA,EHT-TB, Gj}$ and a subscript Gj in BW-EHT$_{Gj}$ are similar. It should be understood that the group of EHT stations mentioned in this embodiment of this application may include only one EHT station.

Optionally, if the AID of the first station is greater than or equal to a starting AID$_{Gj}$ of the $j^{th}$ third user information field, and is less than a sum of the starting AID$_{Gj}$ and the quantity of first-type stations scheduled by the $j^{th}$ third user information field N$_{STA,EHT-TB,Gj}$, it indicates that the AID of the first station falls in the preset AID range starting from the starting AID of the $j^{th}$ third user information field, and also indicates that the first station is scheduled by the $j^{th}$ third user information field to feed back the EHT TB NDP. The first station then generates the EHT TB NDP based on the second user information field, and sends the EHT TB NDP on the subcarrier corresponding to the resource unit subcarrier set index of the first station based on the indication of the $j^{th}$ third user information field. The resource unit subcarrier set index of the first station is determined based on the AID of the first station, the value of the starting AID of the $j^{th}$ third user information field, and the EHT modulation bandwidth. In other words, when the AID of the first station is greater than or equal to the starting AID$_{Gj}$ and is less than the starting AID$_{Gj}$+N$_{STA,EHT-TB,Gj}$, the resource unit subcarrier set index RU_TONE_SET_INDEX$_{Gj}$ of the first station can be calculated according to the following formula (3-3):

$$RU\_TONE\_SET\_INDEX_{Gj}=1+((AID_{STA}-Starting\ AID_{Gj}) \bmod (18 \times 2^{BW\text{-}EHT_{index,Gj}})) \quad (3\text{-}3)$$

In the formula (3-3), AID$_{STA}$ represents an association identifier of the first station, and Starting AID$_{Gj}$ represents the value of the starting AID field in the $j^{th}$ third user information field. BW-EHT$_{index,Gj}$ may be calculated according to the formula (3-2). Details are not described herein again. BW-EHT$_{index,Gj}$ represents the index of the EHT modulation bandwidth corresponding to the $j^{th}$ third user information field.

For the frame format shown in FIG. 11a-1 and FIG. 11a-2, BW-EHT$_{Gj}$ represents the EHT modulation bandwidth jointly indicated by the uplink bandwidth extension field and the uplink bandwidth field corresponding to the $j^{th}$ third user information field in the NFRP trigger frame. For the frame format shown in FIG. 11b-1 and FIG. 11b-2 or FIG. 11c, BW-EHT$_{Gj}$ represents the EHT modulation bandwidth jointly indicated by the starting 20 MHz sub-channel and the quantity of 20 MHz sub-channels in the $j^{th}$ third user information field.

Optionally, RU_TONE_SET_INDEX$_{Gj}$ calculated according to the formula (3-3) is in the EHT modulation bandwidth (the NFRP trigger frame may indicate a plurality of EHT modulation bandwidths, because there may be a plurality of third user information fields, and a third user information field corresponds to an EHT modulation bandwidth). The EHT modulation bandwidth is allocated by the AP to the group of EHT stations scheduled by the $j^{th}$ third user information field. In other words, RU_TONE_SET_INDEX$_{Gj}$ calculated according to the formula (3-3) is an index in the group. Therefore, RU_TONE_SET_INDEX$_{Gj}$ needs to be mapped to a resource unit subcarrier set index in the entire PPDU based on a location of the EHT modulation bandwidth corresponding to the $j^{th}$ third user information field in the entire PPDU bandwidth. In each EHT modulation bandwidth, a resource unit subcarrier set index is also numbered in ascending order of frequencies.

Specifically, because the 802.11ax standard defines a mapping relationship between a resource unit subcarrier set index ranging from 1 to 72 and a subcarrier in an 80 MHz bandwidth with a lowest frequency, in other words, as shown in Table 2, in this application, the following formula (3-4) may be used to map the resource unit subcarrier set index of the first station (in other words, RU_TONE_SET_INDEX$_{Gj}$) to the resource unit subcarrier set index in the 80 MHz bandwidth with the lowest frequency in the HE modulation bandwidth in an 802.11ax protocol:

$$RU\_TONE\_SET\_INDEX_{HE,80}=RU\_TONE\_SET\_INDEX_{Gj}-N_{STA,HE\text{-}TB}-(18\times(Multiplexing+1)\times N_{S20,Gj\text{-}S20,EHT}) \quad (3\text{-}4)$$

In the formula (3-4), RU_TONE_SET_INDEX$_{HE,80}$ represents a resource unit subcarrier set index in 80 MHz bandwidth with a lowest frequency in the HE modulation bandwidth in the 802.11ax protocol. RU_TONE_SET_INDEX$_{Gj}$ represents the resource unit subcarrier set index of the first station. N$_{STA,HE\text{-}TB}$ represents a quantity of second-type stations scheduled by the NFRP trigger frame to feed back the HE TB NDP. MultiplexingFlag represents the value indicated by the spatially multiplexed user quantity field in the $j^{th}$ third user information field. N$_{S20,Gj\text{-}S20,EHT}$ indicates the quantity of 20 MHz channels between a starting 20 MHz sub-channel in the EHT modulation bandwidth corresponding to the $j^{th}$ third user information field and a 20 MHz sub-channel with a lowest frequency in the entire EHT modulation bandwidth (in other words, the entire PPDU bandwidth) of all first-type stations scheduled by the NFRP trigger frame. For example, provided that the starting 20 MHz sub-channel in the EHT modulation bandwidth corresponding to the $j^{th}$ third user information field is the $3^{rd}$ 20 MHz sub-channel in ascending order of frequencies in a 320 MHz channel. A lowest 20 MHz sub-channel in the entire PPDU bandwidth is a lowest 20 MHz sub-channel (namely, the $1^{st}$ 20 MHz sub-channel in ascending order of frequencies) in the 320 MHz channel, and in this case, N$_{S20,Gj\text{-}S20,EHT}$ is 2 (3-1=2).

For example, provided that j is equal to 1, RU_TONE_SET_INDEXG1 ranges from 1 to N$_{STA,EHT\text{-}TB,G1}$, in other words, RU_TONE_SET_INDEX$_{G1}$ is a number in EHT-BW$_{G1}$. RU_TONE_SET_INDEX in the entire PPDU is required to be matched based on EHT-BW$_{G1}$ and the overall PPDU bandwidth. In this case, RU_TONE_SET_INDEX as a whole corresponding to RU_TONE_SET_INDEXG1 ranges from 1+N$_{STA,HE\text{-}TB}$+(18*(Multiplexing+1)*N$_{S20,G1\text{-}S20,EHT}$) to N$_{STA,HE\text{-}TB}$+N$_{STA,EHT\text{-}TB,G}$1+(18*(Multiplexing+1)*N$_{S20,G1\text{-}S20,EHT}$).

It should be understood that, for the formula (3-4), if the fourth user information field (such as the frame format shown in FIG. 11a-1 and FIG. 11a-2 and FIG. 11b-1 and FIG. 11b-2 above) does not exist (or is not included) in the NFRP trigger frame, N$_{STA,HE\text{-}TB}$=0 in the formula (3-4).

Optionally, because the 802.11be standard supports a preamble puncturing technology, the NFRP trigger frame may further include preamble puncturing indication information, and the preamble puncturing indication information indicates a punctured channel. The preamble puncturing indication information may be located in a reserved bit of the third user information field. For a specific implementation, refer to the corresponding descriptions in Embodiment 1, and details are not described herein again.

Figure 11D:
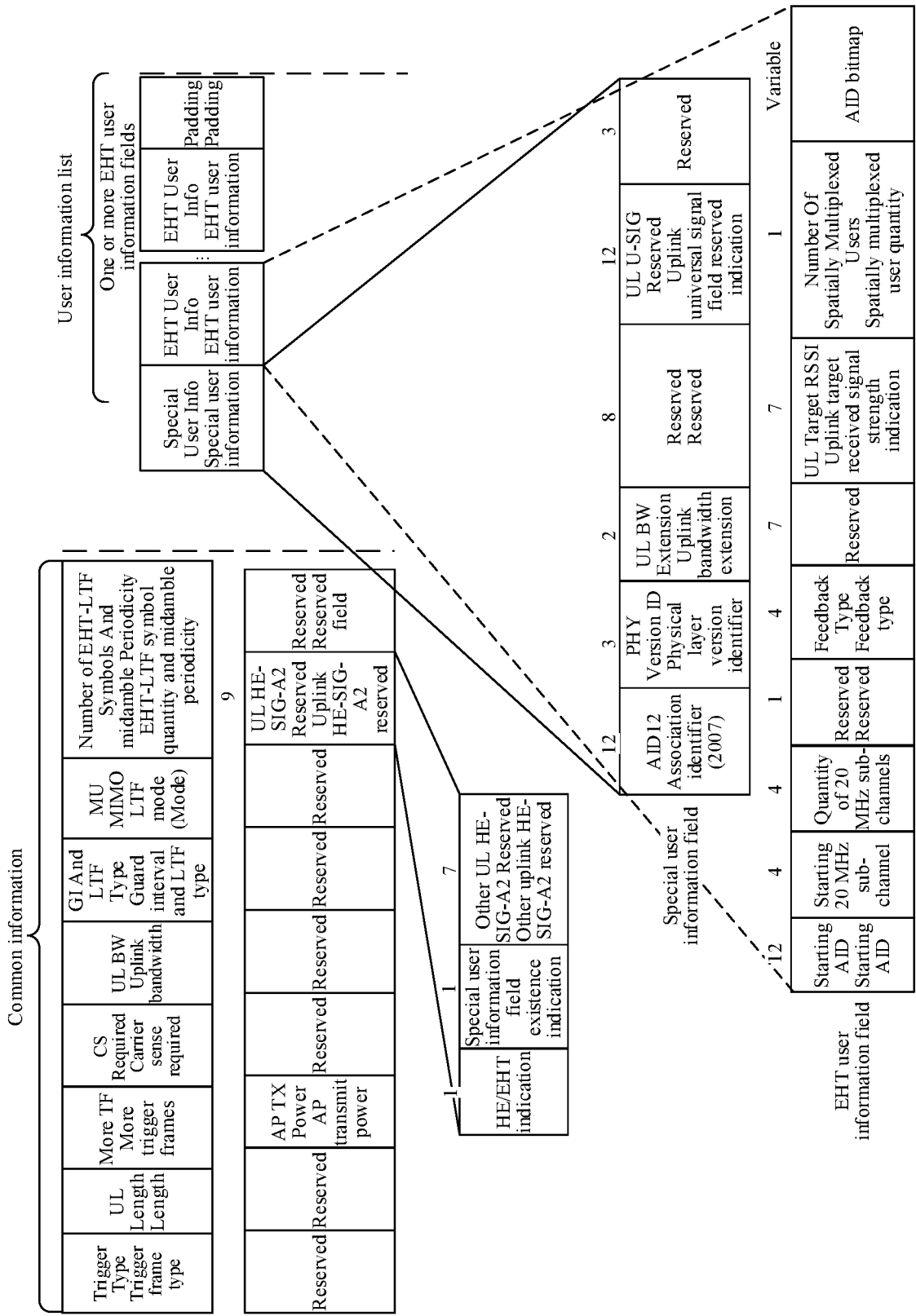
FIG. 11d is a schematic diagram 5 of a frame format of an NFRP trigger frame according to an embodiment of this application.

Optionally, in the third user information field, an AID bitmap may further exist, and indicates EHT STAs with specific AIDs that need to ignore the third user information field, in other words, the EHT STAs with the specific AIDs that do not need to perform feedback. FIG. 11d is a schematic diagram 5 of a frame format of an NFRP trigger frame according to an embodiment of this application. As shown in FIG. 11d, the NFRP trigger frame includes the special user information field (in other words, the second user information field) and one or more EHT user information fields (in other words, the third user information field). The EHT user information field includes the AID bitmap, and a length of the AID bitmap is variable. For example, it is specified that, it needs to be ensured that a quantity of 1 that appears is $N_{STA,EHT-TB,Gj}$. In other words, it needs to be ensured that $N_{STA,EHT-TB,Gj}$ EHT stations perform feedback. In this manner, the EHT STA can be flexibly scheduled for the feedback, and the AID of the scheduled EHT STA may not necessarily be continuous.

For example, it is assumed that the starting AID is 1, $N_{STA,\ EHT-TB,\ and\ Gj}$ are 18, and the AID bitmap is: 111 000 111 111 111 111 111. It is assumed that when the bit is 1, it indicates that the corresponding EHT station needs to perform feedback; or when the bit is 0, it indicates that the corresponding EHT station does not need to perform feedback. In this case, an EHT STA whose AID is any one of 1 to 3, and 7 to 21 needs to feed back the EHT TB NDP; and an EHT STA whose AID is any one of 4 to 6 does not need to perform feedback. It should be understood that a station whose AID falls in a range of 4 to 6 herein may be an HE STA that cannot perform feedback, or may be a STA in a dormant state, or may be a STA that has recently performed reporting. This can further save resources.

It should be understood that, in a case of an AID bitmap in the third user information field, to determine that the EHT STA is scheduled, the EHT STA needs to meet the following requirements: The AID of the EHT STA is greater than or equal to the starting $AID_{Gj}$, and is less than the starting $AID_{Gj}+N_{STA,EHT-TB,Gj}+N_{zeros}$. $N_{zeros}$ represents a quantity of 0 in the AID bitmap. Similarly, the formula (3-3) also needs to be modulated into the following formula (3-5):

$$RU\_TONE\_SET\_INDEX_{Gj}=1+((AID_{STA}-\text{Starting }AID_{Gj}-N_{zeros\ before\ AID})\bmod(18\times 2^{BW-EHT_{index,Gj}})) \quad (3-5)$$

In the formula (3-5), $N_{zeros}$ before AID indicates a quantity of 0 before a bit corresponding to an AID of the first station in the AID bitmap. Alternatively, $AID_{STA}$—Starting $AID_{Gj}$—$N_{Zeros\ before\ AID}$ may also be understood as a quantity of 1 that exists before the bit corresponding to the AID of the first station in the AID bitmap (excluding the bit corresponding to the AID of the first station).

Optionally, if AIDs of some EHT STAs exist in a preset AID range indicated by the HE user information field (in other words, the fourth user information field) and the EHT user information field (in other words, the third user information field), rules can be defined to restrict behavior of these EHT STAs. For example, the EHT STAs perform feedback only based on an indication of the EHT user information field (in other words, the third user information field) (in other words, these EHT STAs feed back the EHT TB NDP); or perform feedback based only on an indication of the HE user information field (in other words, the fourth user information field) (in other words, these EHT STAs feed back HE TB NDP). Alternatively, for an EHT STA with a strong capability in these EHT STAs, both the HE TB NDP and the EHT TB NDP may be fed back. This manner is applicable to a scenario in which feedback types indicated by the HE user information field and the EHT user information field are different.

Step S204: The access point receives the EHT TB NDP from the first station.

Optionally, before the access point sends the NFRP trigger frame, the access point needs to configure, according to the formulas (3-1) to (3-2), a first-type station to be scheduled. In addition, a resource is configured for the scheduled first-type station according to the formulas (3-3) to (3-5). Therefore, the access point knows which first-type stations are scheduled by the access point, and a location and a size of a resource of each first-type station scheduled by the access point.

Optionally, the access point receives the EHT TB NDP from the first station in the EHT modulation bandwidth corresponding to the $j^{th}$ third user information field. Specifically, the access point receives the EHT TB NDP from the first station on the subcarrier corresponding to the resource unit subcarrier set index of the first station. The resource unit subcarrier set index of the first station can be calculated according to the formula (3-3).

Optionally, if the NFRP trigger frame includes the fourth user information field, the fourth user information field is used to schedule the second-type station in the preset AID range starting from the starting AID of the fourth user information field to feed back the HE TB NDP; and after step S201, the trigger based null data packet transmission method further includes the following steps:

Step S205: The second station in the second-type station receives the NFRP trigger frame.

Step S206: The second station sends the HE TB NDP in the HE modulation bandwidth indicated by the uplink bandwidth field of the NFRP trigger frame. Correspondingly, the access point receives the HE TB NDP from the second station in the HE modulation bandwidth.

Optionally, in this application, behavior of the second station is the same as behavior of the HE station in the 802.11ax standard. Refer to the descriptions of the station side in the 802.11ax standard. Details are not described herein again.

It can be learned that in this embodiment of this application, the user information field is separately designed for the first-type station (the EHT station), and the user information field not only can schedule the EHT station to send the EHT TB NDP to feed back the report, support the NDP feedback report procedure in the 802.11be standard, support the 320 MHz bandwidth, and support a feature such as the preamble puncturing, but also can be applicable to a new function (for example, the feedback type field in the third user information field is not set to 1). In addition, the AID bitmap is further designed in the third user information field to schedule EHT STA whose AID is not completely continuous, to feed back the EHT TB NDP. In addition, the location (the $1^{st}$ user information field after common information field) of the HE user information field in the original NFRP trigger frame is not changed, so that the EHT station can be scheduled without affecting the feedback of the HE station, and the two types of stations can be simultaneously scheduled to feed back the report.

The foregoing content describes in detail the method provided in this application. For ease of implementing solutions in embodiments of this application, a related apparatus or device is further provided in embodiments of this application.

In embodiments of this application, division of function modules of the access point and the first station may be performed based on the foregoing method example. For example, each function module may be obtained through division in correspondence to each function, or two or more functions may be integrated into one processing module. The integrated module may be implemented in a form of hardware, or may be implemented in a form of a software function module. It should be noted that, in embodiments of this application, the module division is an example, and is merely logical function division, and there may be another division manner during actual implementation. The following describes in detail a communication apparatus in embodiments of this application with reference to FIG. 12 to FIG. 14. The communication apparatus is an access point or a first station, and further, the communication apparatus may be an apparatus in the AP; or the communication apparatus is an apparatus in a first STA.

Figure 12:
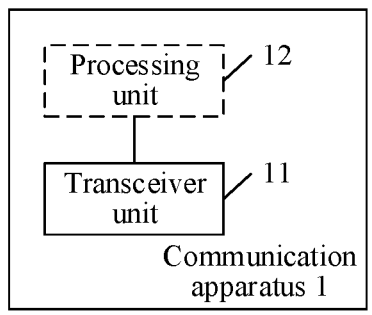
FIG. 12 is a schematic diagram of a structure of a communication apparatus 1 according to an embodiment of this application.

In a case of using an integrated unit, refer to FIG. 12. FIG. 12 is a schematic diagram of a structure of a communication apparatus 1 according to an embodiment of this application. The communication apparatus 1 may be an AP or a chip in the AP, for example, a Wi-Fi chip. As shown in FIG. 12, the communication apparatus 1 includes a transceiver unit 11, and optionally includes a processing unit 12.

In a design, the transceiver unit 11 is configured to send an NFRP trigger frame; and the transceiver unit 11 is further configured to receive, in an EHT modulation bandwidth, an EHT TB NDP from a first station in a first-type station, or receive, in an HE modulation bandwidth, an HE TB NDP from the first station. The NFRP trigger frame includes HE modulation bandwidth indication information and EHT modulation bandwidth indication information. The HE modulation bandwidth indication information indicates the HE modulation bandwidth, and the EHT modulation bandwidth indication information indicates the EHT modulation bandwidth. The NFRP trigger frame further includes a first user information field, and the first user information field is the 1$^{st}$ user information field following a common information field of the NFRP trigger frame. The first user information field is used to schedule the first-type station to send the HE TB NDP in the HE modulation bandwidth, and the first user information field is used to schedule the first-type station to send the EHT TB NDP in the EHT modulation bandwidth.

Optionally, the processing unit 12 is configured to generate the NFRP trigger frame.

Optionally, the transceiver unit 11 is specifically configured to receive the EHT TB NDP from the first station on a subcarrier corresponding to a resource unit subcarrier set index of the first station in the first-type station, where the subcarrier corresponding to the resource unit subcarrier set index of the first station is in the EHT modulation bandwidth. The resource unit subcarrier set index of the first station is determined based on an AID of the first station, a value of a starting AID in the first user information field, the EHT modulation bandwidth, and a quantity of stations scheduled by the NFRP trigger frame to feed back the HE TB NDP. The quantity of stations scheduled by the NFRP trigger frame to feed back the HE TB NDP includes a sum of a quantity of first-type stations scheduled by the NFRP trigger frame to feed back the HE TB NDP and a quantity of second-type stations scheduled by the NFRP trigger frame to feed back the HE TB NDP.

It should be understood that the communication apparatus 1 in this design may correspondingly perform Embodiment 1, and the operations or functions of the units in the communication apparatus 1 are respectively for implementing corresponding operations of the AP in Embodiment 1. For brevity, details are not described herein again.

In another design, the transceiver unit 11 is configured to send the NFRP trigger frame; and the transceiver unit 11 is further configured to receive the EHT TB NDP from the first station in the first-type station. The NFRP trigger frame includes a second user information field and one or more third user information fields. A value of the AID12 field in the second user information field is 2007. The one or more third user information fields are located after the second user information field, and the third user information field is used to schedule the first-type station in a preset AID range starting from a starting AID of the third user information field to feed back the EHT TB NDP. The AID of the first station falls in a preset AID range starting from a starting AID of a j$^{th}$ third user information field. The EHT TB NDP is determined based on the second user information field and the j$^{th}$ third user information field, where j is greater than or equal to 1 and is less than or equal to a quantity of third user information fields included in the NFRP trigger frame.

Optionally, the processing unit 12 is configured to generate the NFRP trigger frame.

Optionally, the transceiver unit 11 is specifically configured to receive the EHT TB NDP from the first station on the subcarrier corresponding to the resource unit subcarrier set index of the first station in the first-type station. The subcarrier corresponding to the resource unit subcarrier set index of the first station is in the EHT modulation bandwidth corresponding to the j$^{th}$ third user information field. The resource unit subcarrier set index of the first station is determined based on the AID of the first station, a value of the starting AID in the j$^{th}$ third user information field, and the EHT modulation bandwidth.

It should be understood that the communication apparatus 1 in this design may correspondingly perform Embodiment 2, and the operations or functions of the units in the communication apparatus 1 are respectively for implementing corresponding operations of the AP in Embodiment 2. For brevity, details are not described herein again.

Figure 13:
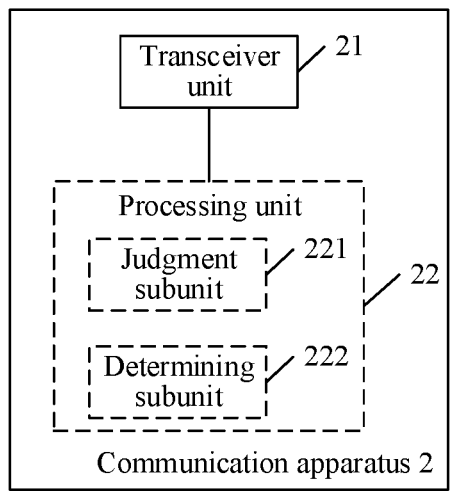
FIG. 13 is a schematic diagram of a structure of a communication apparatus 2 according to an embodiment of this application.

FIG. 13 is a schematic diagram of a structure of a communication apparatus 2 according to an embodiment of this application. The communication apparatus 2 may be a first station or a chip in the first station, for example, a Wi-Fi chip. As shown in FIG. 13, the communication apparatus 2 includes a transceiver unit 21, and optionally includes a processing unit 22.

In a design, the transceiver unit 21 is configured to receive an NFRP trigger frame; and the transceiver unit 21 is further configured to send an EHT TB NDP if a resource for scheduling the communication apparatus 2 by the NFRP trigger frame is in an EHT modulation bandwidth; or the transceiver unit 21 is further configured to send an HE TB NDP if a resource for scheduling the communication apparatus 2 by the NFRP trigger frame is in an HE modulation bandwidth. The NFRP trigger frame includes HE modulation bandwidth indication information and EHT modulation bandwidth indication information. The HE modulation bandwidth indication information indicates the HE modulation bandwidth, and the EHT modulation bandwidth indication information indicates the EHT modulation bandwidth. The NFRP trigger frame further includes a first user information field, and the first user information field is the $1^{st}$ user information field after a common information field of the NFRP trigger frame. The first user information field is used to schedule the first-type station to send the HE TB NDP in the HE modulation bandwidth, and the first user information field is used to schedule the first-type station to send the EHT TB NDP in the EHT modulation bandwidth.

Optionally, the processing unit 22 includes a judgment subunit 221. The judgment subunit 221 is configured to determine whether the resource for scheduling the communication apparatus 2 by the NFRP trigger frame is in the EHT modulation bandwidth or in the HE modulation bandwidth.

Optionally, the transceiver unit 21 is specifically configured to send the EHT TB NDP on a subcarrier corresponding to a resource unit subcarrier set index of the communication apparatus 2. The resource unit subcarrier set index of the communication apparatus 2 is determined based on an AID of communication apparatus 2, a value of a starting AID in the first user information field, the EHT modulation bandwidth, and a quantity of stations scheduled by the NFRP trigger frame to feed back the HE TB NDP. The quantity of stations scheduled by the NFRP trigger frame to feed back the HE TB NDP includes a sum of a quantity of first-type stations scheduled by the NFRP trigger frame to feed back the HE TB NDP and a quantity of second-type stations scheduled by the NFRP trigger frame to feed back the HE TB NDP.

Optionally, the processing unit 22 further includes a determining subunit 222. The determining subunit 222 is configured to determine the resource unit subcarrier set index of the communication apparatus 2.

It should be understood that the communication apparatus 2 in this design may correspondingly perform Embodiment 1, and the operations or functions of the units in the communication apparatus 2 are respectively for implementing corresponding operations of the first station in Embodiment 1. For brevity, details are not described herein again.

In another design, the transceiver unit 21 is configured to receive the NFRP trigger frame; and the transceiver 21 is further configured to send the EHT TB NDP based on the second user information field and a $j^{th}$ third user information field when an AID of the communication apparatus 2 falls in a preset AID range starting from a starting AID of the $j^{th}$ third user information field, where j is greater than or equal to 1 and is less than or equal to a quantity of third user information fields included in the NFRP trigger frame. The NFRP trigger frame includes the second user information field and one or more third user information fields. A value of the AID12 field in the second user information field is 2007, and the one or more third user information fields are located after the second user information field. The third user information field is used to schedule the first-type station in the preset AID range starting from the starting AID of the third user information field to feed back the EHT TB NDP. j is greater than or equal to 1, and is less than or equal to a quantity of third user information fields included in the NFRP trigger frame.

Optionally, the processing unit 22 includes a judgment subunit 221. The judgment subunit 221 is configured to determine whether the AID of the communication apparatus 2 falls in a preset AID range starting from the starting AID of the $j^{th}$ third user information field.

Optionally, the transceiver unit 21 is specifically configured to send the EHT TB NDP based on the second user information field and the $j^{th}$ third user information field on the subcarrier corresponding to the resource unit subcarrier set index of the communication apparatus 2. The resource unit subcarrier set index of the communication apparatus 2 is determined based on the AID of the communication apparatus 2, the value of the starting AID of the $j^{th}$ third user information field, and the EHT modulation bandwidth.

Optionally, the processing unit 22 further includes a determining subunit 222. The determining subunit 222 is configured to determine the resource unit subcarrier set index of the communication apparatus 2.

It should be understood that the communication apparatus 2 in this design may correspondingly perform Embodiment 2, and the operations or functions of the units in the communication apparatus 1 are respectively for implementing corresponding operations of the first station in Embodiment 2. For brevity, details are not described herein again.

The foregoing describes the access point and the first station in embodiments of this application, and the following describes possible product forms of the access point and the first station. It should be understood that a product in any form that has the function of the AP in FIG. 12 and a product in any form that has the function of the first station in FIG. 13 shall fall within the protection scope of embodiments of this application. It should be further understood that the following descriptions are merely an example, and product forms of the AP and the first station in embodiments of this application are not limited thereto.

In a possible product form, the AP and the first STA in embodiments of this application may be implemented through a general bus architecture.

Figure 14:
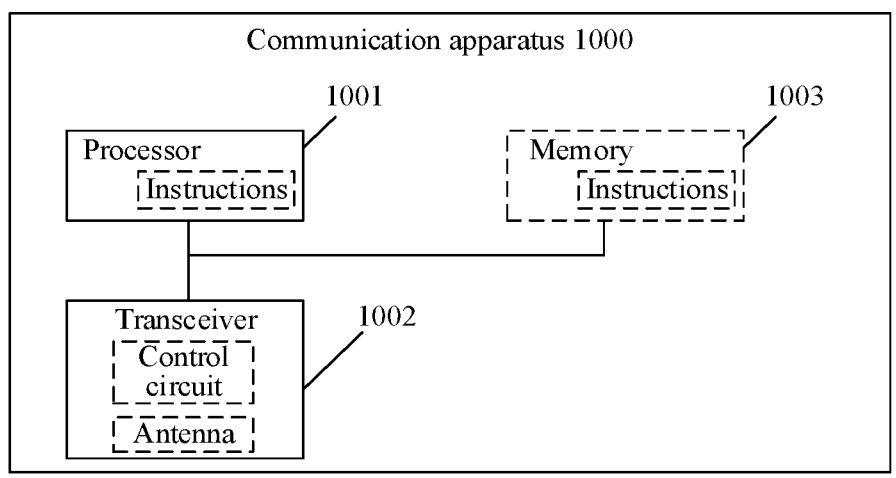
FIG. 14 is a schematic diagram of a structure of a communication apparatus 1000 according to an embodiment of this application.

For ease of description, refer to FIG. 14. FIG. 14 is a schematic diagram of a structure of a communication apparatus 1000 according to an embodiment of this application. The communication apparatus 1000 may be an AP, a first STA, or a chip therein. FIG. 14 shows only main components of the communication apparatus 1000. In addition to a processor 1001 and a transceiver 1002, the communication apparatus may further include a memory 1003 and an input/output apparatus (not shown in the figure).

The processor 1001 is mainly configured to: process a communication protocol and communication data, control the entire communication apparatus, execute a software program, and process data of the software program. The memory 1003 is mainly configured to store the software program and the data. The transceiver 1002 may include a control circuit and an antenna. The control circuit is mainly configured to: perform conversion between a baseband signal and a radio frequency signal, and process the radio frequency signal. The antenna is mainly configured to receive/send a radio frequency signal in a form of an electromagnetic wave. The input/output apparatus, such as a touchscreen, a display screen, or a keyboard, is mainly configured to: receive data entered by a user and output data to the user.

After the communication apparatus is powered on, the processor 1001 may read the software program in the memory 1003, interpret and execute instructions of the software program, and process data of the software program. When data needs to be sent wirelessly, the processor 1001 performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 1001. The processor 1001 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

The processor 1001, the transceiver 1002, and the memory 1003 may be connected through a communication bus.

In a design, the communication apparatus 1000 may be configured to perform a function of the AP in Embodiment 1: The processor 1001 may be configured to: generate the NFRP trigger frame sent in step S101 in FIG. 7, and/or perform another process of the technology described in this specification. The transceiver 1002 may be configured to perform step S105 in FIG. 7, and/or another process of the technology described in this specification.

In another design, the communication apparatus 1000 may be configured to perform a function of the first station in Embodiment 1: The processor 1001 may be configured to: generate the EHT TB NDP sent in step S103 in FIG. 7 or the HE TB NDP sent in step S104, and/or perform another process of the technology described in this specification. The transceiver 1002 may be configured to perform steps S102, S103, and S104 in FIG. 7, and/or another process of the technology described in this specification.

In a design, the communication apparatus 1000 may be configured to perform a function of the AP in Embodiment 2: The processor 1001 may be configured to: generate the NFRP trigger frame sent in step S201 in FIG. 10, and/or perform another process of the technology described in this specification. The transceiver 1002 may be configured to perform: step S204 in FIG. 10, and/or another process of the technology described in this specification.

In another design, the communication apparatus 1000 may be configured to perform a function of the first station in Embodiment 2: The processor 1001 may be configured to: generate the EHT TB NDP sent in step S203 in FIG. 10, and/or perform another process of the technology described in this specification. The transceiver 1002 may be configured to perform step S202 and step S203 in FIG. 10, and/or another process of the technology described in this specification.

In any one of the designs, the processor 1001 may include a transceiver configured to implement receiving and sending functions. For example, the transceiver may be a transceiver circuit, an interface, or an interface circuit. The transceiver circuit, the interface, or the interface circuit that are configured to implement the receiving and sending functions may be separated, or may be integrated together. The transceiver circuit, the interface, or the interface circuit may be configured to read or write code/data, or the transceiver circuit, the interface, or the interface circuit may be configured to transmit or transfer a signal.

In any one of the designs, the processor 1001 may store instructions. The instructions may be a computer program. The computer program runs on the processor 1001, so that the communication apparatus 1000 can perform the method described in any one of the method embodiments. The computer program may be fixed in the processor 1001. In this case, the processor 1001 may be implemented by hardware.

In an implementation, the communication apparatus 1000 may include a circuit, and the circuit may implement the sending, receiving, or communication function in the foregoing method embodiments. The processor and the transceiver described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like. The processor and the transceiver each may be manufactured by using various IC processing technologies, for example, a complementary metal oxide semiconductor (CMOS), an N-type metal-oxide-semiconductor (nMetal-oxide-semiconductor, NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

A range of the communication apparatus described in this application is not limited thereto, and a structure of the communication apparatus may not be limited to FIG. 14. The communication apparatus may be a stand-alone device or may be part of a larger device. For example, the communication apparatus may be:

(1) an independent IC, a chip, a chip system, or a subsystem;
(2) a set having one or more ICs, where optionally, the IC set may also include a storage component configured to store data and a computer program;
(3) an ASIC, such as a modem;
(4) a module that can be embedded in another device;
(5) a receiver, a terminal, a smart terminal, a cellular phone, a wireless device, a handset, a mobile unit, a vehicle-mounted device, a network device, a cloud device, an artificial intelligence device, or the like;
(6) another device; or the like.

In a possible product form, the AP and the first STA in embodiments of this application may be implemented through a general-purpose processor.

The general-purpose processor implementing the AP includes a processing circuit and an input/output interface that is connected to and communicates with the processing circuit internally.

In a design, the general-purpose processor may be configured to perform a function of the AP in Embodiment 1. Specifically, the processing circuit is configured to: generate the NFRP trigger frame sent in step S101 in FIG. 7, and/or perform another process of the technology described in this specification; and the input/output interface is configured to perform step S105 in FIG. 7, and/or another process of the technology described in this specification.

In another design, the general-purpose processor may be configured to perform a function of the AP in Embodiment 2. Specifically, the processing circuit is configured to: generate the NFRP trigger frame sent in step S201 in FIG. 10, and/or perform another process of the technology described in this specification. The input/output interface is configured to perform step S204 in FIG. 10, and/or another process of the technology described in this specification.

The general-purpose processor implementing the first STA includes a processing circuit and an input/output interface that is connected to and communicates with the processing circuit.

In a design, the general-purpose processor may be configured to perform a function of the first station in Embodiment 1. Specifically, the processing circuit is configured to generate: the EHT TB NDP sent in step S103 or the HE TB NDP sent in step S104 in FIG. 7, and/or perform another process of the technology described in this specification; and the input/output interface is configured to perform steps S102, S103, and S104 in FIG. 7, and/or another process of the technology described in this specification.

In another design, the general-purpose processor may be configured to perform a function of the first station in Embodiment 2. Specifically, the processing circuit is configured to: generate the EHT TB NDP sent in step S203 in FIG. 10, and/or perform another process of the technology described in this specification; and the input/output interface is configured to perform step S202 and step S203 in FIG. 10, and/or another process of the technology described in this specification.

It should be understood that the communication apparatuses in the foregoing product forms have any function of the AP or the first station in the foregoing method embodiments, and details are not described herein again.

An embodiment of this application further provides a computer-readable storage medium. The computer-readable storage medium stores a computer program code. When the processor executes the computer program code, an electronic device performs the method according to any one of the foregoing embodiments.

An embodiment of this application further provides a computer program product, and when the computer program product runs on a computer, the computer is enabled to perform the method according to any one of the foregoing embodiments.

An embodiment of this application further provides a communication apparatus. The apparatus may exist in a product form of a chip. A structure of the apparatus includes a processor and an interface circuit. The processor is configured to communicate with another apparatus through a receiving circuit, so that the apparatus performs the method in any one of the foregoing embodiments.

An embodiment of this application further provides a wireless communication system, including an AP and a first station. The AP and the first station may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may alternatively exist in the core network interface device as discrete components.

A person of skill in the art should be aware that in one or more of the foregoing examples, the functions described in this application may be implemented by using hardware, software, firmware, or any combination thereof. When being implemented by using software, the foregoing functions may be stored in a computer-readable medium or transmitted as one or more instructions or code in the computer-readable medium. The computer-readable medium includes the computer-readable storage medium and a communication medium, where the communication medium includes any medium that enables a computer program to be transmitted from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application.

What is claimed is:

1. A trigger based null data packet transmission method, applied to a first-type station, and comprising:
   receiving, by a first station in the first-type station, a null data packet feedback report poll (NFRP) trigger frame, wherein the NFRP trigger frame comprises highly efficient (HE) modulation bandwidth indication information and extremely high-throughput (EHT) modulation bandwidth indication information,
      wherein the HE modulation bandwidth indication information indicates an HE modulation bandwidth, the EHT modulation bandwidth indication information indicates an EHT modulation bandwidth,
      wherein the NFRP trigger frame further comprises a first user information field, the first user information field is the $1^{st}$ user information field following a common information field of the NFRP trigger frame, and the first user information field is used to schedule the first-type station to send a highly efficient trigger based null data packet (HE TB NDP) in the HE modulation bandwidth, and send an extremely high-throughput trigger based null data packet (EHT TB NDP) in the EHT modulation bandwidth; and
   sending, by the first station, the EHT TB NDP in response to a resource for scheduling the first station by the NFRP trigger frame being in the EHT modulation bandwidth; or
   sending, by the first station, the HE TB NDP in response to a resource for scheduling the first station by the NFRP trigger frame being in the HE modulation bandwidth.

2. The method according to claim 1, wherein the first user information field is further used to, upon the first-type station being scheduled, schedule a second-type station to send the HE TB NDP in the HE modulation bandwidth, the first-type station is an EHT station, and the second-type station is an HE station;
   an association identifier (AID) range of stations scheduled by the first user information field falls in a first range, wherein a starting value of the first range is a first value, the first value is a value of a starting AID field in the first user information field, an end value of the first range is a second value, and the second value is a sum of the value of the starting AID field, a quantity of stations scheduled by the NFRP trigger frame to feed back the HE TB NDP, and a quantity of first-type stations scheduled by the NFRP trigger frame to feed back the EHT TB NDP; and
   the quantity of stations scheduled by the NFRP trigger frame to feed back the HE TB NDP comprises a sum of a quantity of first-type stations scheduled by the NFRP trigger frame to feed back the HE TB NDP and a quantity of second-type stations scheduled by the NFRP trigger frame to feed back the HE TB NDP.

3. The method according to claim 2, wherein the quantity of stations scheduled by the NFRP trigger frame to feed back the HE TB NDP is determined based on the HE modulation bandwidth and a value indicated by a spatially multiplexed user quantity field in the first user information field; and the quantity of first-type stations scheduled by the NFRP trigger frame to feed back the EHT TB NDP is determined based on the EHT modulation bandwidth and the value indicated by the spatially multiplexed user quantity field in the first user information field.

4. The method according to claim 3, wherein the quantity of first-type stations scheduled by the NFRP trigger frame to feed back the EHT TB NDP is $N_{STA,EHT-TB}$;

$$N_{STA,EHT-TB}=18\times 2^{BW-EHT_{index}} \times (\text{MultiplexingFlag}+1),$$

wherein

MultiplexingFlag indicates a value indicated by the spatially multiplexed user quantity field in the first user information field; and $$BW-EHT_{index} = \log_2^{\left(\frac{BW-EHT}{20}\right)},$$

wherein

BW-EHT represents the EHT modulation bandwidth, and $BW-EHT_{index}$ represents an index of the EHT modulation bandwidth.

5. The method according to claim 1, wherein the resource for scheduling the first station by the NFRP trigger frame is determined based on an association identifier (AID) of the first station and an indication of the first user information field.

6. The method according to claim 5, wherein in response to the AID of the first station being greater than or equal to the value of the starting AID field in the first user information field, and being less than the sum of the value of the starting AID field and the quantity of stations scheduled by the NFRP trigger frame to feed back the HE TB NDP, the resource for scheduling the first station by the NFRP trigger frame is in the HE modulation bandwidth; or in response to the AID of the first station being greater than or equal to the sum of the value of the starting AID field and the quantity of stations scheduled by the NFRP trigger frame to feed back the HE TB NDP, and being less than the sum of the value of the starting AID field, the quantity of stations scheduled by the NFRP trigger frame to feed back the HE TB NDP, and the quantity of first-type stations scheduled by the NFRP trigger frame to feed back the EHT TB NDP, the resource for scheduling the first station scheduled by the NFRP trigger frame is in the EHT modulation bandwidth; and the quantity of stations scheduled by the NFRP trigger frame to feed back the HE TB NDP comprises the sum of the quantity of first-type stations scheduled by the NFRP trigger frame to feed back the HE TB NDP and the quantity of second-type stations scheduled by the NFRP trigger frame to feed back the HE TB NDP.

7. The method according to claim 1, wherein the sending, by the first station, the EHT TB NDP comprises:

sending, by the first station, the EHT TB NDP on a subcarrier corresponding to a resource unit subcarrier set index of the first station; and determining the resource unit subcarrier set index of the first station based on an association identifier (AID) of the first station, a value of a starting AID in the first user information field, the EHT modulation bandwidth, and a quantity of stations scheduled by the NFRP trigger frame to feed back the HE TB NDP; and a quantity of stations scheduled by the NFRP trigger frame to feed back the HE TB NDP comprises a sum of a quantity of first-type stations scheduled by the NFRP trigger frame to feed back the HE TB NDP and a quantity of second-type stations scheduled by the NFRP trigger frame to feed back the HE TB NDP.

8. The method according to claim 7, wherein the resource unit subcarrier set index of the first station is $RU\_TONE\_SET\_INDEX_{EHT}$;

$$RU\_TONE\_SET\_INDEX_{EHT}=1+N_{STA,HE-TB}+\\((AID_{STA}-\text{Starting AID}-N_{STA,HE-TB})\bmod(18\times 2^{BW-EHT_{index}})),$$

wherein $N_{STA,HE-TB}$ represents the quantity of stations scheduled by the NFRP trigger frame to feed back the HE TB NDP, $AID_{STA}$ represents an association identifier of the first station, and Starting AID represents a value of a starting AID field in the first user information field; and $$BW-EHT_{index} = \log_2^{\left(\frac{BW-EHT}{20}\right)},$$

wherein

BW-EHT represents the EHT modulation bandwidth, and $BW-EHT_{index}$ represents an index of the EHT modulation bandwidth.

9. The method according to claim 7, wherein the resource unit subcarrier set index in the EHT modulation bandwidth is greater than the resource unit subcarrier set index in the HE modulation bandwidth, and the resource unit subcarrier set indexes in the EHT modulation bandwidth and in the HE modulation bandwidth are both numbered in an ascending order of frequencies.

10. The method according to claim 8, wherein a mapping relationship between the resource unit subcarrier set index of the first station and a resource unit subcarrier set index in an 80 MHz bandwidth with a lowest frequency in the HE modulation bandwidth in an 802.11ax protocol is:

$$RU\_TONE\_SET\_INDEX_{HE,80}=RU\_TONE\_SET\_INDEX_{EHT}-(BW-HE/80+M)\times 72,$$

wherein $RU\_TONE\_SET\_INDEX_{HE,80}$ represents the resource allocation subcarrier set index in the 80 MHz bandwidth with the lowest frequency in the HE modulation bandwidth in the 802.11ax protocol, $RU\_TONE\_SET\_INDEX_{EHT}$ represents the resource unit subcarrier set index of the first station, BW-HE represents the HE modulation bandwidth, M represents the index of the 80 MHz in which $RU\_TONE\_SET\_INDEX_{EHT}$ is located, M is one value in 0, 1, 2, and 3, and in response to M being set to 0, 1, 2, or 3, M represents respectively four 80 MHz bandwidths in an ascending order of frequencies in the EHT modulation bandwidth.

11. The method according to claim 1, wherein the NFRP trigger frame further comprises a second user information field, the second user information field comprises an uplink bandwidth extension field and an AID12 field, the uplink bandwidth extension field and an uplink bandwidth field of the NFRP trigger frame jointly indicate the EHT modulation bandwidth, and a value of the AID12 field of the second user information field is 2007.

12. A trigger based null data packet transmission method, comprising:

sending, by an access point, a null data packet feedback report poll (NFRP) trigger frame, wherein the NFRP trigger frame comprises highly efficient (HE) modulation bandwidth indication information and extremely high-throughput (EHT) modulation bandwidth indication information, the HE modulation bandwidth indication information indicates an HE modulation bandwidth, the EHT modulation bandwidth indication information indicates an EHT modulation bandwidth, the NFRP trigger frame further comprises a first user information field, the first user information field is the $1^{st}$ user information field following a common information field of the NFRP trigger frame, and the first user information field is used to schedule a first-type station to send a highly efficient trigger based null data packet (HE TB NDP) in the HE modulation bandwidth, and send an extremely high-throughput trigger based null data packet (EHT TB NDP) in the EHT modulation bandwidth; and receiving, by the access point in the EHT modulation bandwidth, the EHT TB NDP from a first station in the first-type station; or receiving, by the access point in the HE modulation bandwidth, the HE TB NDP from a first station.

13. The method according to claim 12, wherein the first user information field is further used to, upon the first-type station being scheduled, schedule a second-type station to send the HE TB NDP in the HE modulation bandwidth, the first-type station is an EHT station, and the second-type station is an HE station;

an association identifier (AID) range of stations scheduled by the first user information field falls in a first range, wherein a starting value of the first range is a first value, the first value is a value of a starting AID field in the first user information field, an end value of the first range is a second value, and the second value is a sum of the value of the starting AID field, a quantity of stations scheduled by the NFRP trigger frame to feed back the HE TB NDP, and a quantity of first-type stations scheduled by the NFRP trigger frame to feed back the EHT TB NDP; and the quantity of stations scheduled by the NFRP trigger frame to feed back the HE TB NDP comprises a sum of a quantity of first-type stations scheduled by the NFRP trigger frame to feed back the HE TB NDP and a quantity of second-type stations scheduled by the NFRP trigger frame to feed back the HE TB NDP.

14. The method according to claim 13, wherein the quantity of stations scheduled by the NFRP trigger frame to feed back the HE TB NDP is determined based on the HE modulation bandwidth and a value indicated by a spatially multiplexed user quantity field in the first user information field; and the quantity of first-type stations scheduled by the NFRP trigger frame to feed back the EHT TB NDP is determined based on the EHT modulation bandwidth and the value indicated by the spatially multiplexed user quantity field in the first user information field.

15. The method according to claim 14, wherein the quantity of first-type stations scheduled by the NFRP trigger frame to feed back the EHT TB NDP is $N_{STA, EHT-TB}$;

$$N_{STA,EHT-TB} = 18 \times 2^{BW-EHT_{index}} \times (\text{MultiplexingFlag}+1),$$

wherein

MultiplexingFlag indicates a value indicated by the spatially multiplexed user quantity field in the first user information field; and $$BW - EHT_{index} = \log_2^{\left(\frac{BW-EHT}{20}\right)},$$

wherein

BW-EHT represents the EHT modulation bandwidth, and $BW-EHT_{index}$ represents an index of the EHT modulation bandwidth.

16. The method according to claim 12, wherein the resource for scheduling the first station by the NFRP trigger frame is determined based on an association identifier (AID) of the first station and an indication of the first user information field.

17. The method according to claim 16, wherein in response to the AID of the first station being greater than or equal to the value of the starting AID field in the first user information field, and being less than the sum of the value of the starting AID field and the quantity of stations scheduled by the NFRP trigger frame to feed back the HE TB NDP, the resource for scheduling the first station by the NFRP trigger frame is in the HE modulation bandwidth; or in response to the AID of the first station being greater than or equal to the sum of the value of the starting AID field and the quantity of stations scheduled by the NFRP trigger frame to feed back the HE TB NDP, and being less than the sum of the value of the starting AID field, the quantity of stations scheduled by the NFRP trigger frame to feed back the HE TB NDP, and the quantity of first-type stations scheduled by the NFRP trigger frame to feed back the EHT TB NDP, the resource for scheduling the first station scheduled by the NFRP trigger frame is in the EHT modulation bandwidth; and the quantity of stations scheduled by the NFRP trigger frame to feed back the HE TB NDP comprises the sum of the quantity of first-type stations scheduled by the NFRP trigger frame to feed back the HE TB NDP and the quantity of second-type stations scheduled by the NFRP trigger frame to feed back the HE TB NDP.

18. The method according to claim 12, wherein the receiving, by the access point in the EHT modulation bandwidth, the EHT TB NDP from a first station in the first-type station comprises:

receiving, by the access point, the EHT TB NDP from the first station on a subcarrier corresponding to a resource unit subcarrier set index of the first station in the first-type station, wherein the subcarrier corresponding to the resource unit subcarrier set index of the first station is in the EHT modulation bandwidth; and determining the resource unit subcarrier set index of the first station based on an association identifier (AID) of the first station, a value of a starting AID in the first user information field, the EHT modulation bandwidth, and a quantity of stations scheduled by the NFRP trigger frame to feed back the HE TB NDP; and a quantity of stations scheduled by the NFRP trigger frame to feed back the HE TB NDP comprises a sum of a quantity of first-type stations scheduled by the NFRP trigger frame to feed back the HE TB NDP and a quantity of second-type stations scheduled by the NFRP trigger frame to feed back the HE TB NDP.

19. A communication apparatus, applied to a first-type station, comprising: a processor and a transceiver, wherein the transceiver is configured to cooperate with the processor to receive and send a null data packet feedback report poll (NFRP) trigger frame and a null data packet (NDP), and the processor is configured to run program instructions, to enable the communication apparatus to perform a method including:
   receiving, the NFRP trigger frame, wherein the NFRP trigger frame comprises highly efficient (HE) modulation bandwidth indication information and extremely high-throughput (EHT) modulation bandwidth indication information, the HE modulation bandwidth indication information indicates an HE modulation bandwidth, the EHT modulation bandwidth indication information indicates an EHT modulation bandwidth, the NFRP trigger frame further comprises a first user information field, the first user information field is the $1^{st}$ user information field following a common information field of the NFRP trigger frame, and the first user information field is used to schedule the first-type station to send a highly efficient trigger based null data packet (HE TB NDP) in the HE modulation bandwidth, and send an extremely high-throughput trigger based null data packet (EHT TB NDP) in the EHT modulation bandwidth; and sending, the EHT TB NDP in response to a resource for scheduling the first station by the NFRP trigger frame being in the EHT modulation bandwidth; or
   sending, the HE TB NDP in response to if a resource for scheduling the first station by the NFRP trigger frame being in the HE modulation bandwidth.

20. The communication apparatus according to claim 19, wherein the first user information field is further used to, upon the first-type station being scheduled, schedule a second-type station to send the HE TB NDP in the HE modulation bandwidth, the first-type station is an EHT station, and the second-type station is an HE station;
   an association identifier (AID) range of stations scheduled by the first user information field falls in a first range, wherein a starting value of the first range is a first value, the first value is a value of a starting AID field in the first user information field, an end value of the first range is a second value, and the second value is a sum of the value of the starting AID field, a quantity of stations scheduled by the NFRP trigger frame to feed back the HE TB NDP, and a quantity of first-type stations scheduled by the NFRP trigger frame to feed back the EHT TB NDP; and
   the quantity of stations scheduled by the NFRP trigger frame to feed back the HE TB NDP comprises a sum of a quantity of first-type stations scheduled by the NFRP trigger frame to feed back the HE TB NDP and a quantity of second-type stations scheduled by the NFRP trigger frame to feed back the HE TB NDP.

* * * * *